(12) United States Patent
Katsurada et al.

(10) Patent No.: US 11,878,622 B2
(45) Date of Patent: Jan. 23, 2024

(54) VEHICLE LIGHT FITTING, RADAR MODULE, RADAR, AND VEHICLE

(71) Applicant: KOITO MANUFACTURING CO., LTD., Tokyo (JP)

(72) Inventors: Yoshihiro Katsurada, Shizuoka (JP); Yuichi Watano, Shizuoka (JP); Yuta Maruyama, Shizuoka (JP); Osamu Kuboyama, Shizuoka (JP); Akihito Horikawa, Shizuoka (JP); Kosei Kikuchi, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 1 day.

(21) Appl. No.: 17/642,135

(22) PCT Filed: Sep. 9, 2020

(86) PCT No.: PCT/JP2020/034129
§ 371 (c)(1),
(2) Date: Oct. 31, 2022

(87) PCT Pub. No.: WO2021/049531
PCT Pub. Date: Mar. 18, 2021

(65) Prior Publication Data
US 2023/0062751 A1    Mar. 2, 2023

(30) Foreign Application Priority Data

Sep. 10, 2019  (JP) ................... 2019-164750
Oct. 3, 2019   (JP) ................... 2019-183068
(Continued)

(51) Int. Cl.
*B60Q 1/00*     (2006.01)
*F21S 43/242*   (2018.01)
(Continued)

(52) U.S. Cl.
CPC ............ *B60Q 1/0023* (2013.01); *F21S 43/14* (2018.01); *F21S 43/242* (2018.01); *G01S 13/931* (2013.01);
(Continued)

(58) Field of Classification Search
CPC ...... B60Q 1/0023; F21S 43/242; F21S 43/14; G01S 13/931; H01Q 1/3283
See application file for complete search history.

(56) References Cited

U.S. PATENT DOCUMENTS

2004/0136203 A1   7/2004  Gasquet
2008/0180965 A1*  7/2008  Nakamura ........... B60Q 1/0023
                                                362/507
(Continued)

FOREIGN PATENT DOCUMENTS

DE   102017214129 A1   2/2019
EP      3686629 A1     7/2020
(Continued)

OTHER PUBLICATIONS

Sunil, S. et al., "A modified expression for determining the wall thickness of monolithic half-wave radomes," Microwave and Optical Technology Letters, pp. 350-352, Retrieved from the Internet:URL:https://doi.org/10.1002/mop.1311, Jul. 23, 2001 (3 pages).

(Continued)

*Primary Examiner* — Christopher E Dunay
(74) *Attorney, Agent, or Firm* — Osha Bergman Watanabe & Burton LLP

(57) ABSTRACT

A left vehicle lamp includes a lamp housing, a lamp cover that covers an opening of the lamp housing, an illumination unit that is disposed inside a lamp chamber formed by the lamp housing and the lamp power bar, a radar) configured to acquire a radar data indicating a surrounding environment of (Continued)

a vehicle by emitting radio waves toward the outside of the vehicle, and a light guide member that is disposed in a manner of facing the radar so as to hide at least a part of the radar from the outside of the vehicle and is configured to transmit radio waves emitted from the radar. The radar is disposed outside the housing. The light guide member is configured to emit light toward the outside of the vehicle.

11 Claims, 52 Drawing Sheets

(30) Foreign Application Priority Data

| | | |
|---|---|---|
| Oct. 3, 2019 | (JP) | 2019-183069 |
| Oct. 3, 2019 | (JP) | 2019-183070 |
| Oct. 10, 2019 | (JP) | 2019-186787 |
| Nov. 14, 2019 | (JP) | 2019-206320 |
| Nov. 14, 2019 | (JP) | 2019-206321 |
| Nov. 15, 2019 | (JP) | 2019-207074 |
| Nov. 29, 2019 | (JP) | 2019-216675 |
| May 20, 2020 | (JP) | 2020-088267 |

(51) Int. Cl.
*F21S 43/14* (2018.01)
*G01S 13/931* (2020.01)
*H01Q 1/32* (2006.01)
*F21Y 115/10* (2016.01)

(52) U.S. Cl.
CPC ........ *H01Q 1/3283* (2013.01); *F21Y 2115/10* (2016.08); *G01S 2013/93277* (2020.01)

(56) References Cited

U.S. PATENT DOCUMENTS

| | | | | |
|---|---|---|---|---|
| 2009/0219191 A1* | 9/2009 | Natsume | .............. | B60Q 1/0023 342/109 |
| 2019/0165462 A1* | 5/2019 | Shiozaki | .............. | H05K 1/0243 |
| 2020/0174100 A1 | 6/2020 | Hori et al. | | |
| 2020/0247307 A1 | 8/2020 | Tsutsumi | | |
| 2020/0386381 A1* | 12/2020 | Aizawa | .................... | F21S 43/50 |
| 2022/0316678 A1* | 10/2022 | Maruyama | ........... | B60Q 1/0023 |
| 2022/0340072 A1* | 10/2022 | Mori | ........................ | G01S 7/027 |
| 2023/0018354 A1* | 1/2023 | Kanechika | ............ | G01S 13/931 |

FOREIGN PATENT DOCUMENTS

| | | |
|---|---|---|
| JP | 2003240838 A | 8/2003 |
| JP | 2008186741 A | 8/2008 |
| JP | 2010135087 A | 6/2010 |
| JP | 2010137758 A | 6/2010 |
| JP | 2012215455 A | 11/2012 |
| JP | 2013161656 A | 8/2013 |
| JP | 5285405 B2 | 9/2013 |
| JP | 2016091846 A | 5/2016 |
| JP | 2017147145 A | 8/2017 |
| WO | 2015072133 A1 | 5/2015 |
| WO | 2018-127405 A1 | 7/2018 |
| WO | 2019021693 A1 | 1/2019 |
| WO | 2019038107 A1 | 2/2019 |
| WO | 2019059026 A1 | 3/2019 |

OTHER PUBLICATIONS

Extended European Search Report issued in corresponding European Application No. 22165847.9; dated Jul. 4, 2022 (11 pages).
Extended European Search Report issued in corresponding European Application No. 22165843.8; dated Jul. 5, 2022 (11 pages).
International Search Report issued in corresponding International Application No. PCT/JP2020/034129; dated Nov. 24, 2020 (18 pages).
Written Opinion of the International Searching Authority issued in corresponding International Application No. PCT/JP2020/034129; dated Nov. 24, 2020 (14 pages).
European Extended Search Report in corresponding European Application No. 20863824.7, dated Sep. 22, 2022 (12 pages).

* cited by examiner

FIG.1
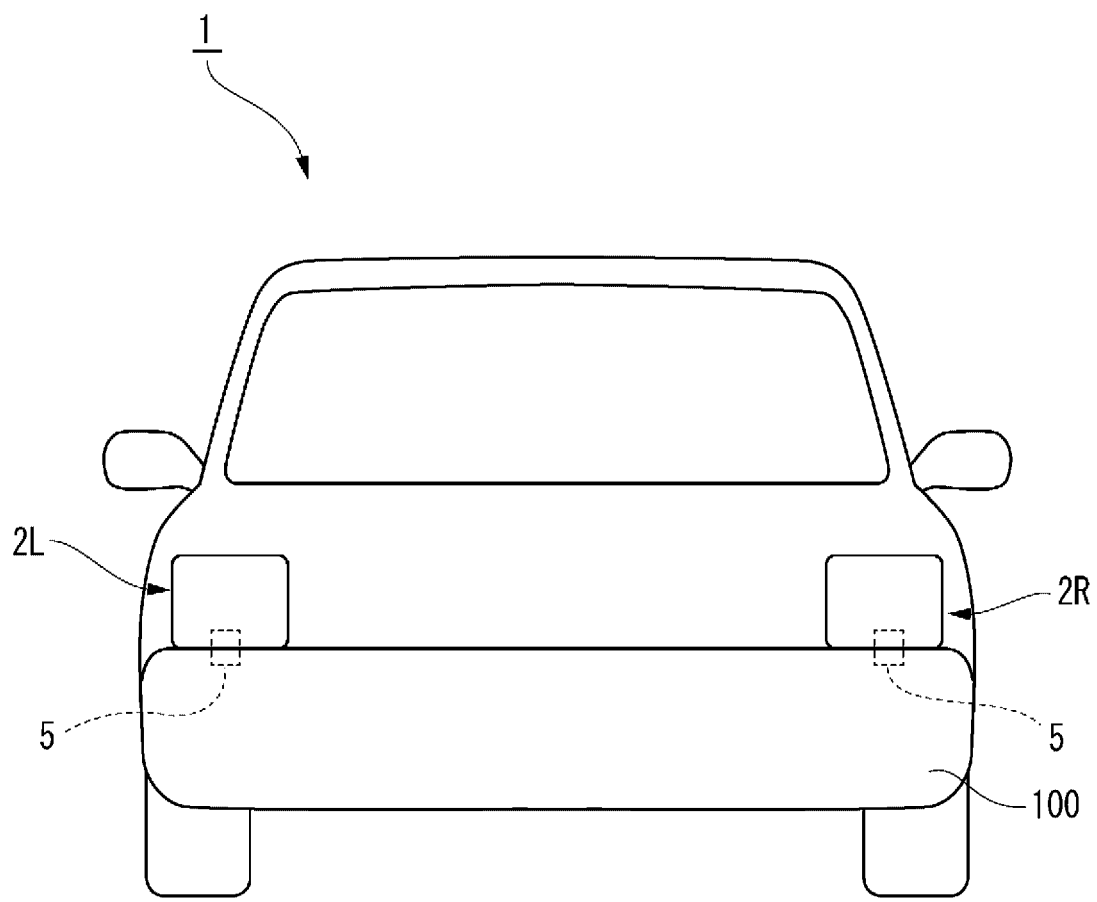
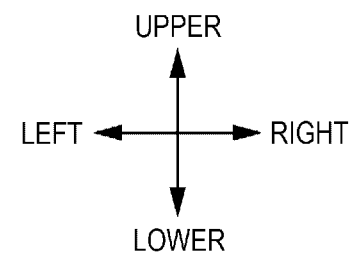

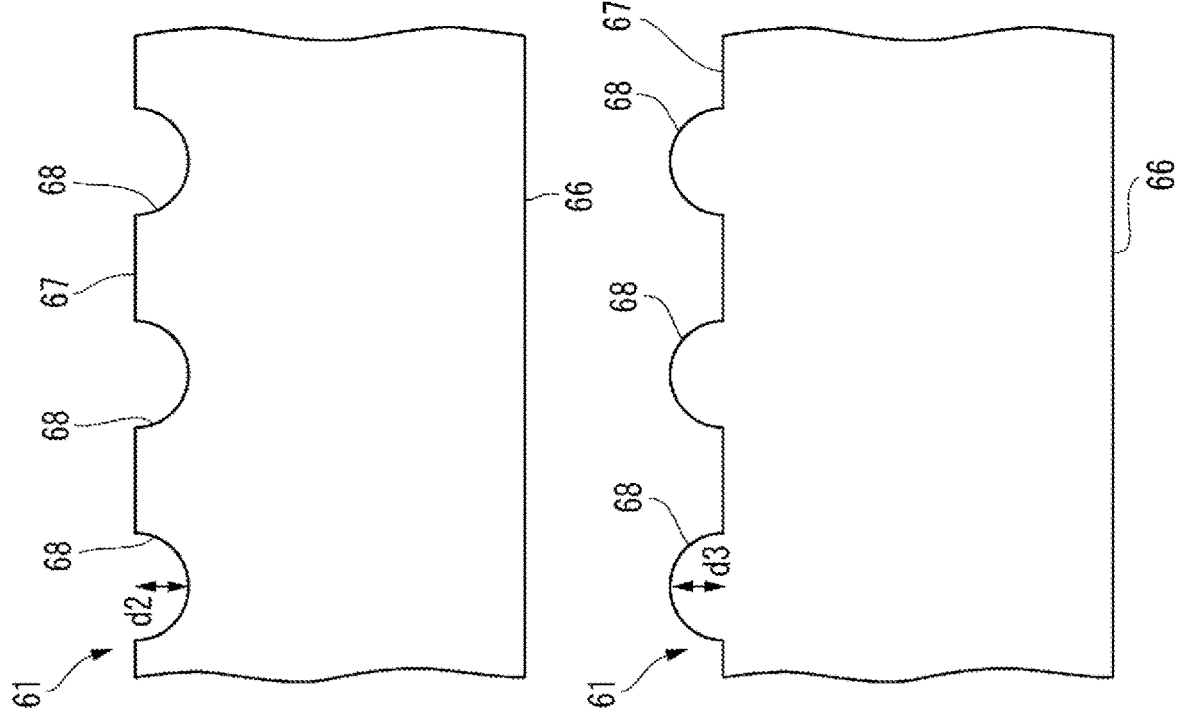
FIG.4B
FIG.4C
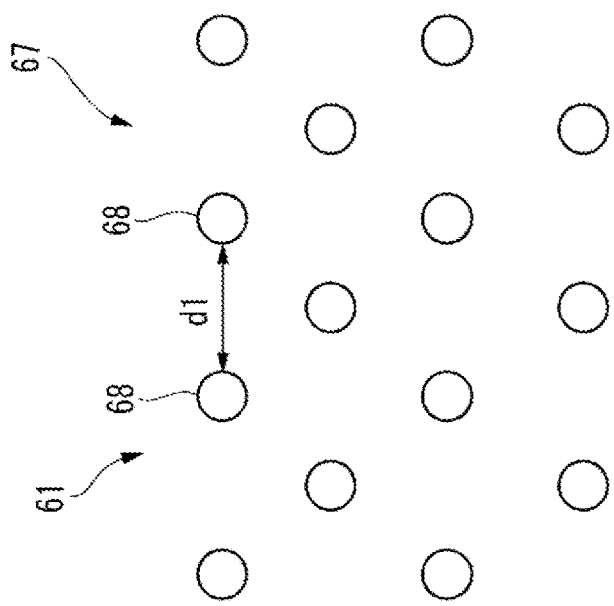
FIG.4A

FIG.10
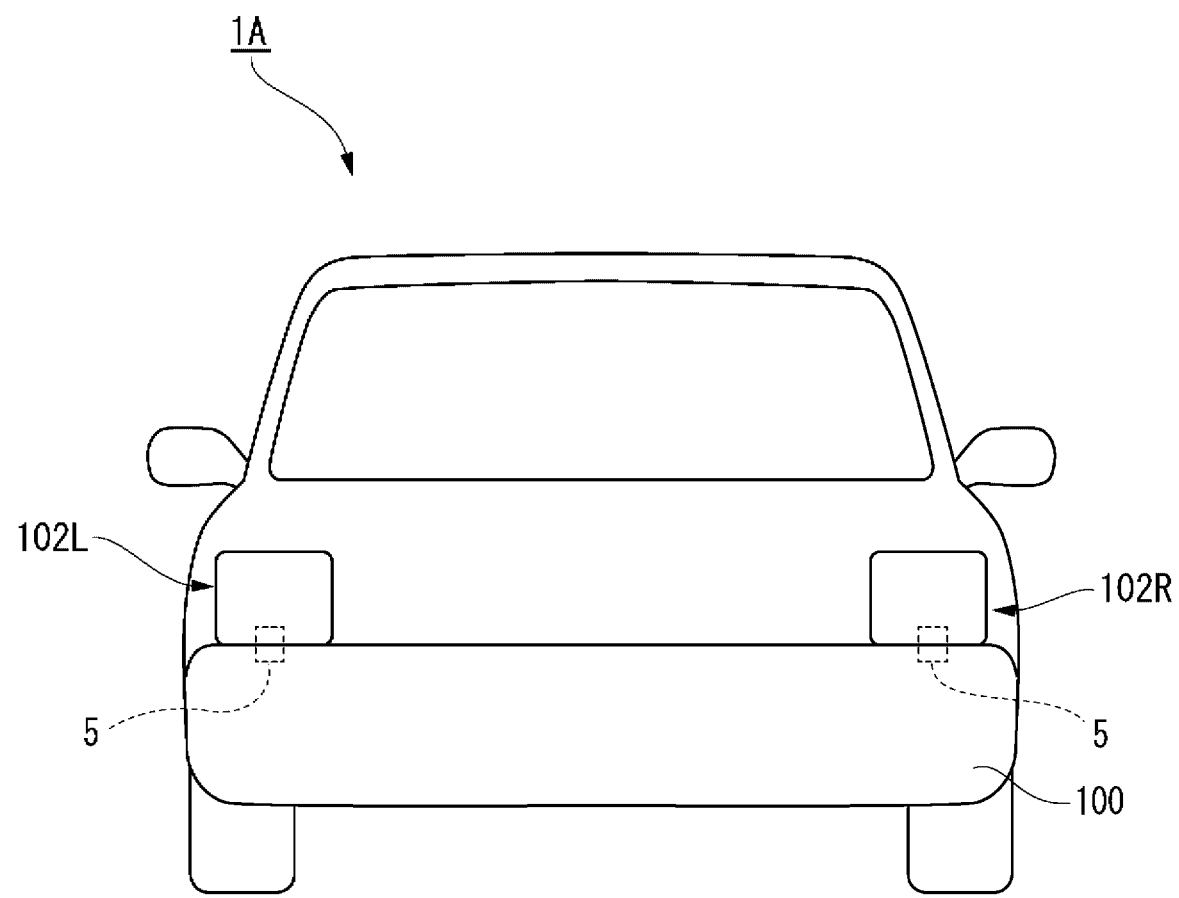
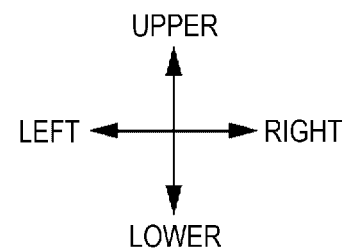

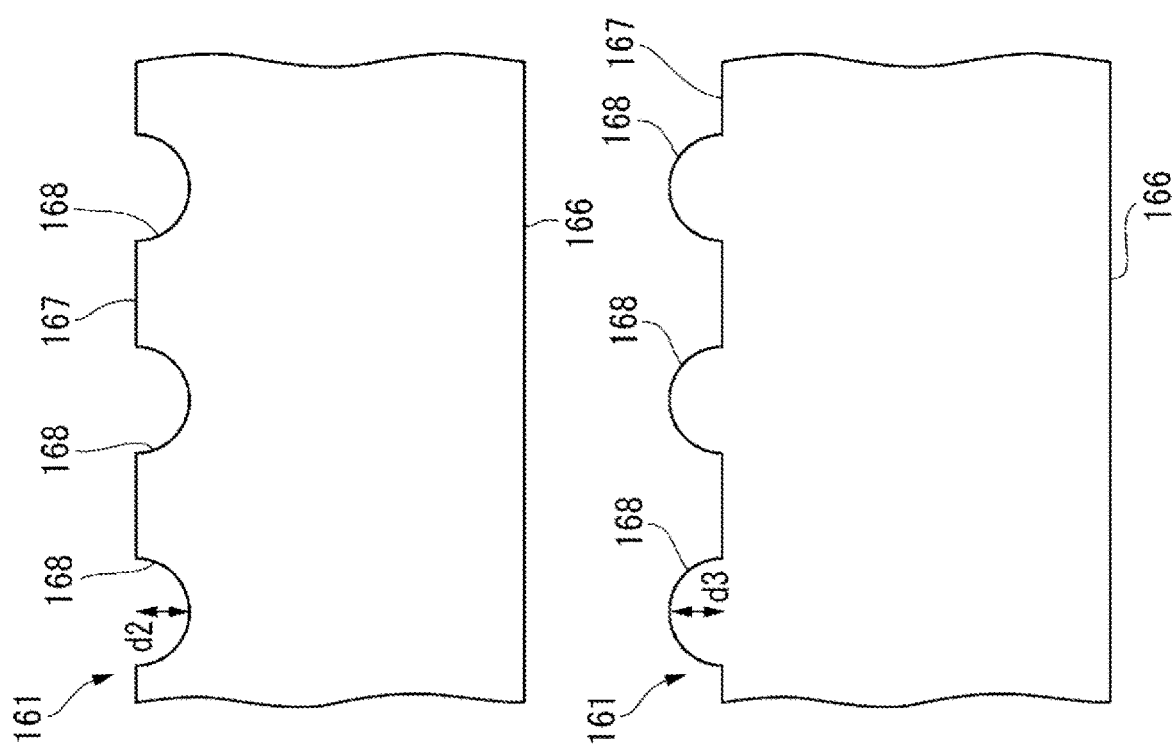
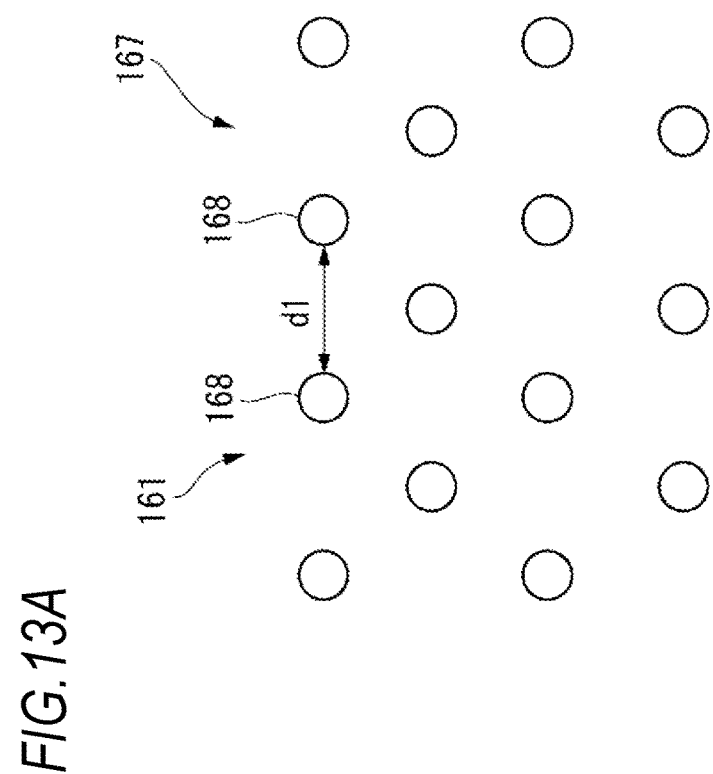

FIG.17
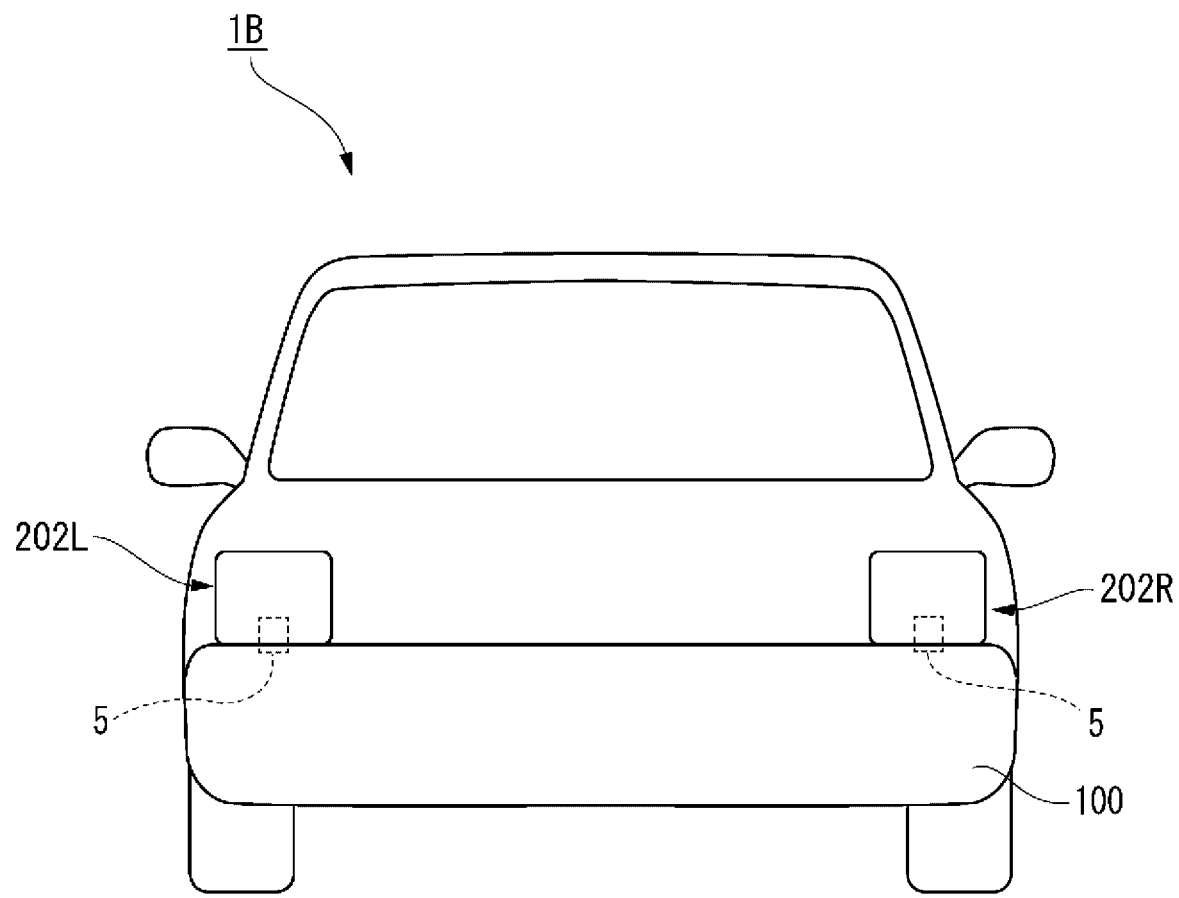
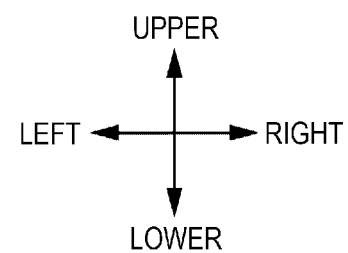

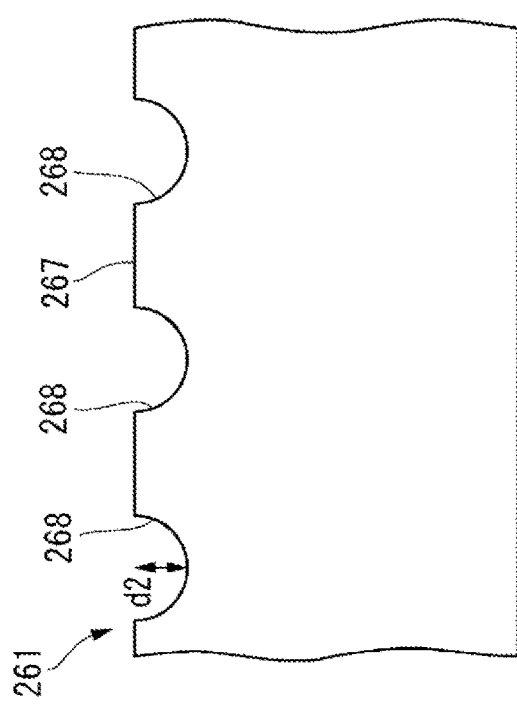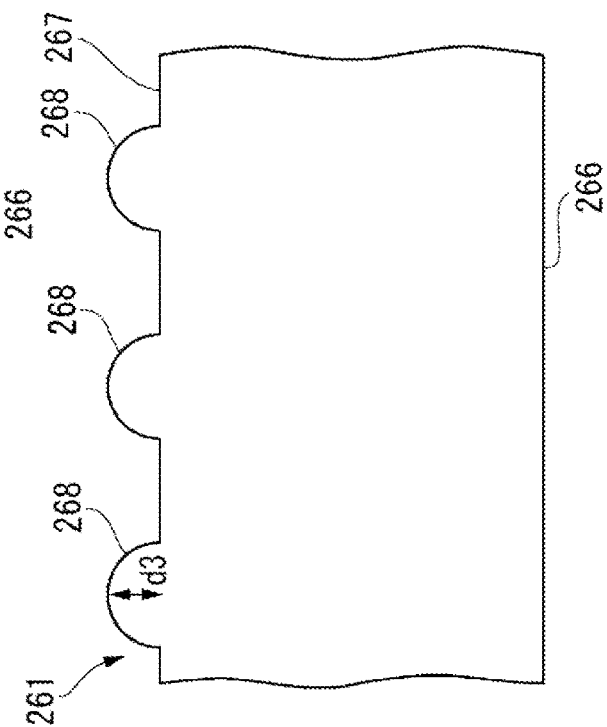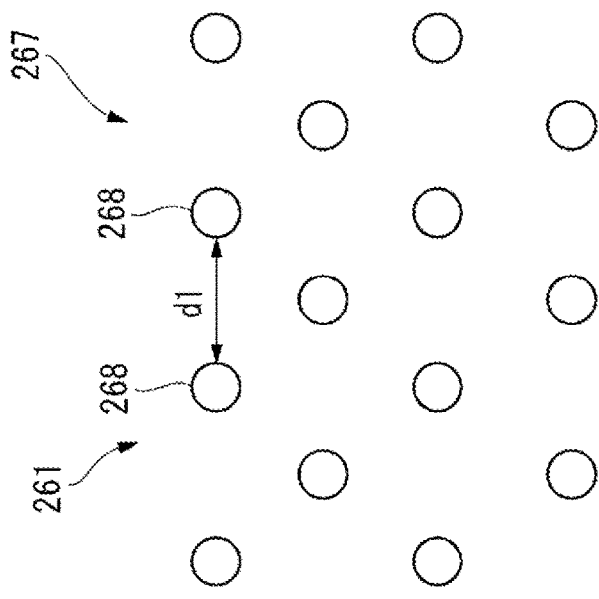

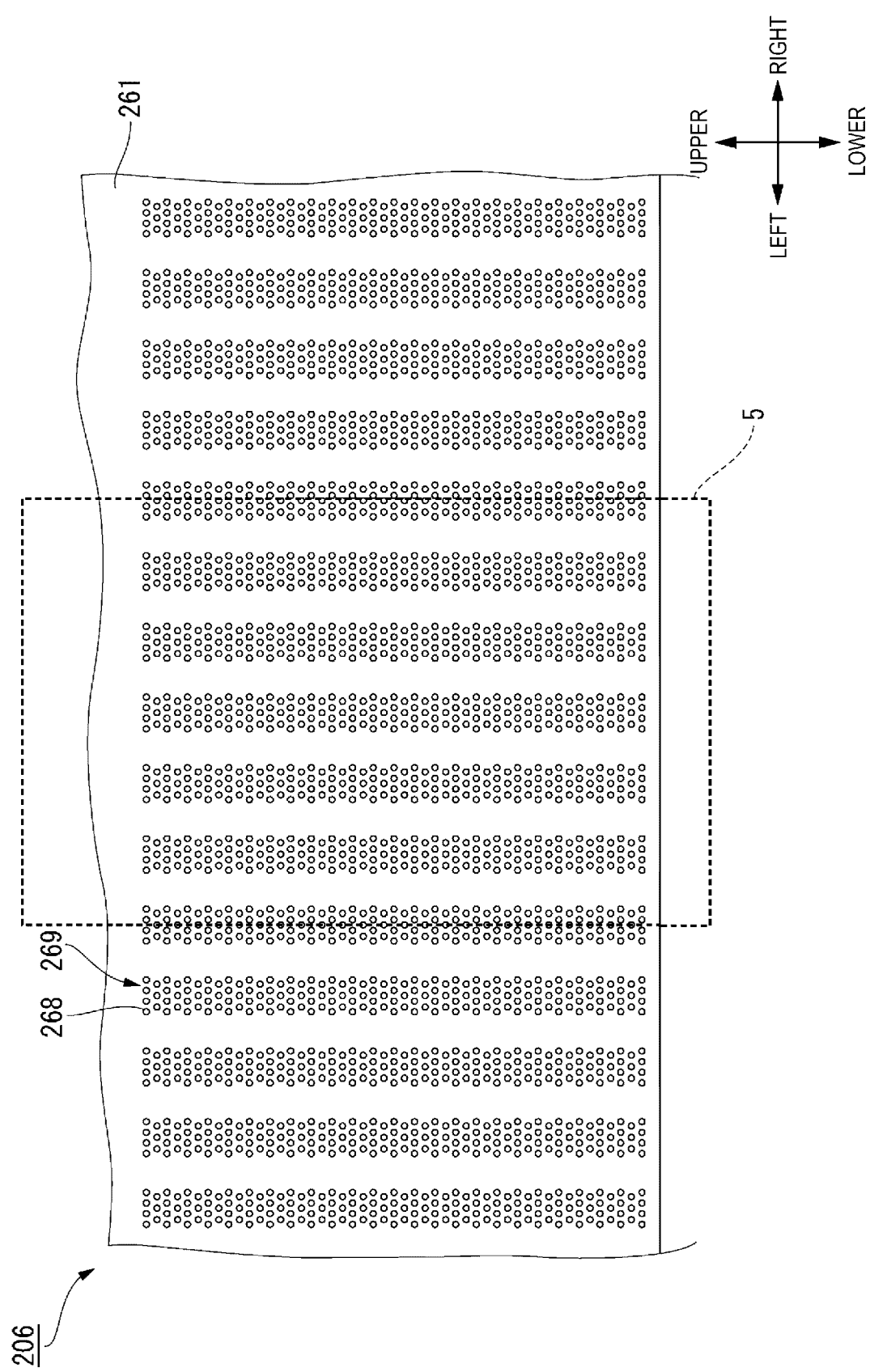

FIG.23
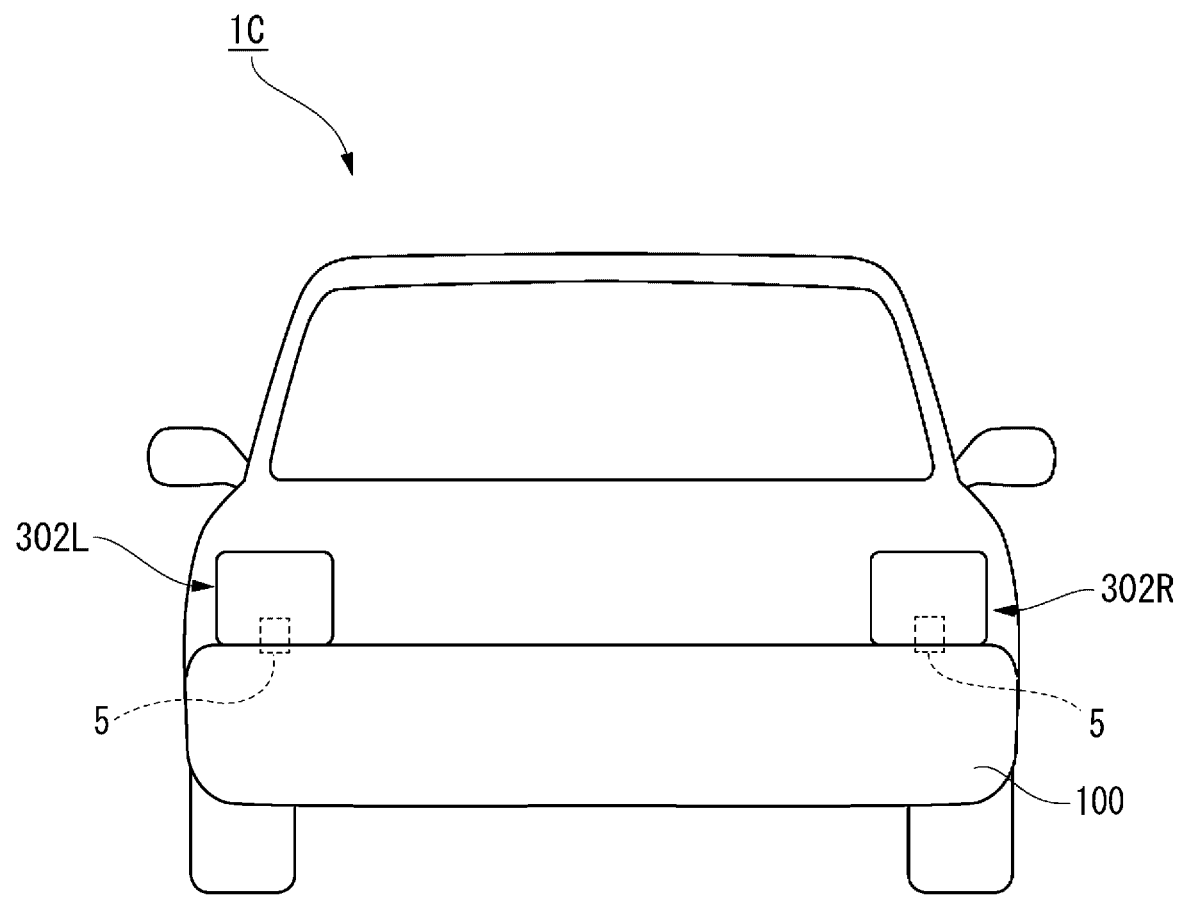
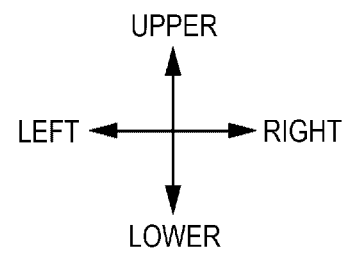

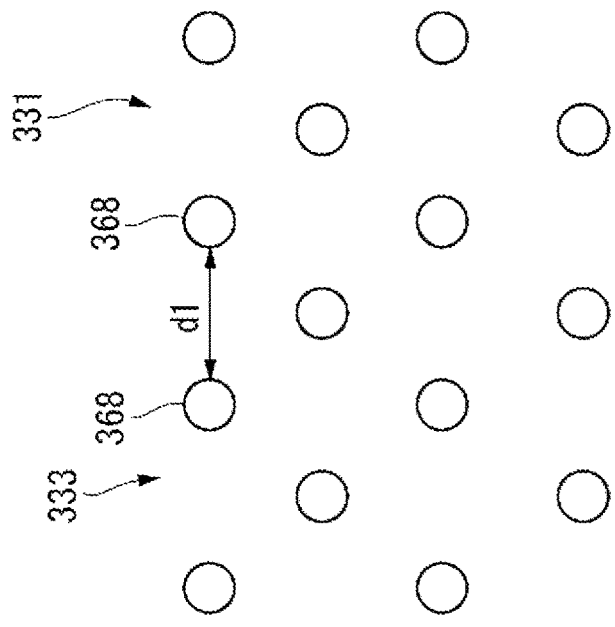
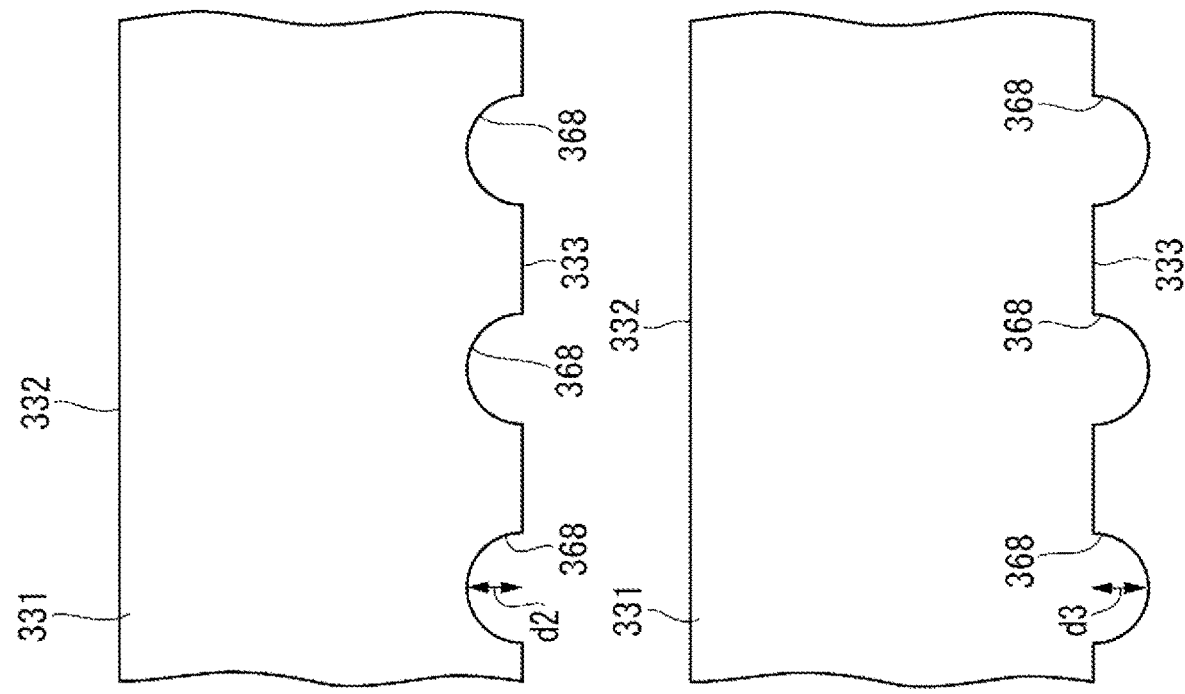

FIG.30
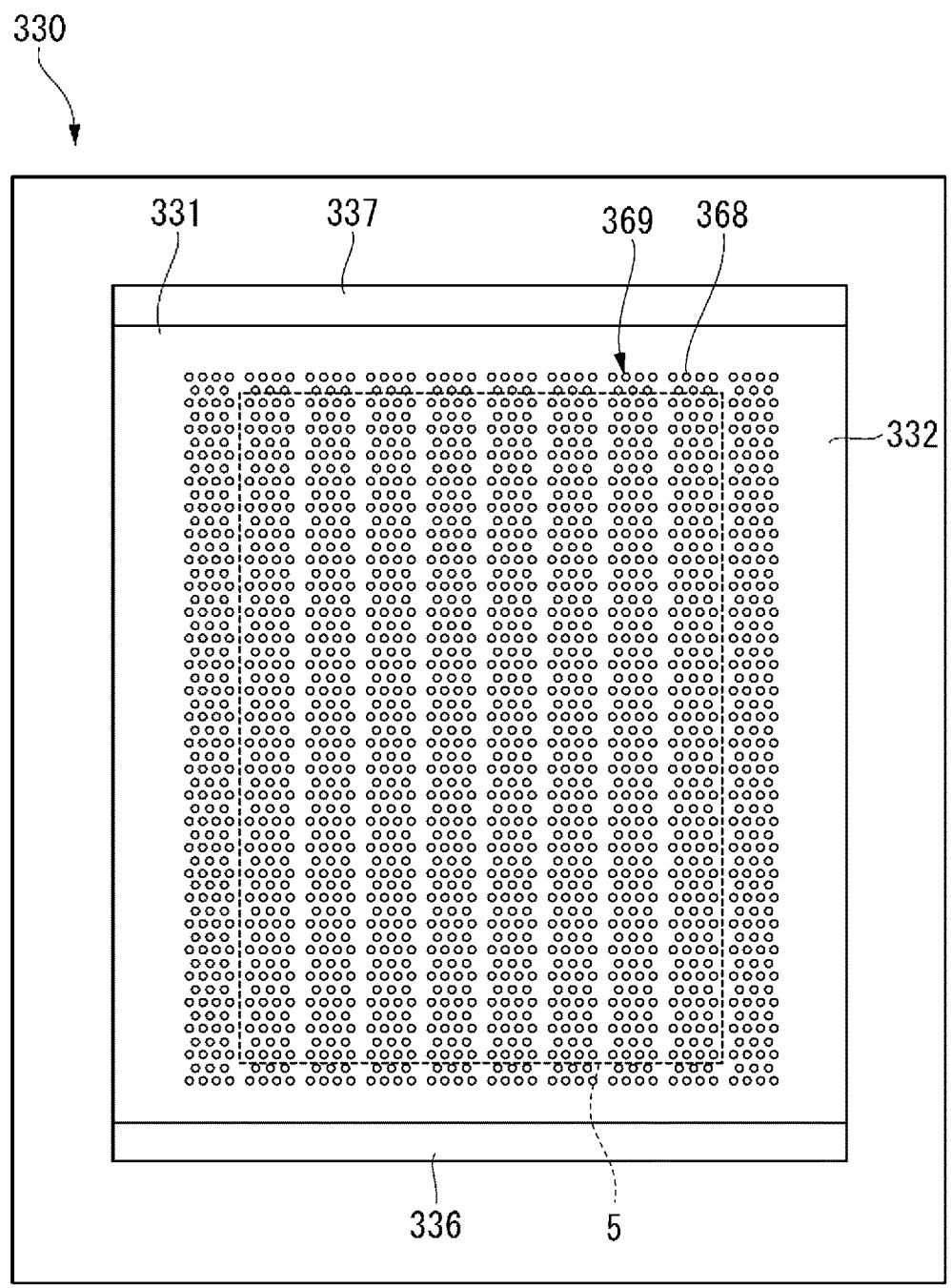
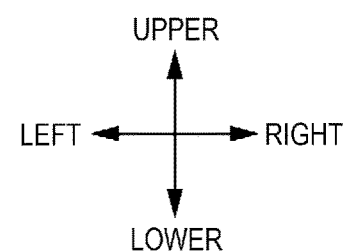

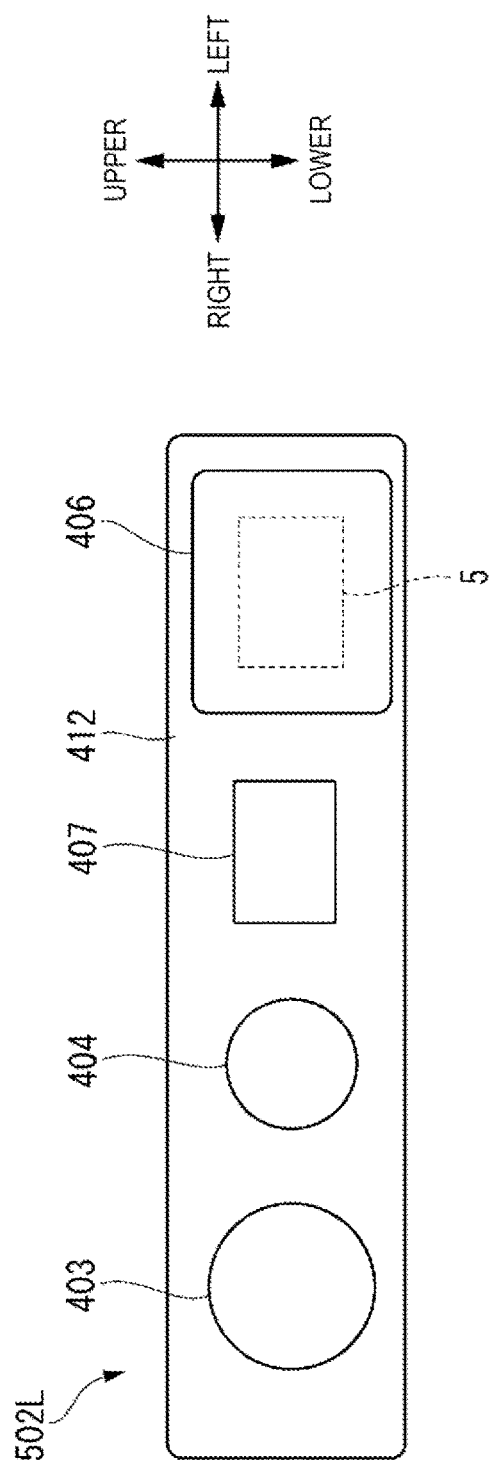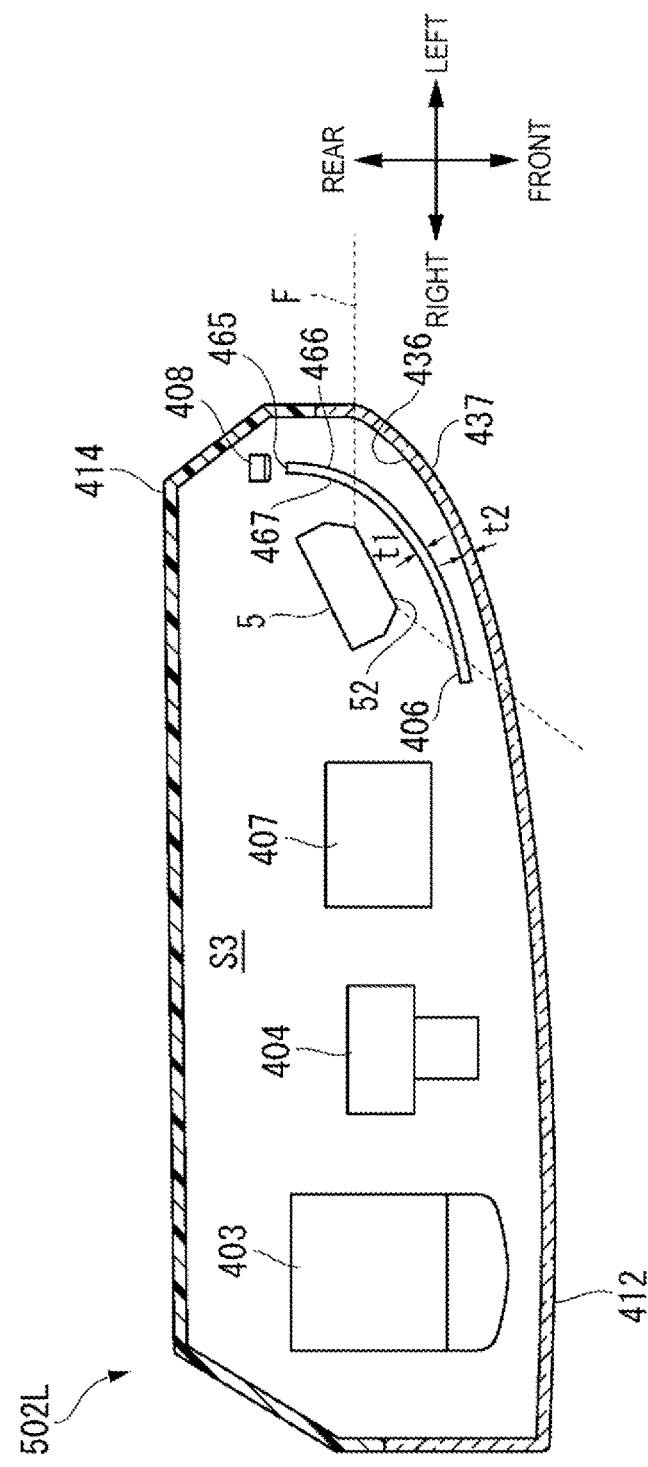
FIG.33A
FIG.33B

FIG.40
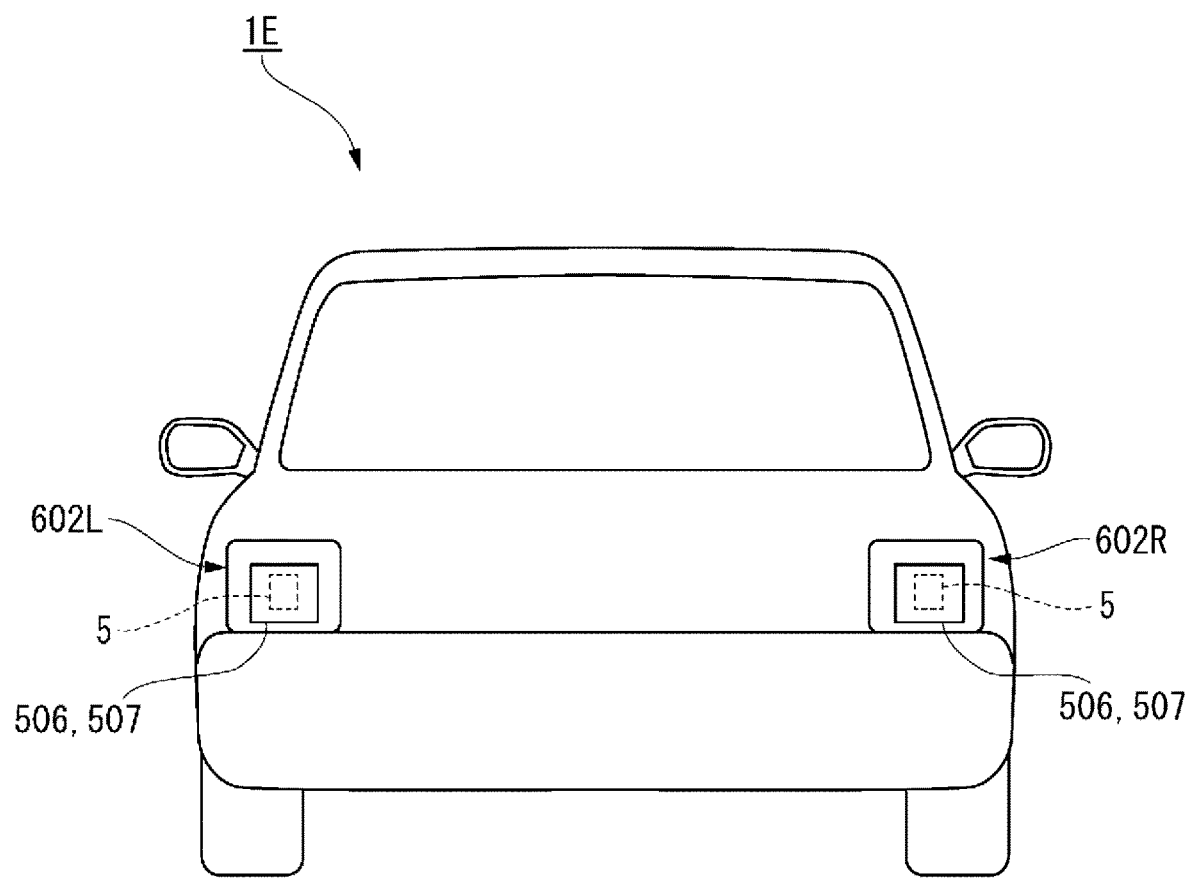
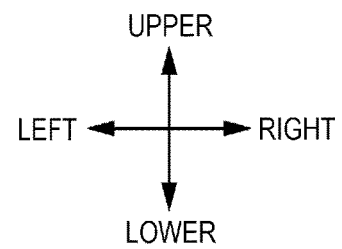

FIG.41
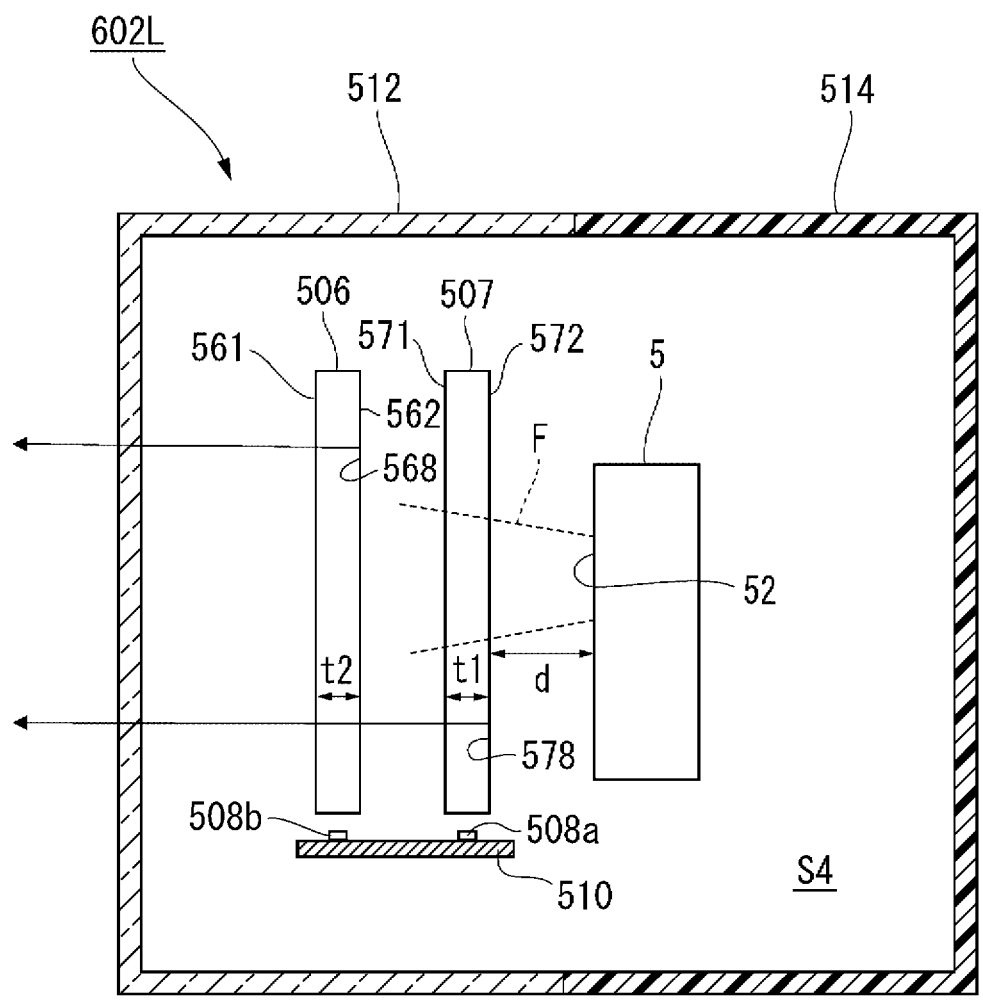
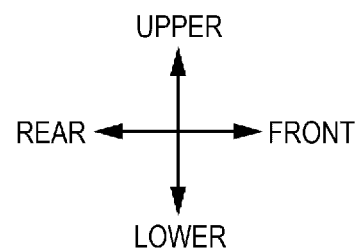

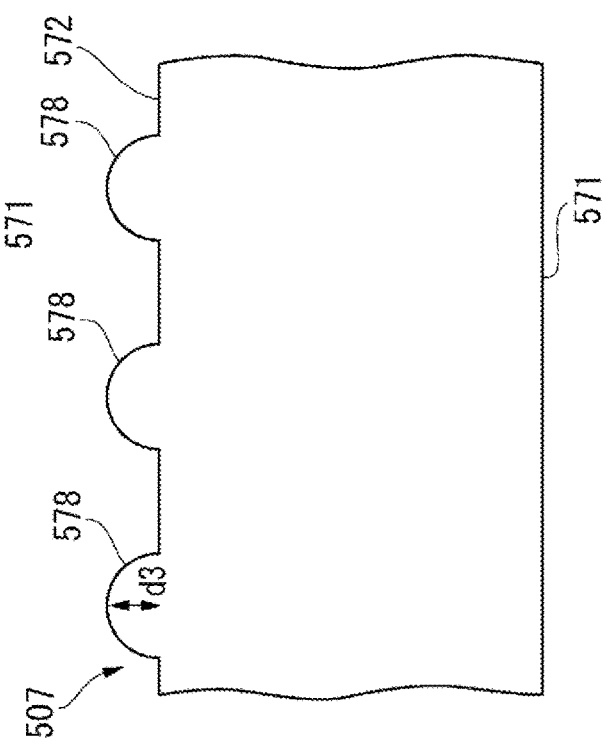
FIG. 42B
FIG. 42C
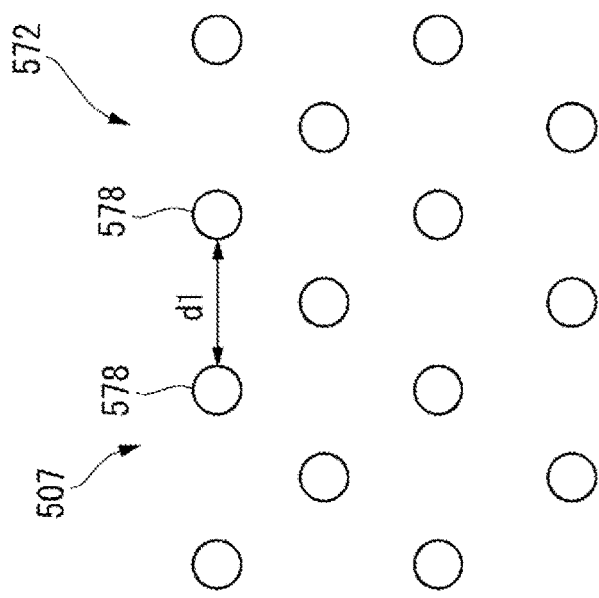
FIG. 42A

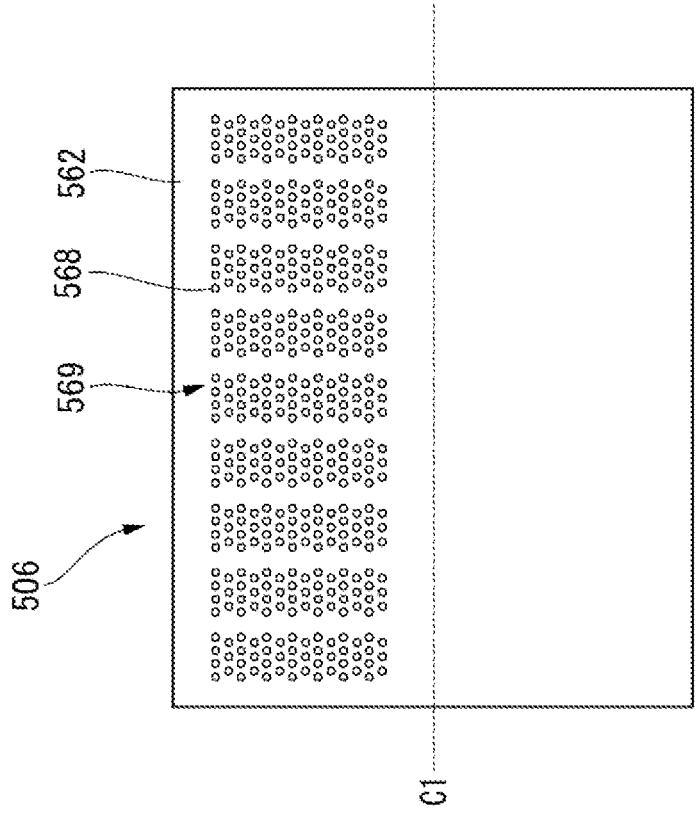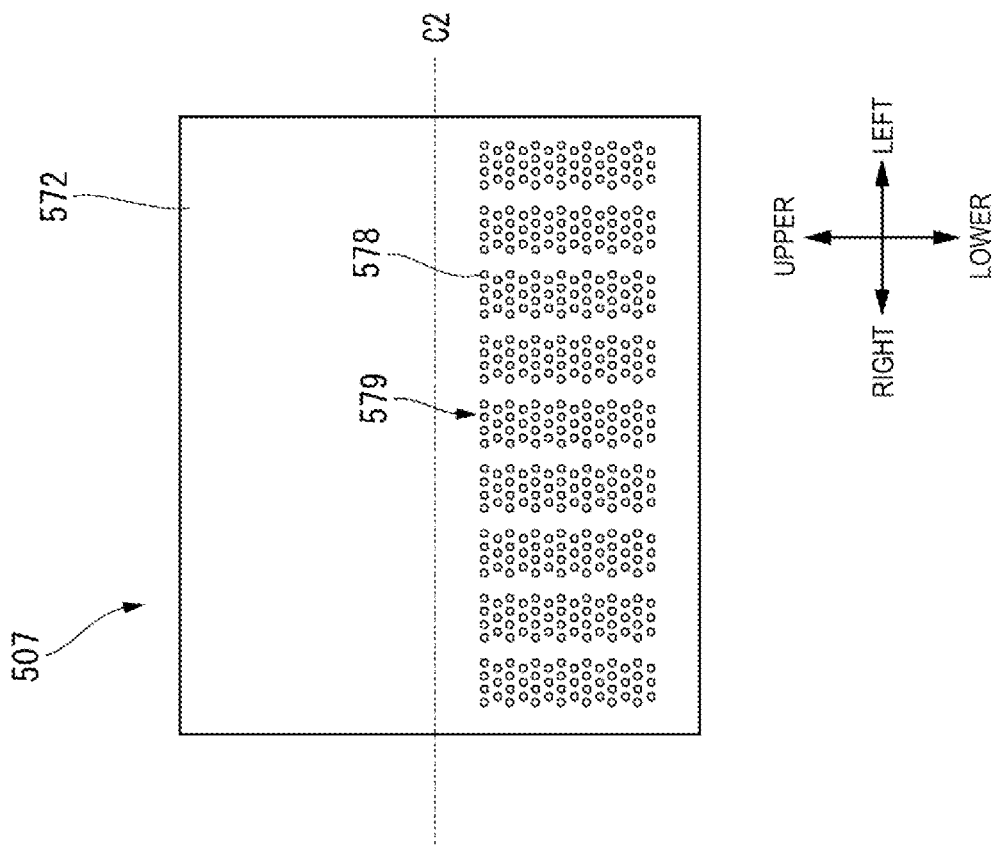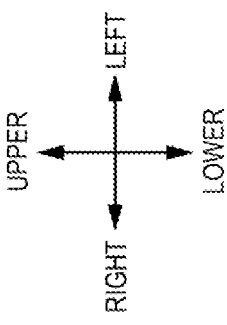

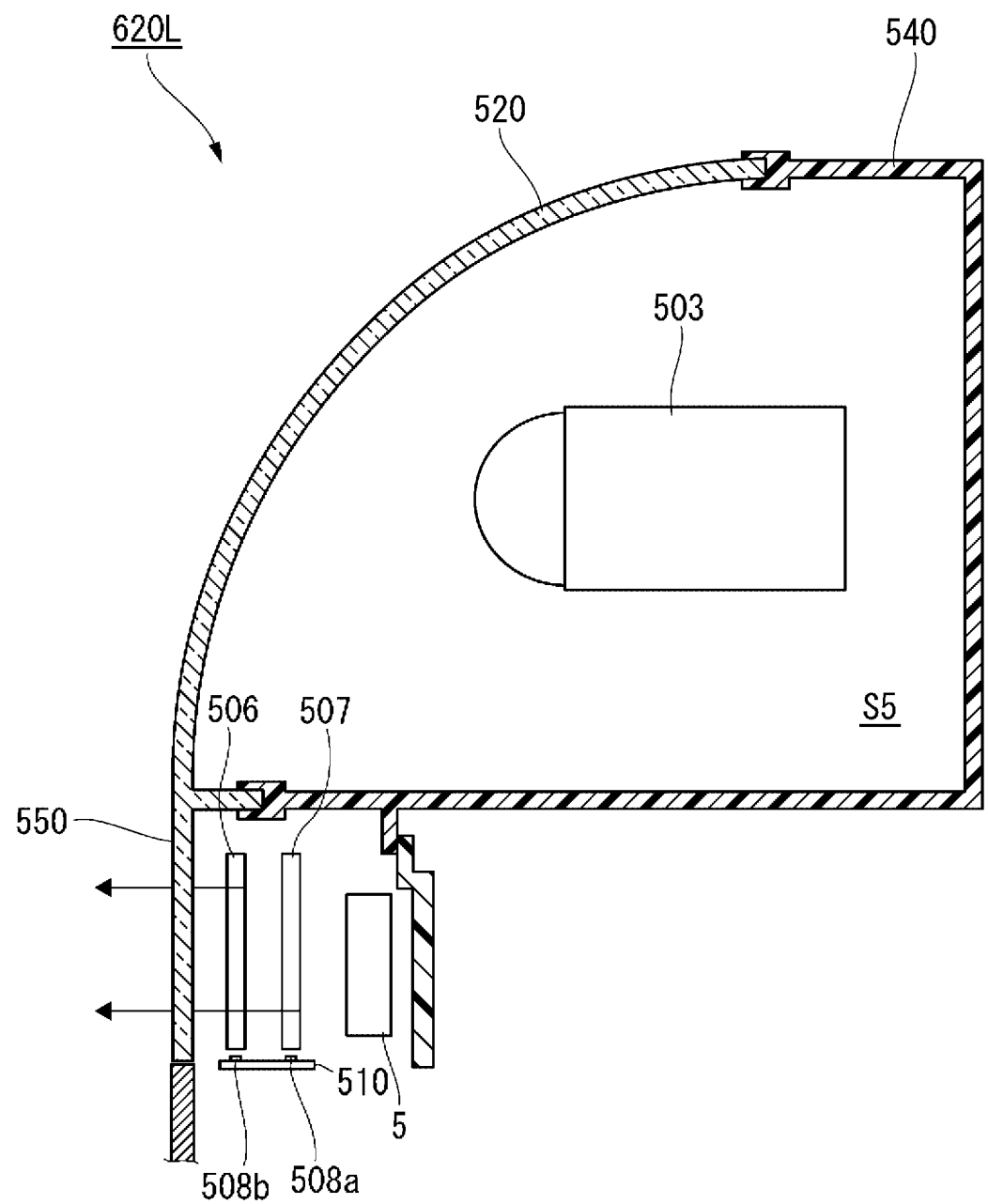
FIG.44
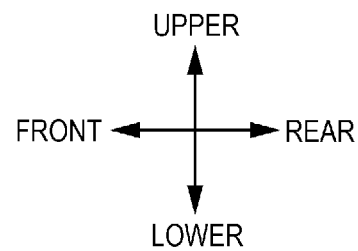

FIG.45
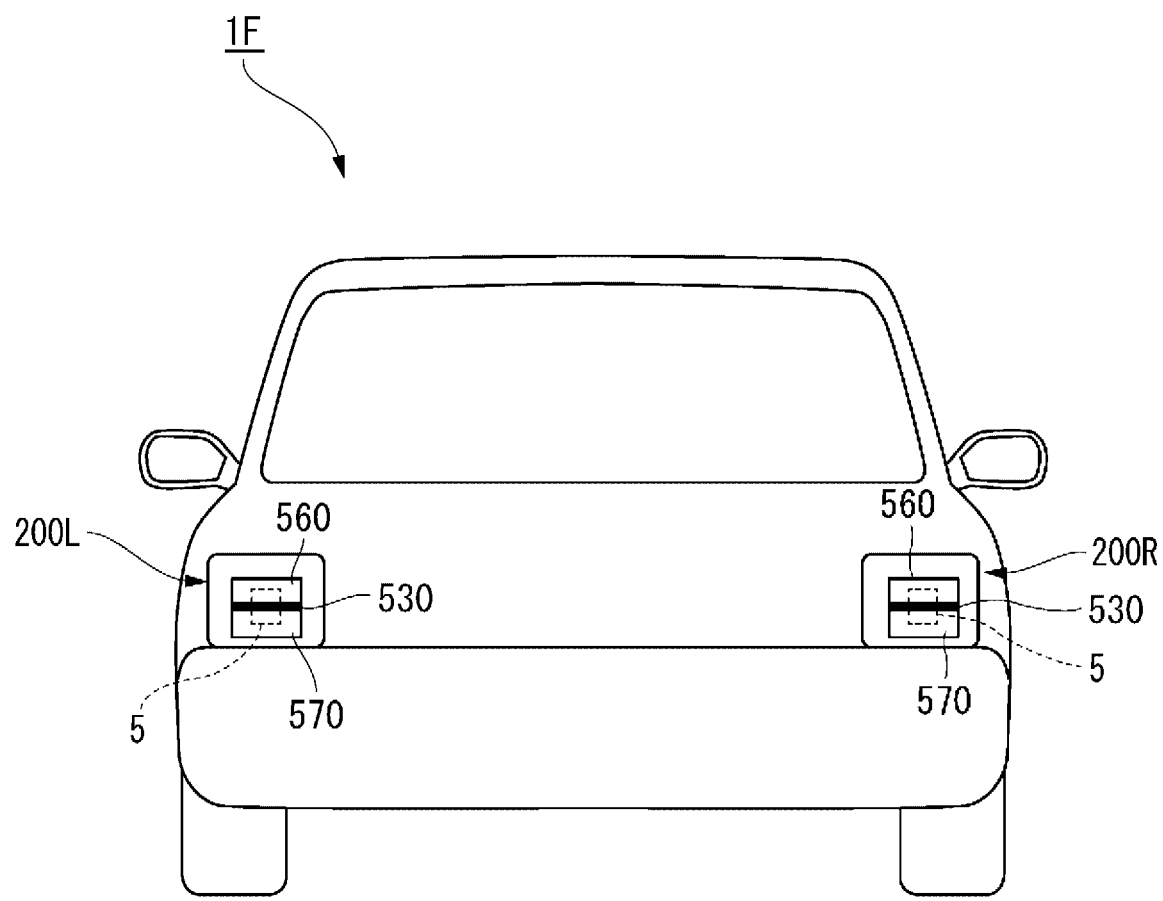
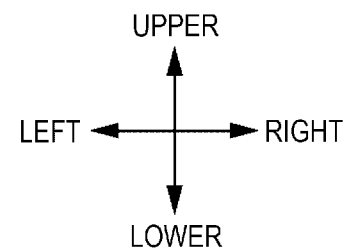

FIG.46
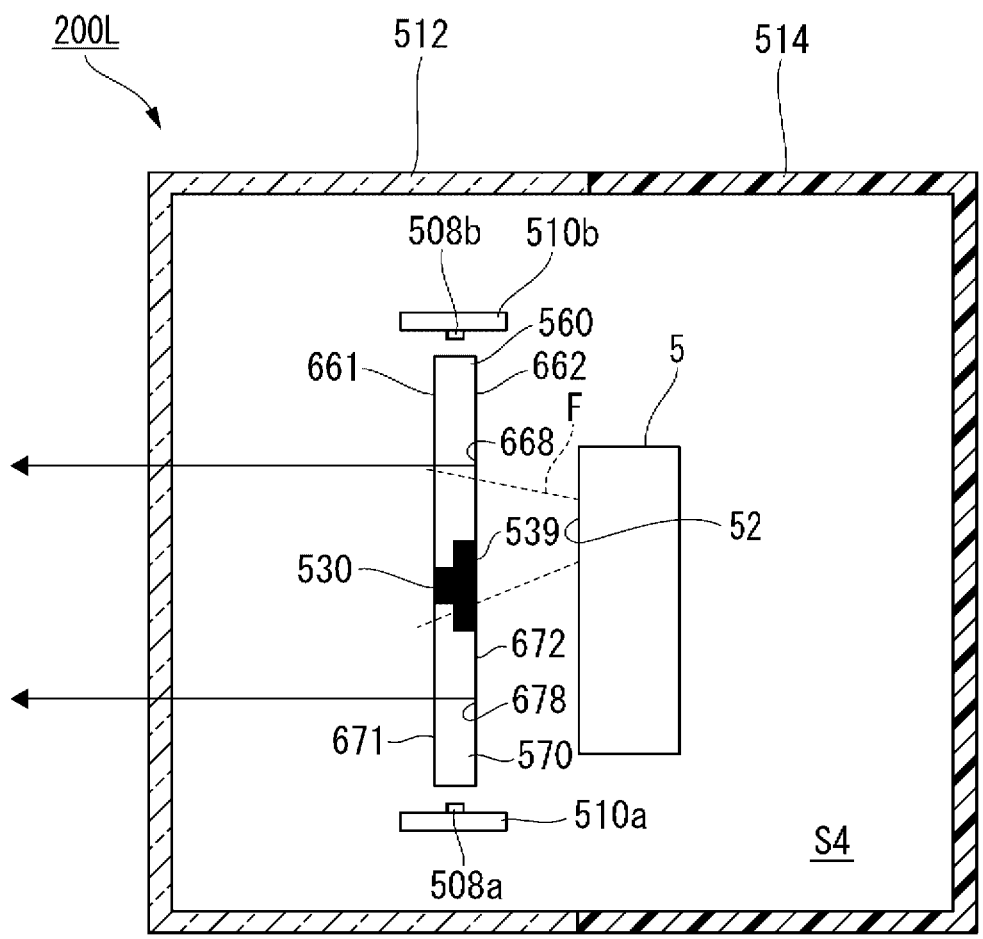
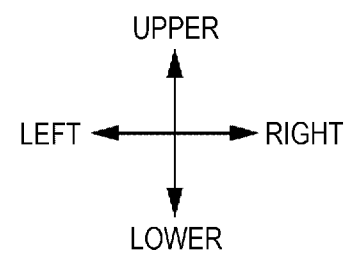

FIG.48
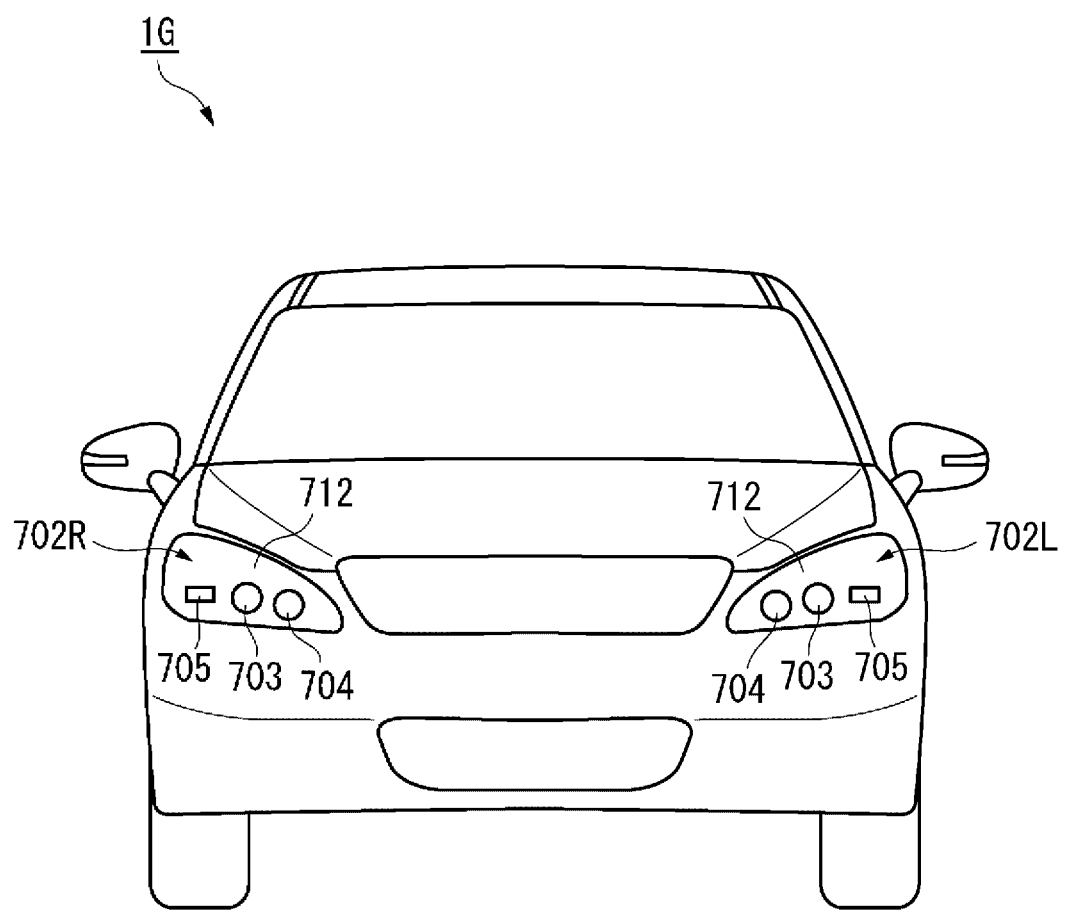
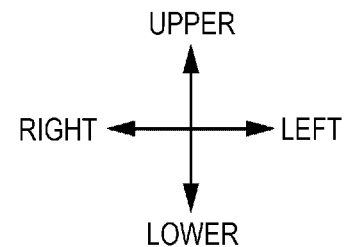

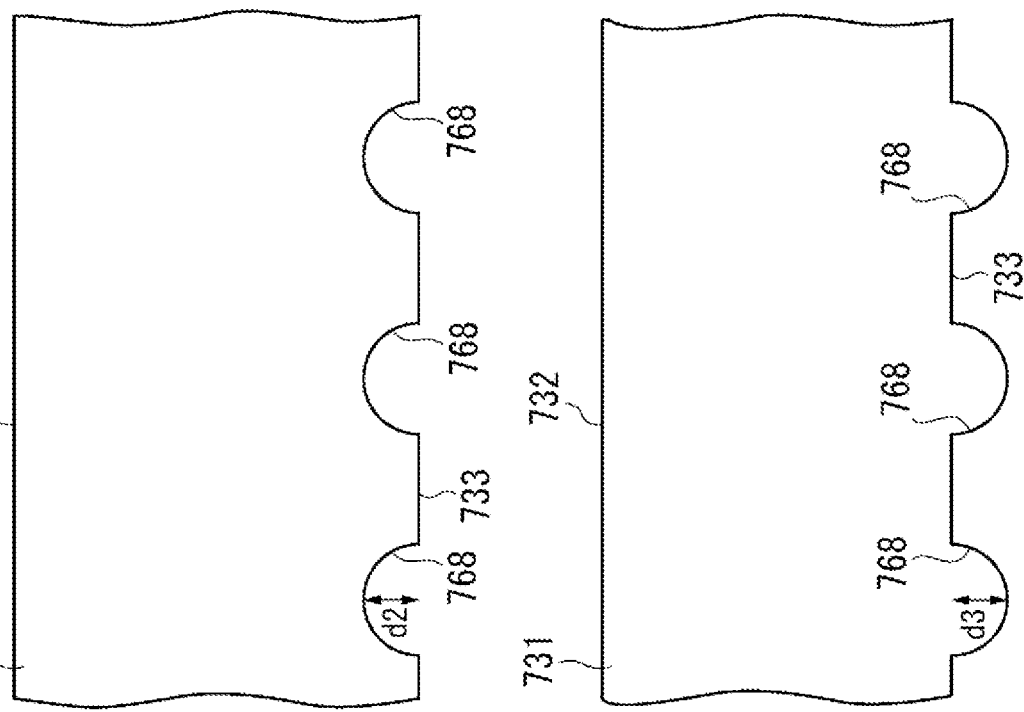
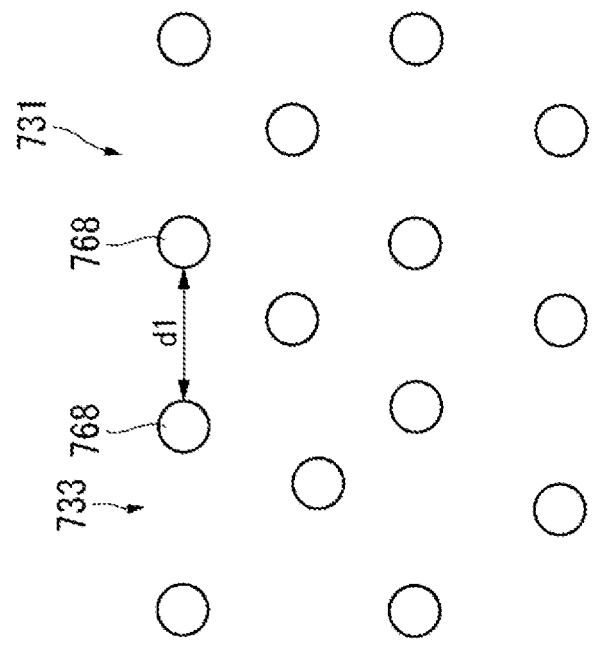
FIG.51A FIG.51B FIG.51C

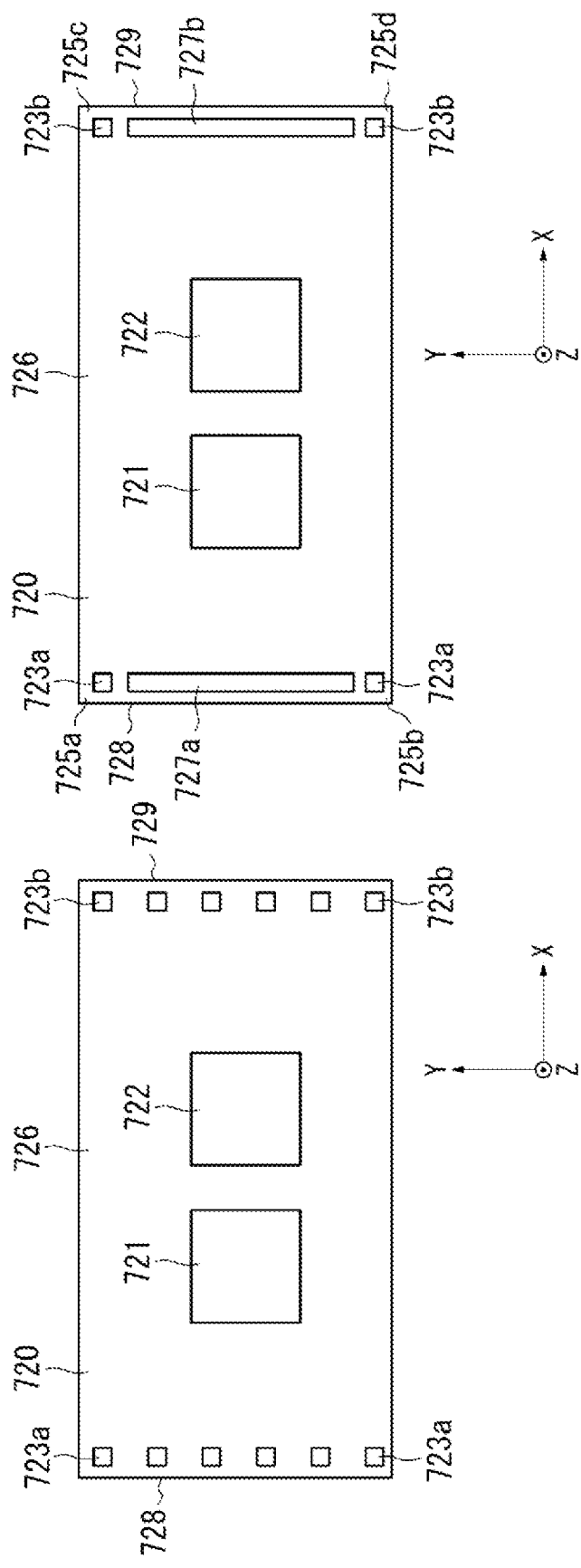

VEHICLE LIGHT FITTING, RADAR MODULE, RADAR, AND VEHICLE

The present disclosure relates to a vehicle lamp, a radar module, a radar, and a vehicle.

BACKGROUND ART

It is known a technique of mounting a radar such as a millimeter wave radar configured to acquire data indicating a surrounding environment outside a vehicle to a vehicle lamp (for example, see Patent Literature 1). In Patent Literature 1, a millimeter wave radar is disposed in a lamp chamber of a vehicle lamp, and a non-transparent design portion is provided at a part of a transparent lamp cover in order to hide the millimeter wave radar from the outside of the vehicle.

CITATION LIST

Patent Literature

Patent Literature 1: JP-A-2010-137758

SUMMARY OF INVENTION

Technical Problem

In the vehicle lamp disclosed in Patent Literature 1, although the millimeter wave radar disposed in the lamp chamber can be hidden by the non-transparent design portion provided at the transparent lamp cover, there is a problem that the design of an appearance of the vehicle lamp may be lowered due to the design portion. In this manner, the design of an appearance of a vehicle lamp on which a radar such as a millimeter wave radar is mounted needs to be further improved.

An object of the present disclosure is to further improve the design of an appearance of a vehicle lamp on which a radar is mounted. Further, an object of the present disclosure is to improve the design of an appearance of a radar module and a radar.

Solution to Problem

According to an aspect of the present disclosure, there is provided a vehicle lamp. The vehicle lamp includes:
 a lamp housing;
 a lamp cover that covers an opening of the lamp housing;
 an illumination unit disposed in a lamp chamber formed by the lamp housing and the lamp cover;
 a radar configured to acquire radar data indicating a surrounding environment of a vehicle by emitting radio waves to the outside of the vehicle; and
 a light guide member that is disposed in a manner of facing the radar so as to hide at least a part of the radar from the outside of the vehicle, and is configured to transmit radio waves emitted from the radar.

The radar is disposed outside the lamp chamber. The light guide member is configured to emit light toward the outside of the vehicle.

According to the above configuration, at least a part of the radar can be hidden from the outside of the vehicle by the light guide member, and light is emitted from the light guide member toward the outside. In this manner, the design of an appearance of the vehicle lamp can be improved by the light guide member. Further, since the radar is disposed outside the lamp chamber, it is possible to suitably prevent operation performance of the radar from being adversely affected by heat generated from the illumination unit disposed inside the housing.

In this manner, it is possible to improve the design of an appearance of the vehicle lamp and improve reliability of the radar mounted on the vehicle lamp.

According to an aspect of the present disclosure, there is provided a vehicle lamp. The vehicle lamp includes:
 a lamp housing;
 a lamp cover that covers an opening of the lamp housing;
 an illumination unit disposed in a lamp chamber formed by the lamp housing and the lamp cover; and
 a light guide member that is disposed in a manner of facing a radar so as to hide, from the outside of a vehicle, at least a part of the radar disposed outside the lamp chamber so as to acquire radar data indicating a surrounding environment of the vehicle by emitting radio waves toward the outside of the vehicle and that is configured to transmit the radio waves emitted from the radar.

The light guide member is configured to emit light toward the outside of the vehicle.

According to another aspect of the present disclosure, there is provided a vehicle lamp. The vehicle lamp includes:
 a lamp housing;
 a lamp cover that covers an opening of the lamp housing;
 an illumination unit disposed in a lamp chamber formed by the lamp housing and the lamp cover;
 a radar configured to acquire radar data indicating a surrounding environment of a vehicle by emitting radio waves to the outside of the vehicle; and
 a light guide member that is disposed in a manner of facing the radar so as to hide at least a part of the radar from the outside of the vehicle, and is configured to transmit the radio waves emitted from the radar.

The light guide member includes:
 a light emitting portion configured to emit light toward the outside of the vehicle, and
 a colored resin portion that is formed integrally with the light emitting portion and is formed of a non-transparent resin.

The light emitting portion has
 a first surface that faces the radar,
 a second surface located at a side opposite to the first surface, and
 a plurality of steps formed on at least one of the first surface and the second surface.

The plurality of steps are configured to emit light spreading inside the light guide member toward the outside of the vehicle.

No convex portion is formed at a boundary between the light emitting portion and the colored resin portion.

According to the above configuration, at least a part of the radar can be hidden from the outside of the vehicle by the light guide member. Further, the light emitting portion of the light guide member emits light toward the outside of the vehicle, and the design of the light guide member can be further improved by the colored resin portion formed integrally with the light emitting portion. In this manner, the design of the appearance of the vehicle lamp can be further improved by the light guide member.

Furthermore, no convex portion is formed at the boundary between the light emitting portion and the colored resin portion that form the light guide member. Therefore, even when the boundary presents in the field of view of the radar, it is possible to suitably prevent the radio waves reflected by the light guide member from adversely affecting the radar data. In this manner, it is possible to suitably prevent the light guide member including the light emitting portion and the colored resin portion from adversely affecting reliability of the radar data.

According to another aspect of the present disclosure, there is provided a vehicle lamp. The vehicle lamp includes:
a lamp housing;
a lamp cover that covers an opening of the lamp housing;
an illumination unit disposed in a lamp chamber formed by the lamp housing and the lamp cover;
a radar configured to acquire radar data indicating a surrounding environment of a vehicle by emitting radio waves to the outside of the vehicle; and
a light guide member that is disposed in a manner of facing the radar so as to hide at least a part of the radar from the outside of the vehicle, and is configured to transmit the radio waves emitted from the radar.

The light guide member is configured to emit light toward the outside of the vehicle, and is formed integrally with the lamp cover.

The light guide member has
a first surface that faces the radar,
a second surface located at a side opposite to the first surface, and
a plurality of steps formed on at least one of the first surface and the second surface.

The plurality of steps are configured to emit light spreading inside the light guide member toward the outside of the vehicle.

According to the above configuration, at least a part of the radar can be hidden from the outside of the vehicle by the light guide member, and light is emitted from the light guide member toward the outside. In this manner, the design of an appearance of the vehicle lamp can be improved by the light guide member. Further, since the light guide member is formed integrally with the lamp cover, it is possible to save time and effort for attaching the light guide member to the vehicle lamp, and it is possible to further improve the design of the appearance of the vehicle lamp by integrating the light guide member and the lamp cover.

According to another aspect of the present disclosure, there is provided a vehicle lamp. The vehicle lamp includes:
a lamp housing;
a lamp cover that covers an opening of the lamp housing;
an illumination unit disposed in a lamp chamber formed by the lamp housing and the lamp cover;
a radar configured to acquire radar data indicating a surrounding environment of a vehicle by emitting radio waves to the outside of the vehicle; and
a light guide member that is disposed in a manner of facing the radar so as to hide at least a part of the radar from the outside of the vehicle, and is configured to transmit the radio waves emitted from the radar.

The light guide member is configured to emit light toward the outside of the vehicle.

The light guide member has
a first surface that faces the radar,
a second surface located at a side opposite to the first surface, and
a plurality of steps formed on at least one of the first surface and the second surface.

The plurality of steps are configured to emit light spreading inside the light guide member toward the outside of the vehicle.

A decorative film is provided on the first surface of the light guide member.

The decorative film is configured to transmit radio waves emitted from the radar and hide at least a part of the radar.

The decorative film does not contain a metal material.

According to the above configuration, at least a part of the radar can be hidden from the outside of the vehicle by the light guide member and the decorative film, and light is emitted from the light guide member toward the outside. In this manner, it is possible to improve the design of the appearance of the vehicle lamp by the light emission of the light guide member.

In addition, even when the light guide member does not emit light, the radar can be hidden from the outside of the vehicle by the decorative film, so that the radar can be reliably hidden from the outside of the vehicle regardless whether the light guide member emits light.

Furthermore, since the decorative film does not contain a metal material, it is possible to prevent the decorative film from adversely affecting the radio waves emitted from the radar. Therefore, it is possible to suitably prevent the reliability of the radar data from being lowered by the decorative film.

According to an aspect of the present disclosure, there is provided a radar module mounted on a vehicle lamp. The radar module includes:
a radar configured to acquire radar data indicating a surrounding environment of a vehicle by emitting radio waves to the outside of the vehicle;
a light guide member that is disposed in a manner of facing the radar so as to hide the radar from the outside of the vehicle and configured to transmit the radio waves emitted from the radar; and
a support member that is fixed to the light guide member and supports the radar.

The light guide member is configured to emit light toward the outside of the vehicle.

According to the above configuration, at least a part of the radar can be hidden from the outside of the vehicle by the light guide member, and light is emitted from the light guide member toward the outside. In this manner, the design of the appearance of the radar module can be improved by the light guide member.

According to an aspect of the present disclosure, there is provided a vehicle. The vehicle includes:
a vehicle lamp; and
a radar module mounted on the vehicle lamp.
The vehicle lamp includes
a lamp housing;
a lamp cover that covers an opening of the lamp housing; and
an illumination unit disposed in a lamp chamber formed by the lamp housing and the lamp cover.

According to another aspect of the present disclosure, there is provided a vehicle lamp. The vehicle lamp includes:
a lamp housing;
a lamp cover that covers an opening of the lamp housing;
an illumination unit disposed in a lamp chamber formed by the lamp housing and the lamp cover;
at least one sensor that is disposed in the lamp chamber and configured to acquire sensor data indicating a surrounding environment of a vehicle;
a radar configured to acquire radar data indicating a surrounding environment of a vehicle by emitting radio waves to the outside of the vehicle; and
a light guide member that is disposed in a manner of facing the radar so as to hide at least a part of the radar from the outside of the vehicle, and is configured to transmit the radio waves emitted from the radar.

The light guide member is configured to emit light toward the outside of the vehicle.

The light guide member has
a first surface that faces the radar,
a second surface located at a side opposite to the first surface, and
a plurality of steps formed on at least one of the first surface and the second surface.

The plurality of steps are configured to emit light spreading inside the light guide member toward the outside of the vehicle.

According to the above configuration, at least a part of the radar can be hidden from the outside of the vehicle by the light guide member, and light from the light guide member is emitted toward the outside of the vehicle. As described above, the light guide member can improve the design of the appearance of the vehicle lamp on which at least one sensor and the radar are mounted.

According to another aspect of the present disclosure, there is provided a vehicle lamp. The vehicle lamp includes:
a lamp housing;
a lamp cover that covers an opening of the lamp housing;
a radar that is disposed inside a lamp chamber formed by the lamp housing and the lamp cover and configured to acquire radar data indicating a surrounding environment of a vehicle by emitting radio waves to the outside of the vehicle;
a first light guide member that is disposed in the lamp chamber in a manner of facing the radar and configured to transmit the radio waves emitted from the radar; and
a second light guide member that is disposed in the lamp chamber in a manner of facing the radar and configured to transmit the radio waves emitted from the radar.

The first light guide member is configured to emit first light toward the outside of the vehicle.

The second light guide member is configured to emit second light toward the outside of the vehicle.

According to the above configuration, the radar can be hidden from the outside of the vehicle by light emission of the two light guide members, that is, the first light guide member and the second light guide member. In this manner, the design of the appearance of the vehicle lamp on which the radar is mounted can be further improved by the two light guide members.

According to another aspect of the present disclosure, there is provided a radar. The radar includes:
a radar housing;
a light emitting radome that covers an opening of the radar housing;
a first circuit board disposed in a space formed by the radar housing and the light emitting radome;
an antenna unit that is disposed on the first circuit board and includes a transmission antenna configured to transmit radio waves to the outside of the radar and a reception antenna configured to receive radio waves reflected by an object present outside of the radar;
a second circuit board that is disposed in the space and electrically connected to the first circuit board; and
at least one light source that is disposed on the second circuit board and configured to emit light toward the light emitting radome.

The light emitting radome has
a first surface that faces the first circuit board,
a second surface located at a side opposite to the first surface, and
a plurality of steps formed on at least one of the first surface and the second surface.

The plurality of steps are configured to emit light spreading through an inner side of the light emitting radome toward the outside of the radar.

According to the above configuration, the light is emitted to the outside of the radar by the plurality of steps formed in the light emitting radome. In this manner, it is possible to improve the design of the appearance of the radar by the light emitting radome that emits light toward the outside. For example, when the radar is mounted on a vehicle, the radar can be positively used as a decorative member for improving the design of the appearance of the vehicle.

There is provided a vehicle including the vehicle lamp.

Advantageous Effects of Invention

According to the present disclosure, it is possible to further improve the design of the appearance of the vehicle lamp on which the radar is mounted. Further, according to the present disclosure, it is possible to improve the design of the appearance of the radar module and the radar.

BRIEF DESCRIPTION OF RENDERINGS

FIG. 1 is a rear view showing a vehicle including a left vehicle lamp and a right vehicle lamp.

FIG. 4A is a front view showing a plurality of steps formed on a light emitting portion of a light guide member. FIG. 4B is a cross sectional view showing a part of the light guide member in a case where the steps formed on the light emitting portion are concave portions. FIG. 4C is a cross sectional view showing a part of the light guide member in a case where the steps formed on the light emitting portion are convex portions.

Figure 5:
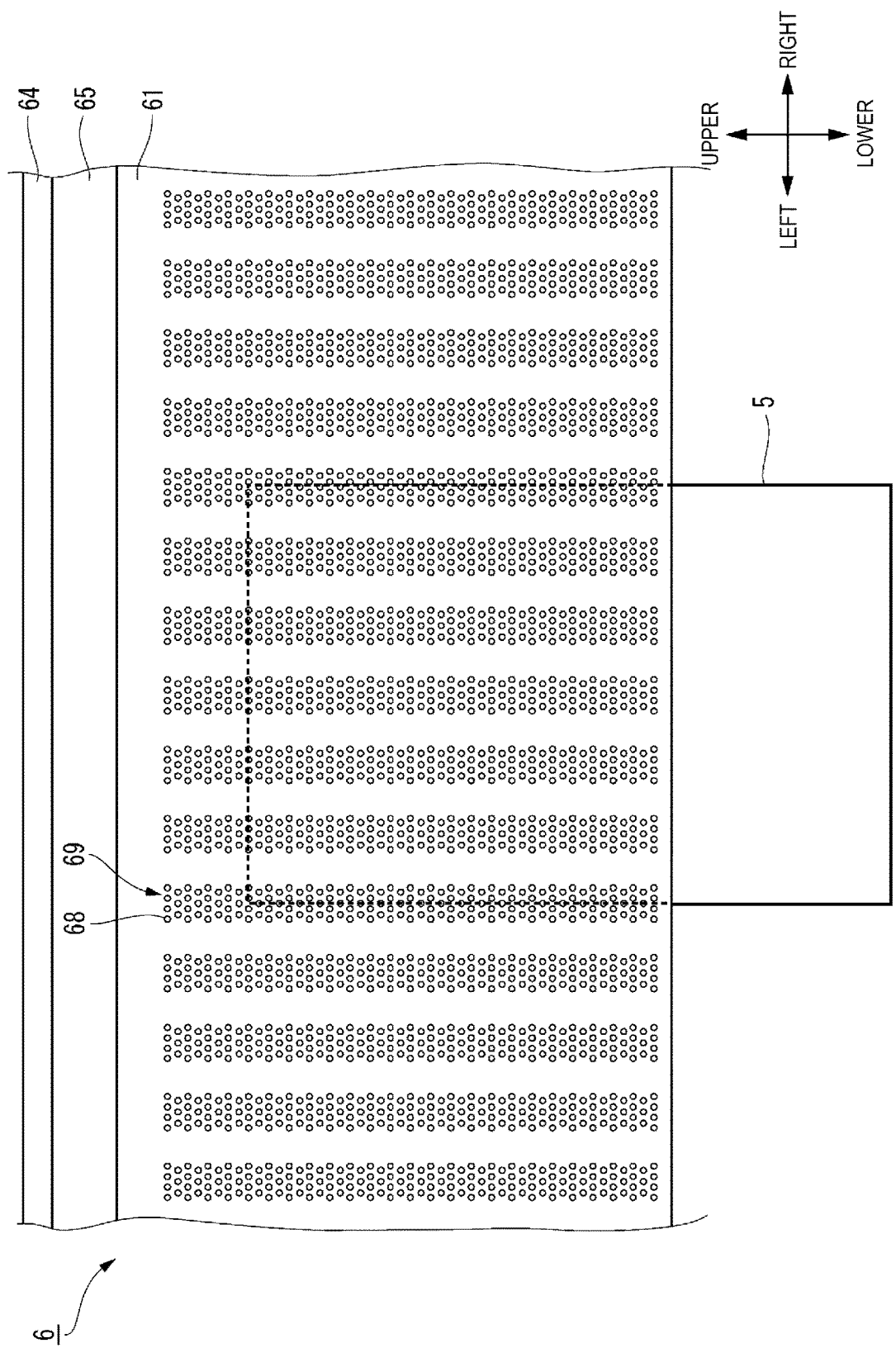

FIG. 5 is a front view schematically showing only the light guide member and the radar.

Figure 6:
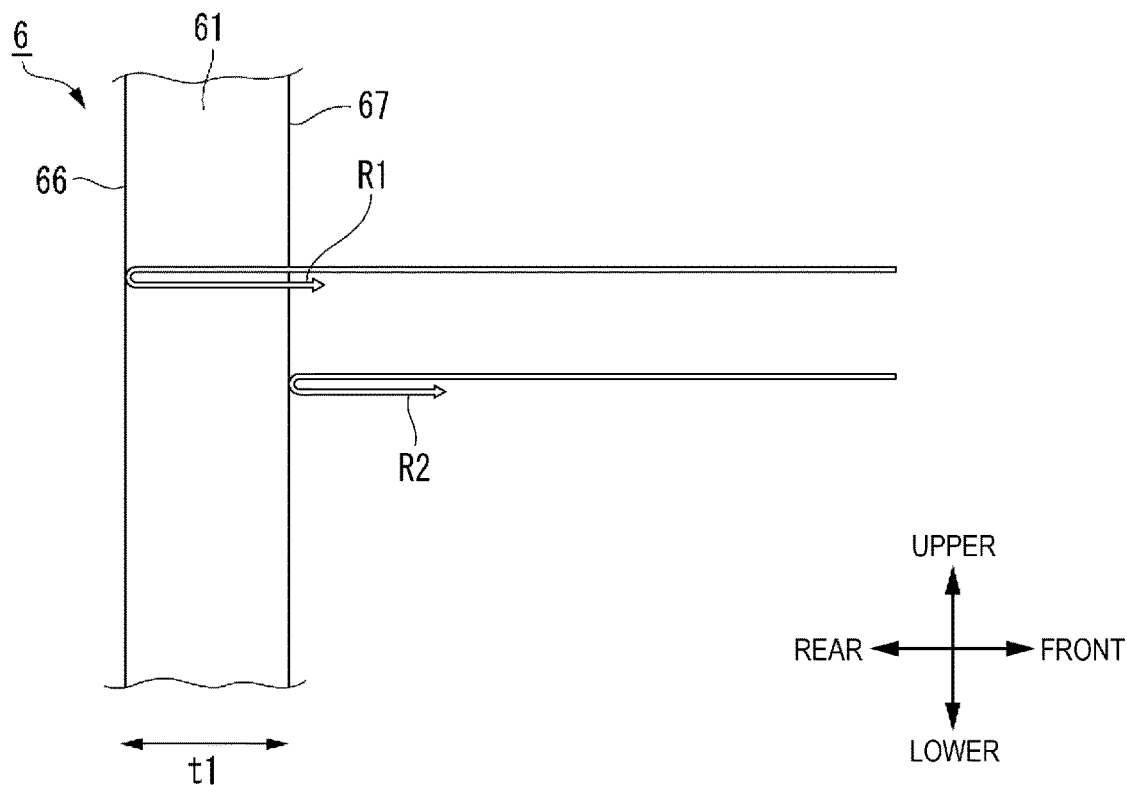

FIG. 6 is a view showing radio waves reflected by the light emitting portion of the light guide member.

Figure 7:
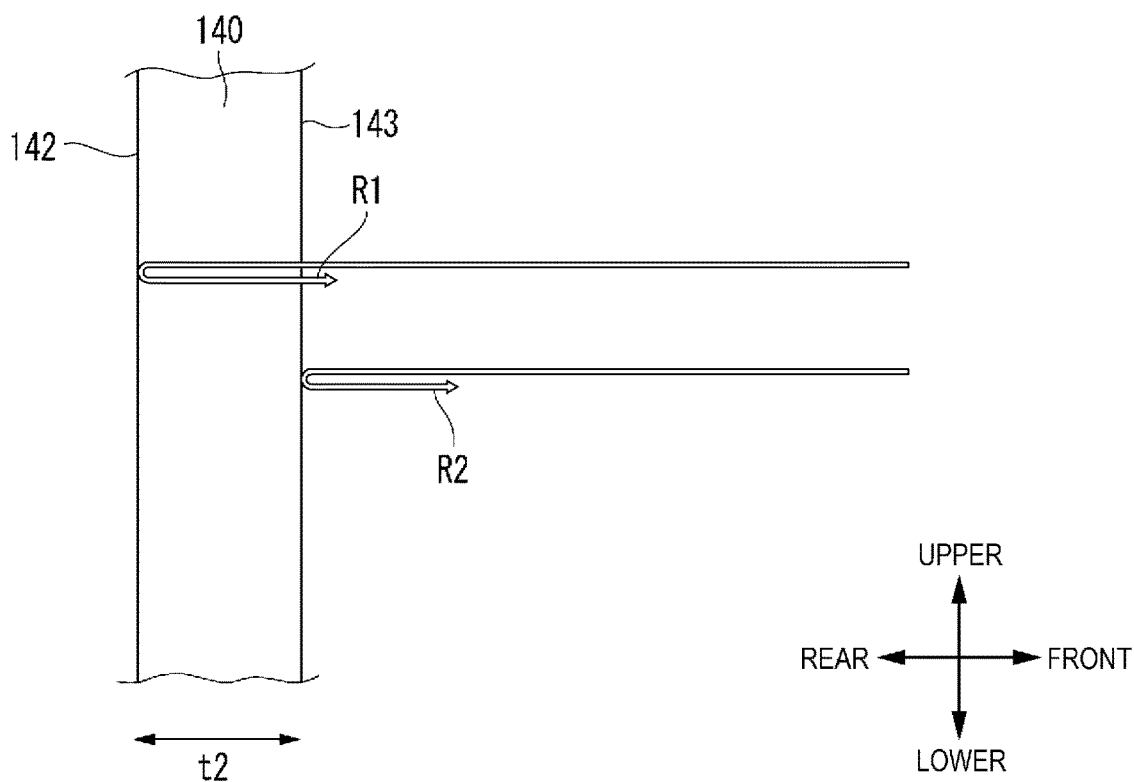

FIG. 7 is a view showing radio waves reflected by a lower extending portion of a lamp housing that faces the radar.

Figure 8:
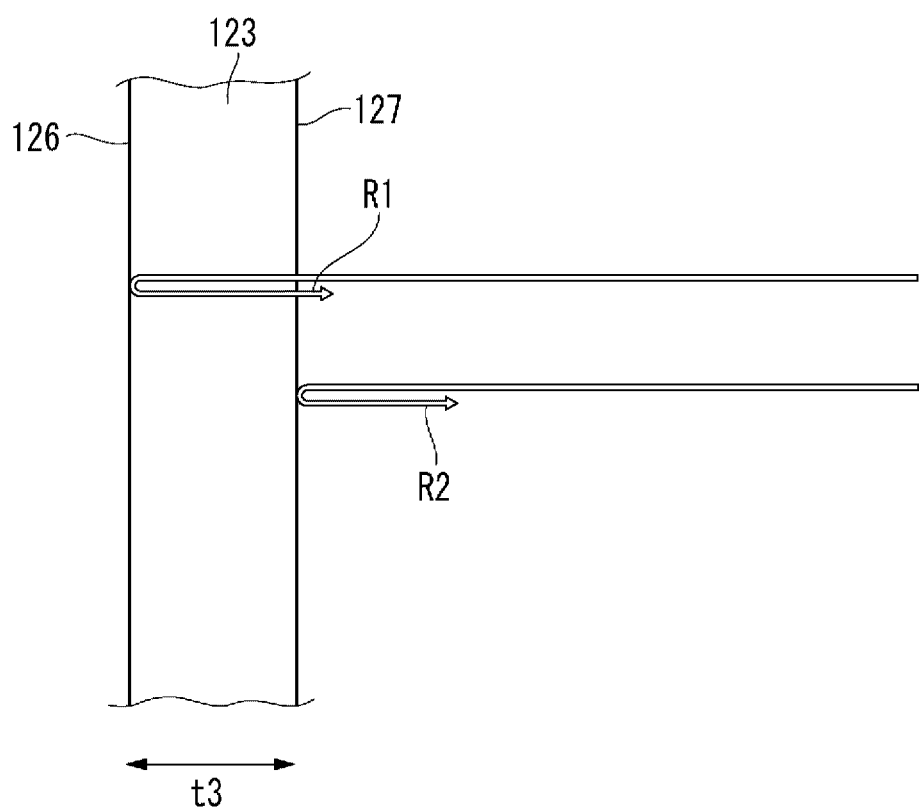

FIG. 8 is a view showing radio waves reflected by a lower light transmitting portion of the lamp cover that faces the light emitting portion of the light guide member.

Figure 9:
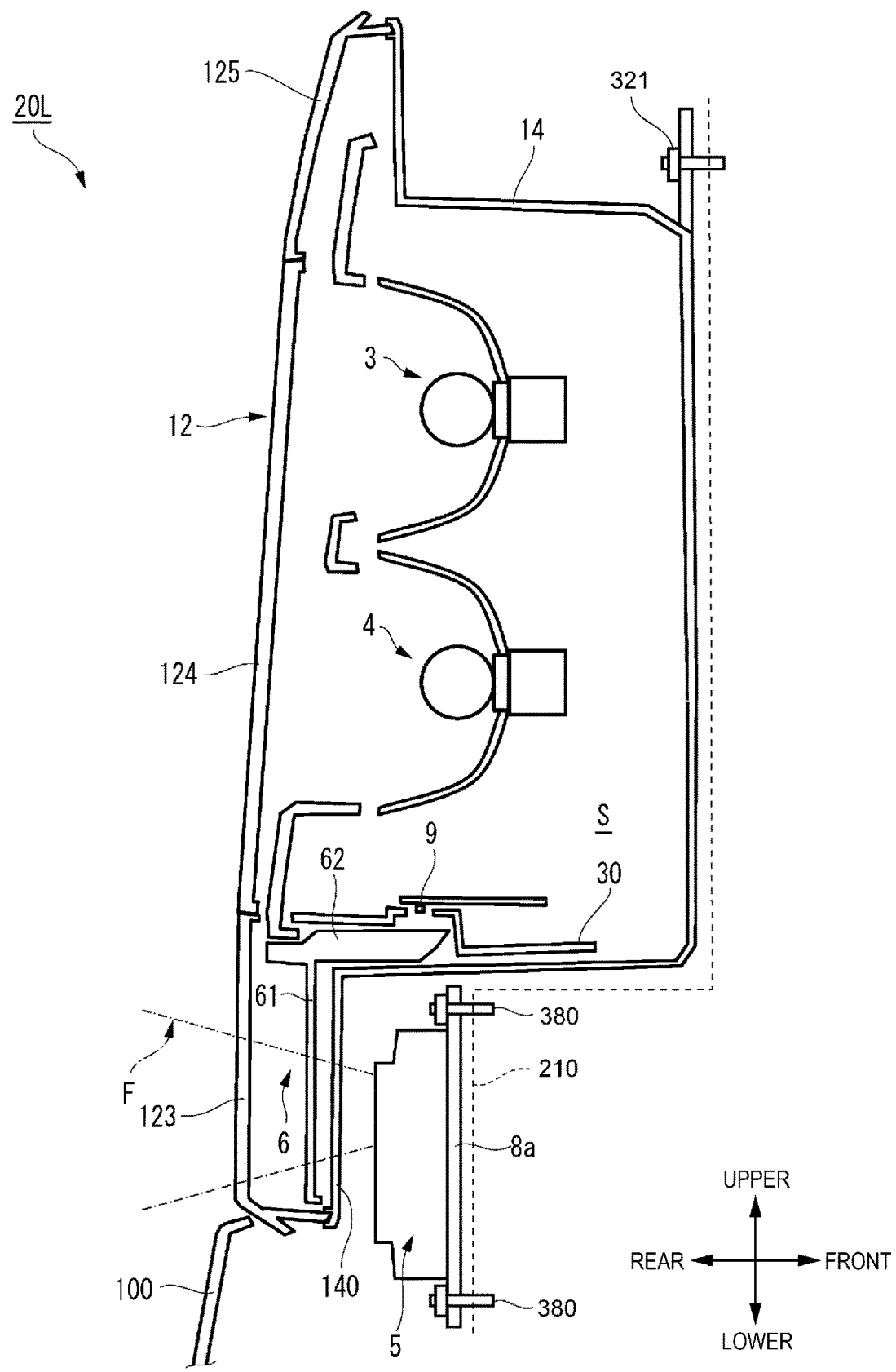

FIG. 9 is a longitudinal cross sectional view showing a left vehicle lamp according to a modification of the first embodiment.

FIG. 10 is a rear view showing a vehicle including a left vehicle lamp and a right vehicle lamp.

Figure 11:
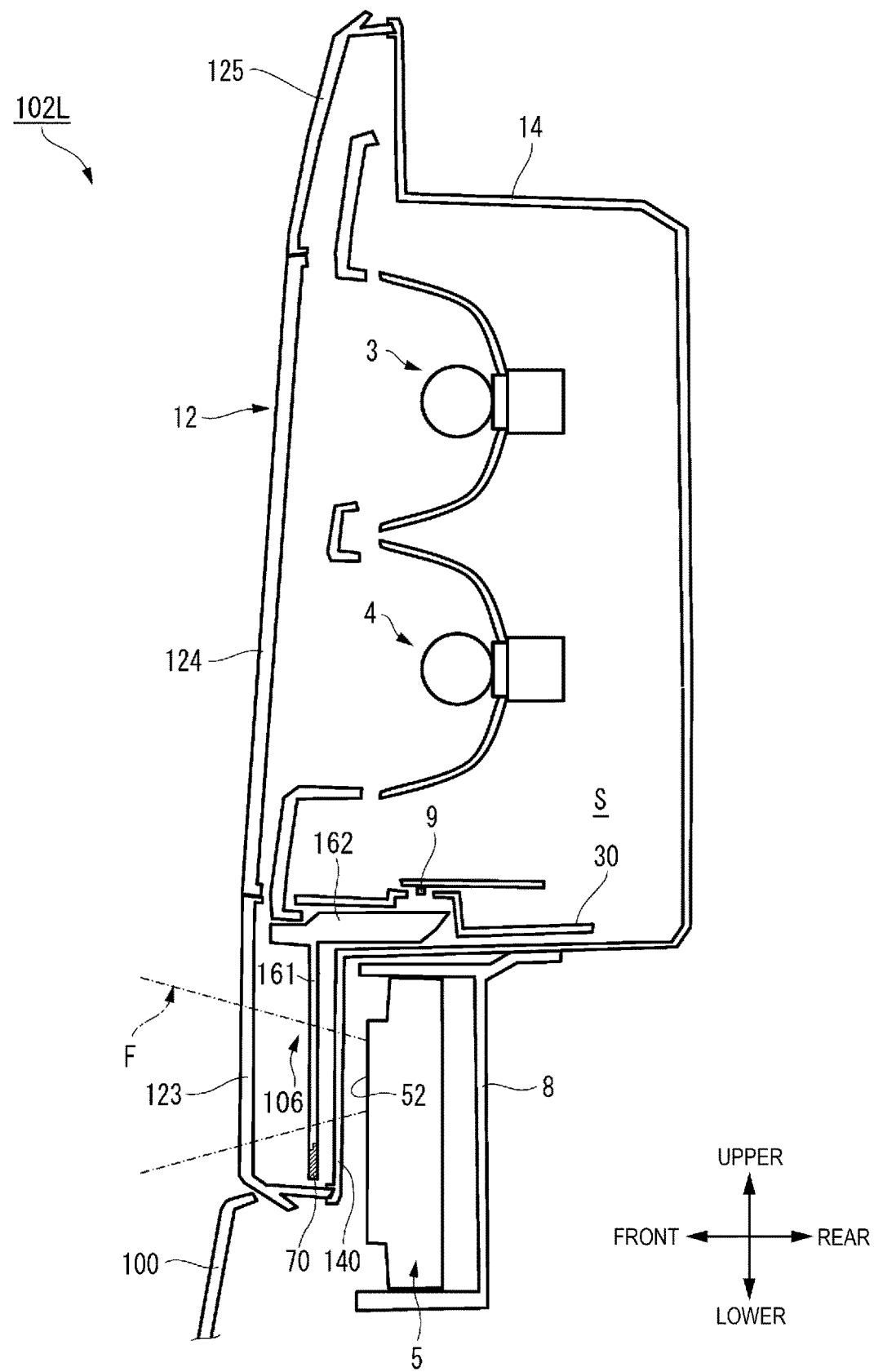

FIG. 11 is a longitudinal cross sectional view showing the left vehicle lamp.

Figure 12:
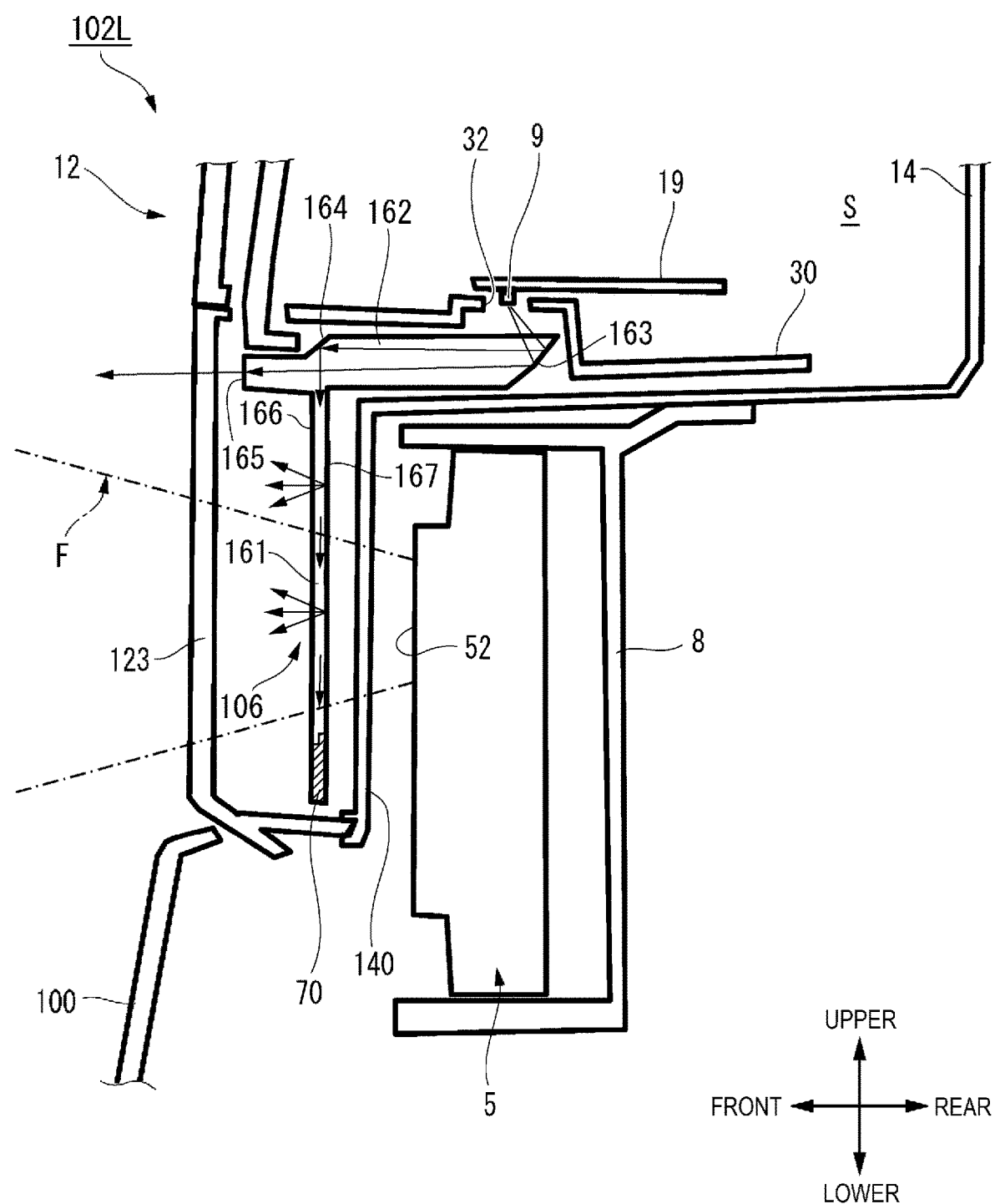

FIG. 12 is an enlarged longitudinal cross sectional view showing the vicinity of a radar shown in FIG. 11.

FIG. 13A is a front view showing a plurality of steps formed on a light emitting portion of a light guide member. FIG. 13B is a cross sectional view showing a part of the light guide member in a case where the steps formed on the light emitting portion are concave portions. FIG. 13C is a cross sectional view showing a part of the light guide member in a case where the steps formed on the light emitting portion are convex portions.

Figure 14:
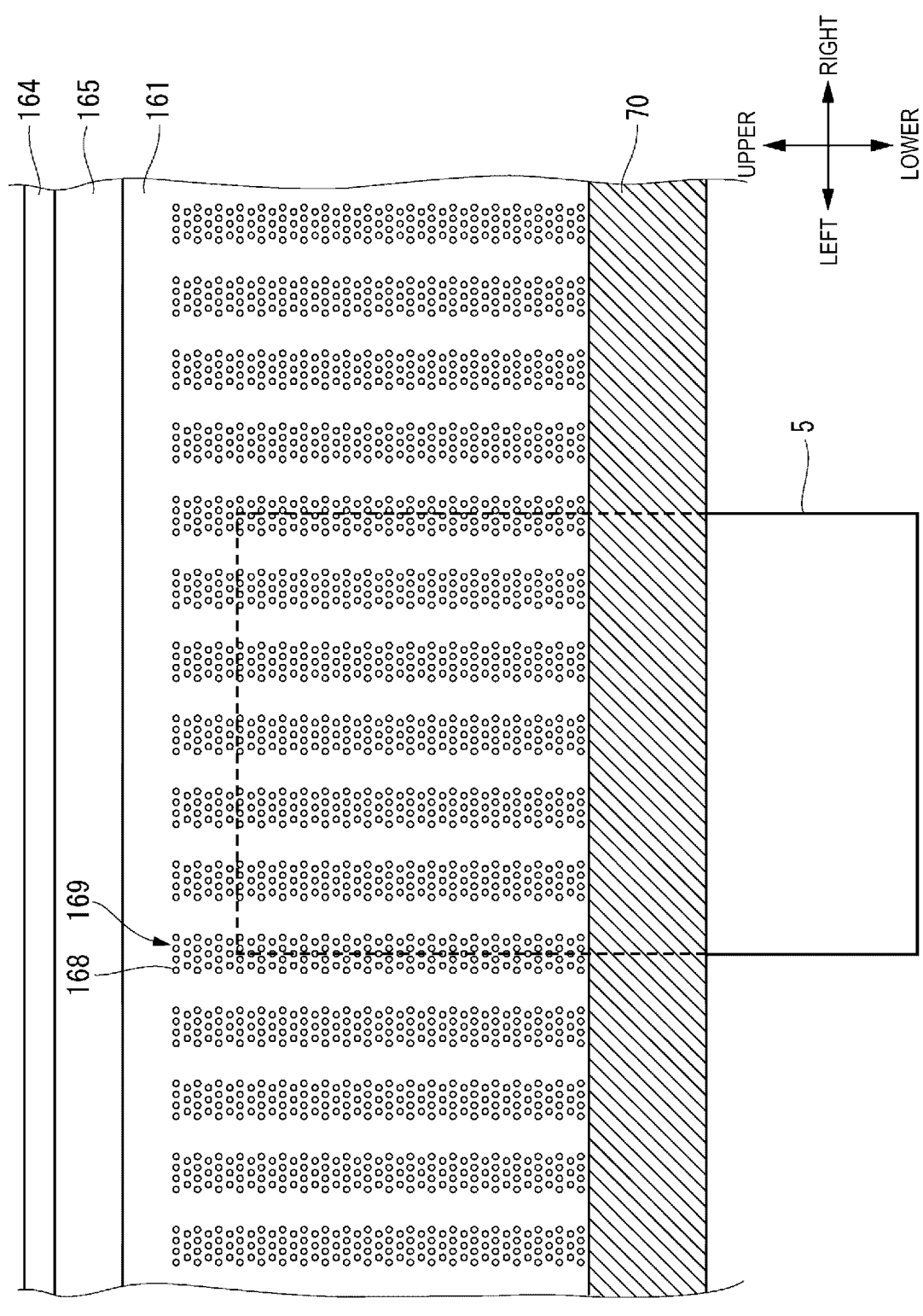

FIG. 14 is a front view schematically showing only the light guide member and the radar.

Figure 15:
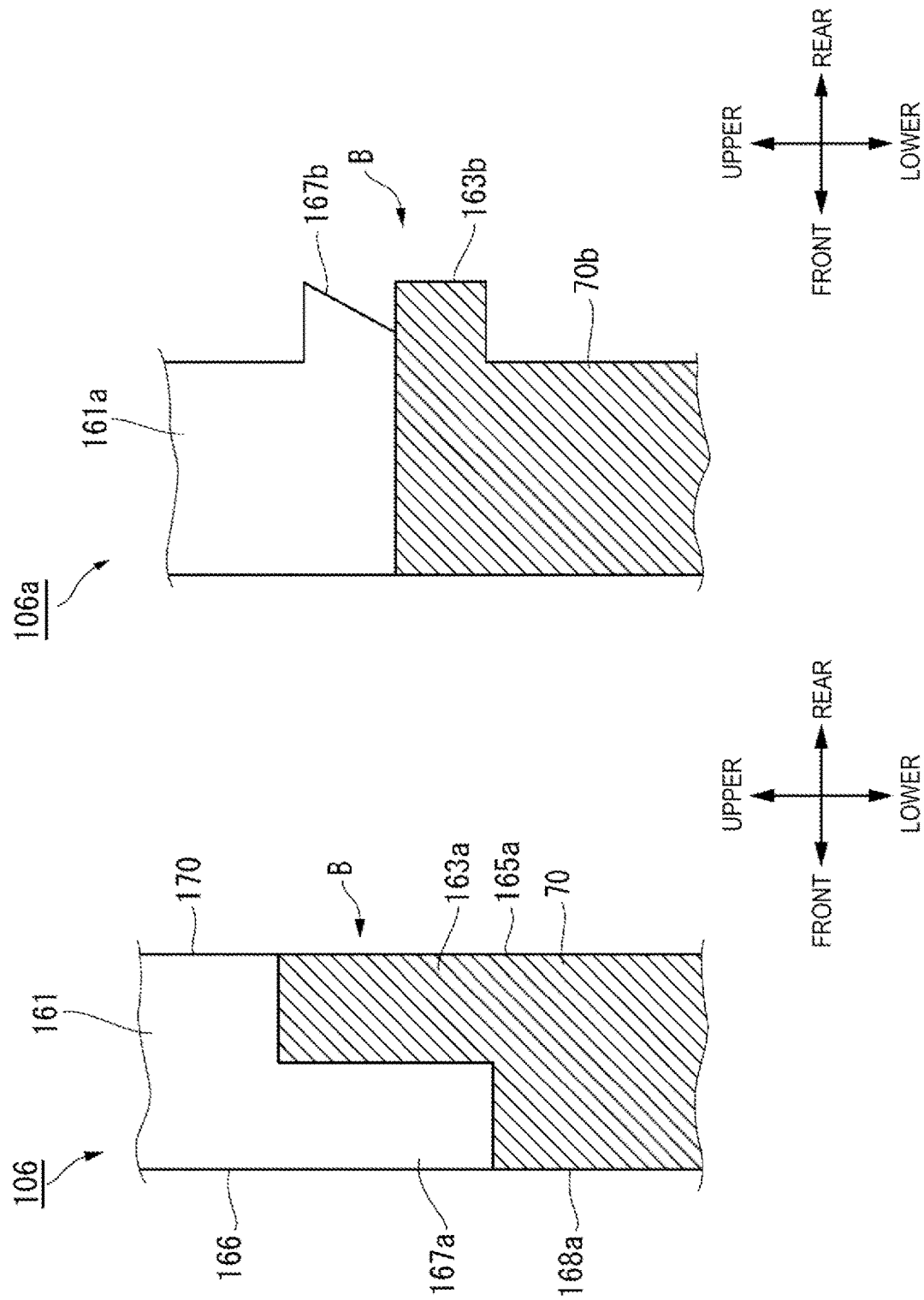

FIG. 15A is a view showing the vicinity of a boundary between the light emitting portion and a colored resin portion of the light guide member according to the present embodiment. FIG. 15B is a view showing the vicinity of a boundary between a light emitting portion and a colored resin portion of a light guide member according to a comparative example.

Figure 16:
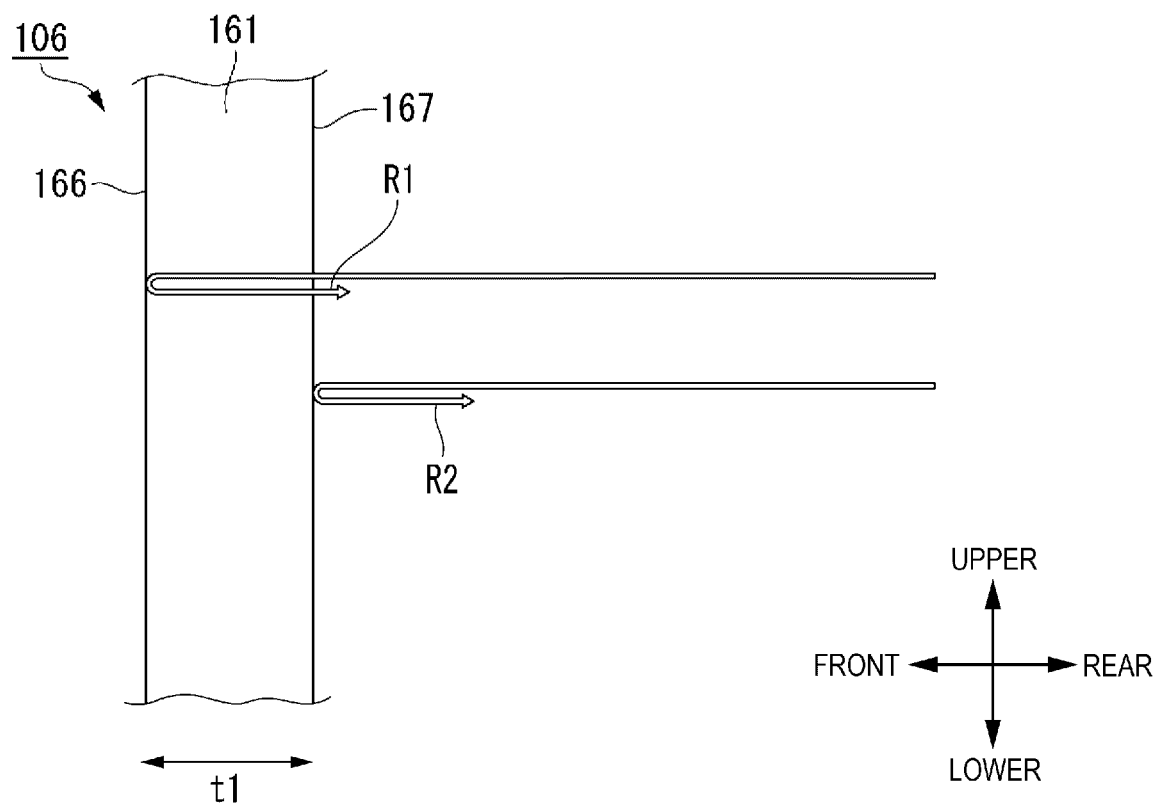

FIG. 16 is a view showing radio waves reflected by the light emitting portion of the light guide member.

FIG. 17 is a rear view showing a vehicle including a left vehicle lamp and a right vehicle lamp.

Figure 18:
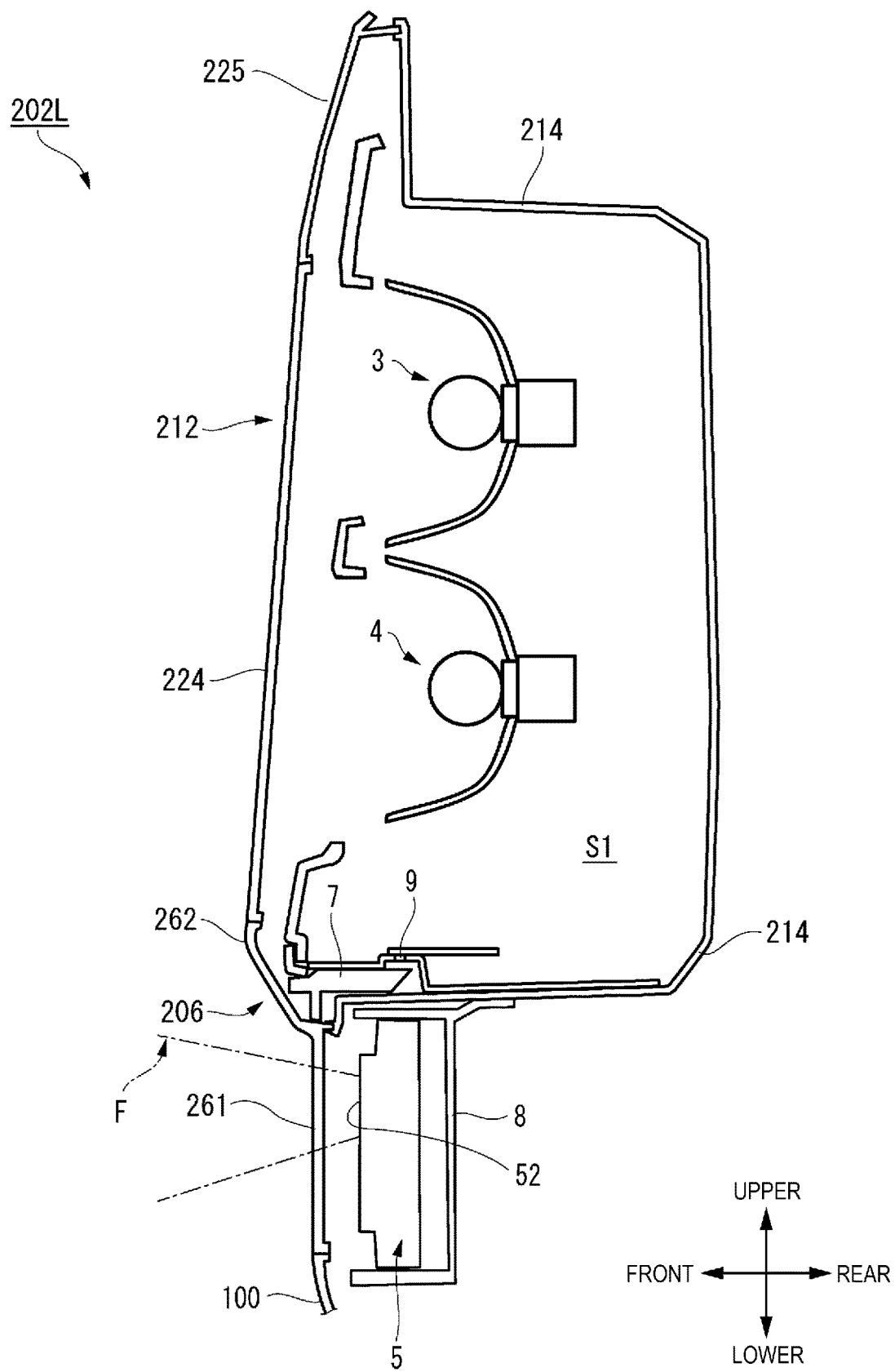

FIG. 18 is a longitudinal cross sectional view showing the left vehicle lamp.

Figure 19:
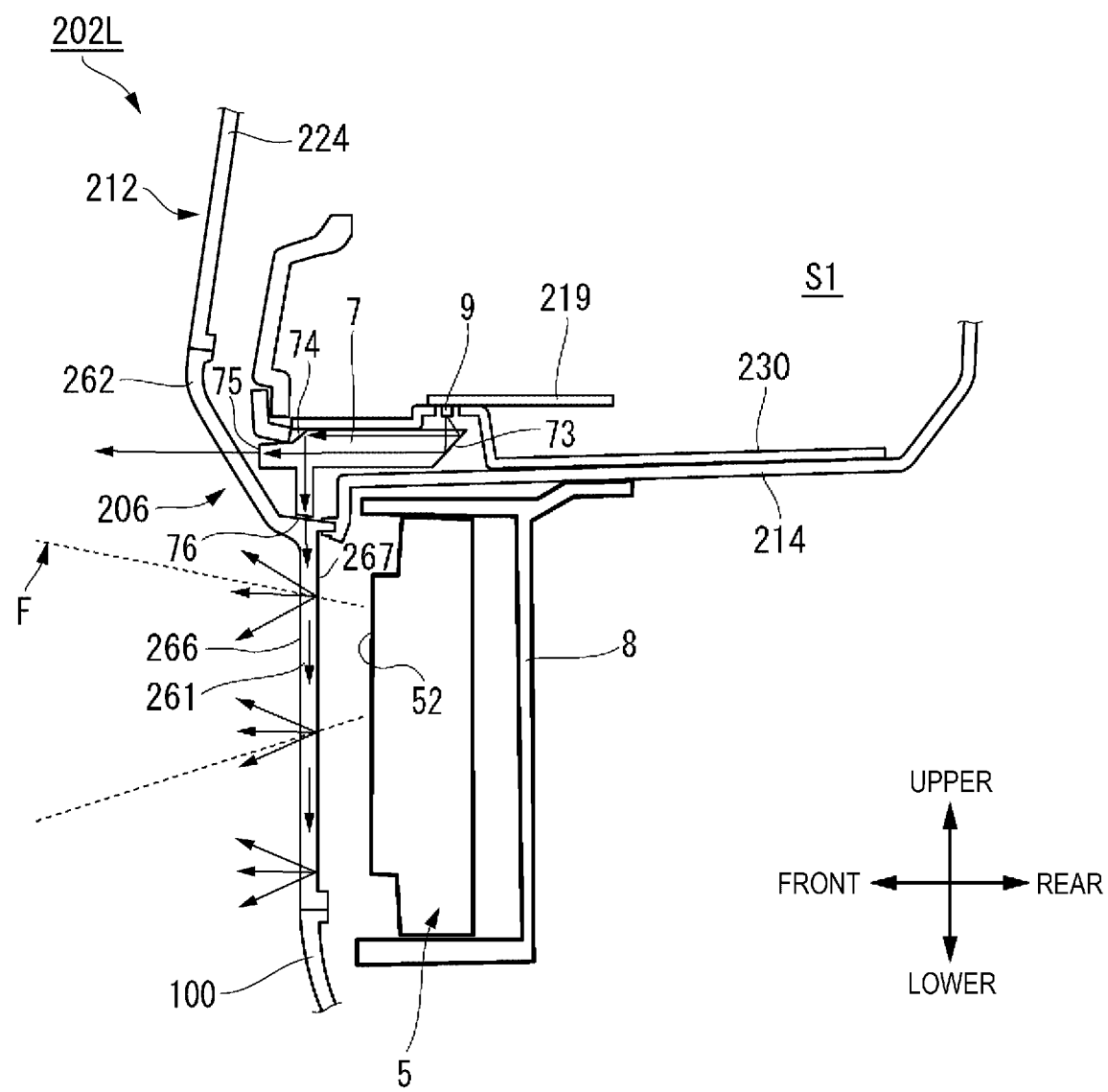

FIG. 19 is an enlarged longitudinal cross sectional view showing the vicinity of a radar shown in FIG. 18.

FIG. 20A is a front view showing a plurality of steps formed on a light emitting portion of a light guide member. FIG. 20B is a cross sectional view showing a part of the light guide member in a case where the steps formed on the light emitting portion are concave portions. FIG. 20C is a cross sectional view showing a part of the light guide member in a case where the steps formed on the light emitting portion are convex portions.

FIG. 21 is a front view schematically showing only the light guide member and a radar.

Figure 22:
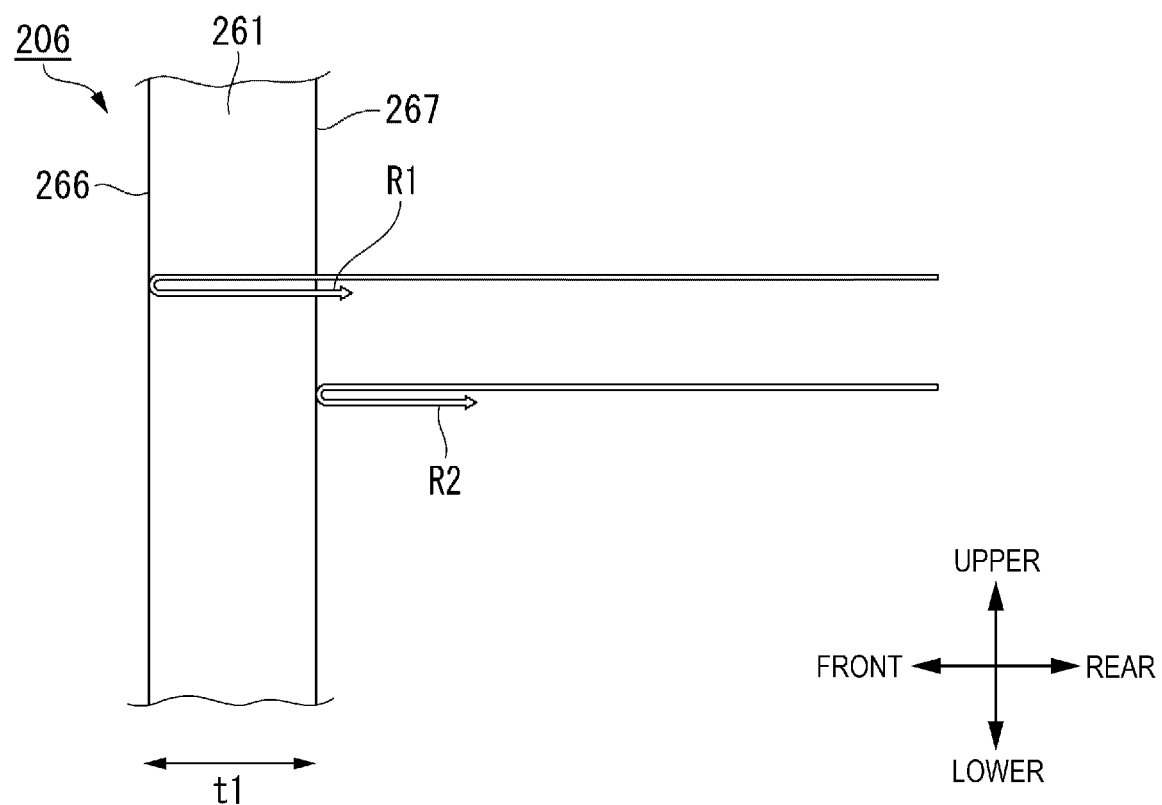

FIG. 22 is a view showing radio waves reflected by the light emitting portion of the light guide member.

FIG. 23 is a rear view showing a vehicle including a left vehicle lamp and a right vehicle lamp.

Figure 24:
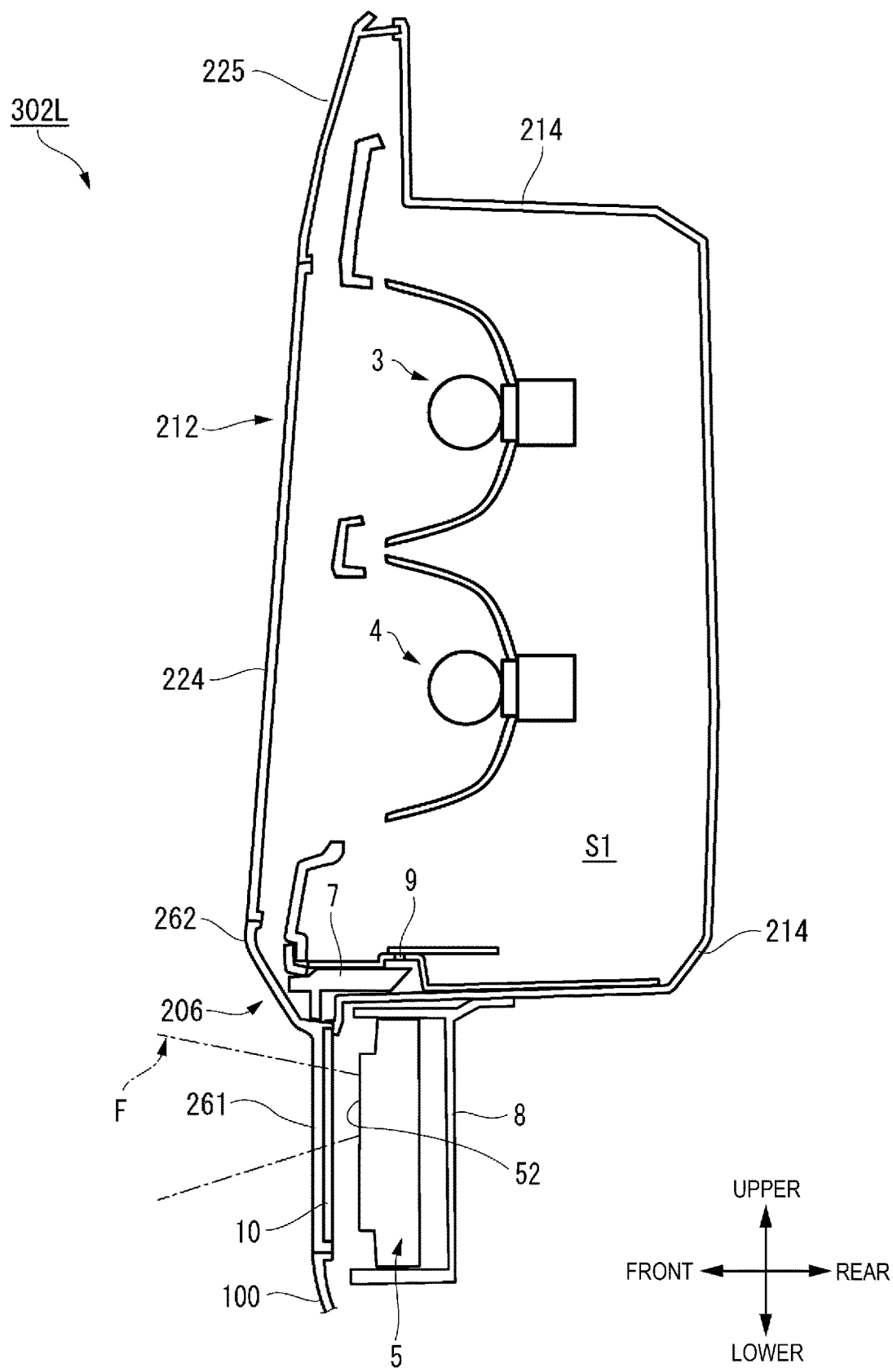

FIG. 24 is a longitudinal cross sectional view showing the left vehicle lamp.

Figure 25:
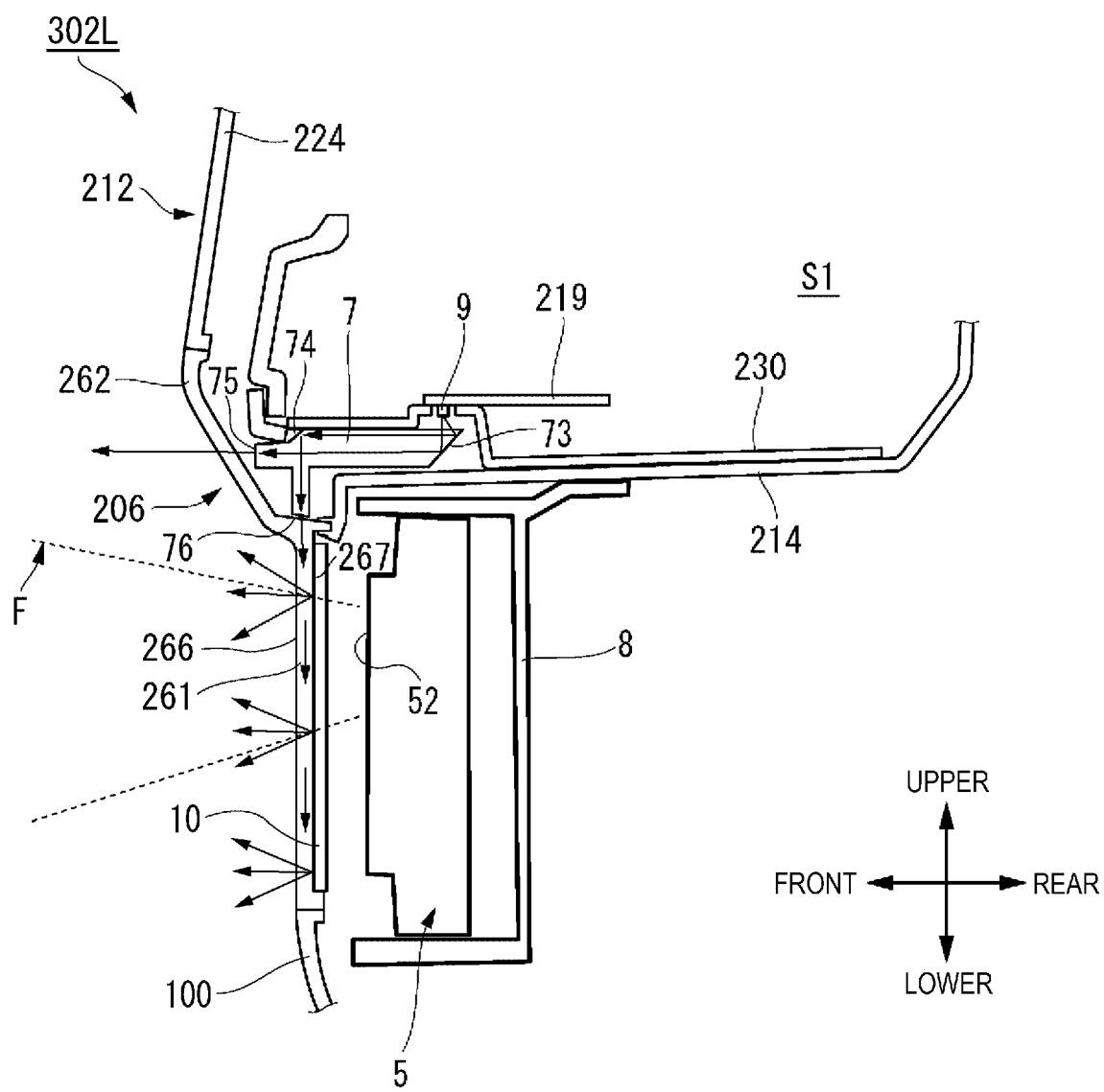

FIG. 25 is an enlarged longitudinal cross sectional view showing the vicinity of a radar shown in FIG. 24.

Figure 26:

FIG. 26 is a view showing an example of a layer structure of a decorative film.

Figure 27:
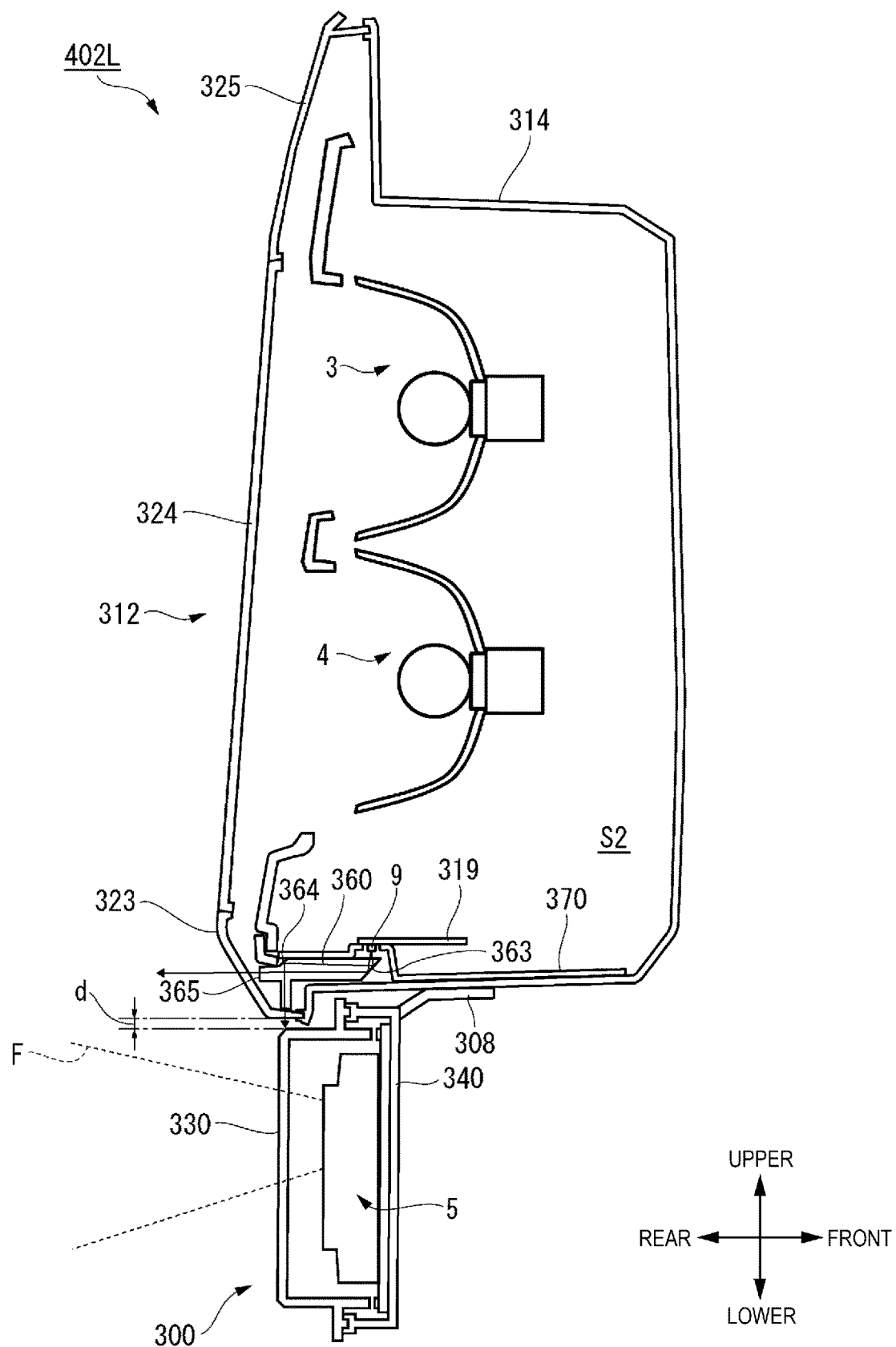

FIG. 27 is a vertical cross sectional view schematically showing a left vehicle lamp and a radar module.

Figure 28:
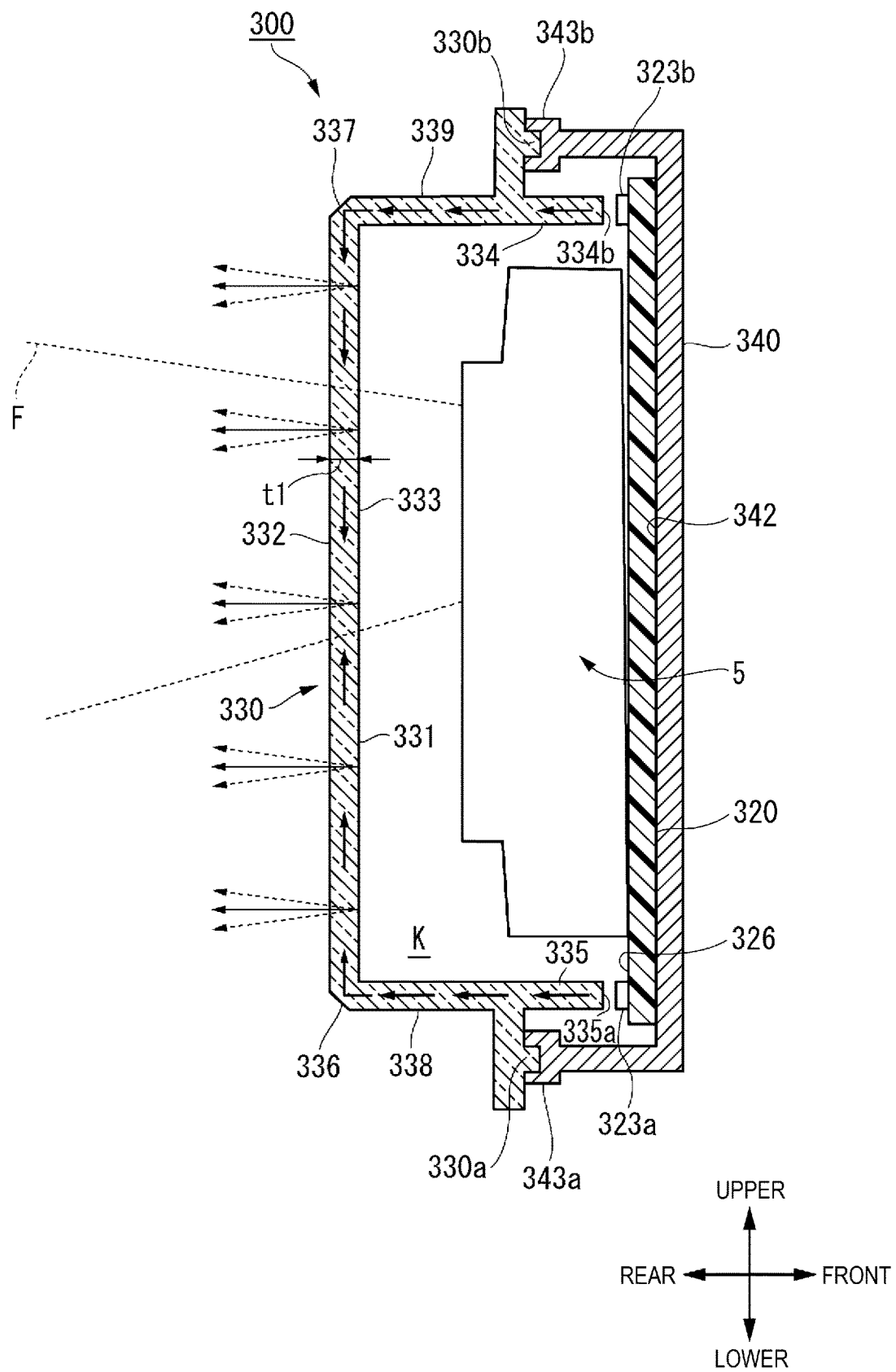

FIG. 28 is an enlarged vertical cross sectional view showing the radar module.

FIG. 29A is a front view showing a plurality of steps formed on a light emitting portion of a light guide member. FIG. 29B is a cross sectional view showing a part of the light emitting portion in a case where the steps formed on the light emitting portion are concave portions. FIG. 29C is a cross sectional view showing a part of the light emitting portion in a case where the steps formed on the light emitting portion are convex portions.

FIG. 30 is a view showing an example of an optical pattern formed on the light emitting portion of the light guide member.

Figure 31:
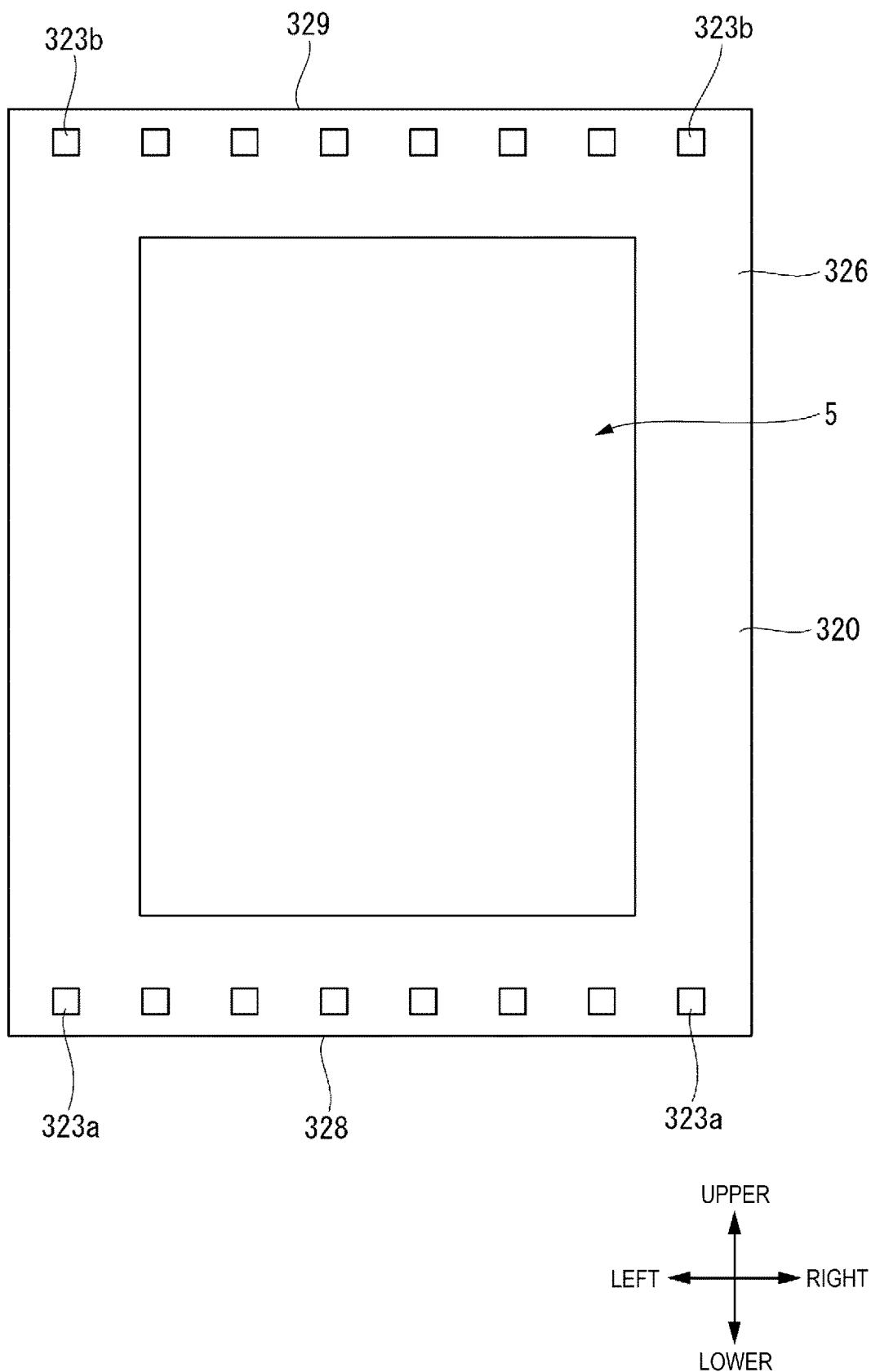

FIG. 31 is a view showing a first light source and a second light source disposed on a circuit board.

Figure 32:
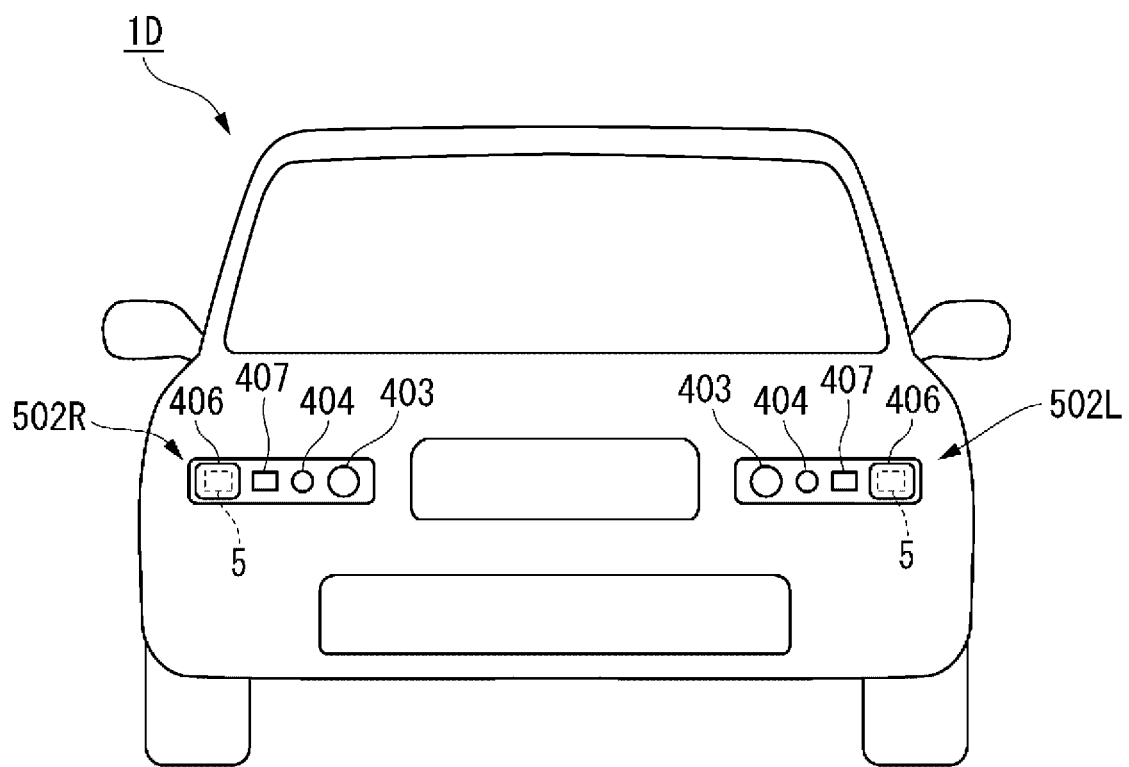

FIG. 32 is a front view showing a vehicle including a left vehicle lamp and a right vehicle lamp according to a sixth embodiment.

FIG. 33A is a front view showing the left vehicle lamp. FIG. 33B is a horizontal cross sectional view showing the left vehicle lamp.

Figure 34B:
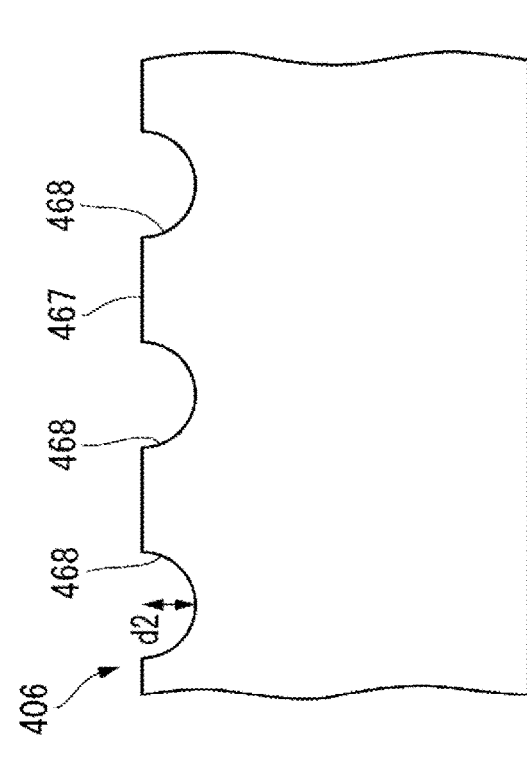
Figure 34C:
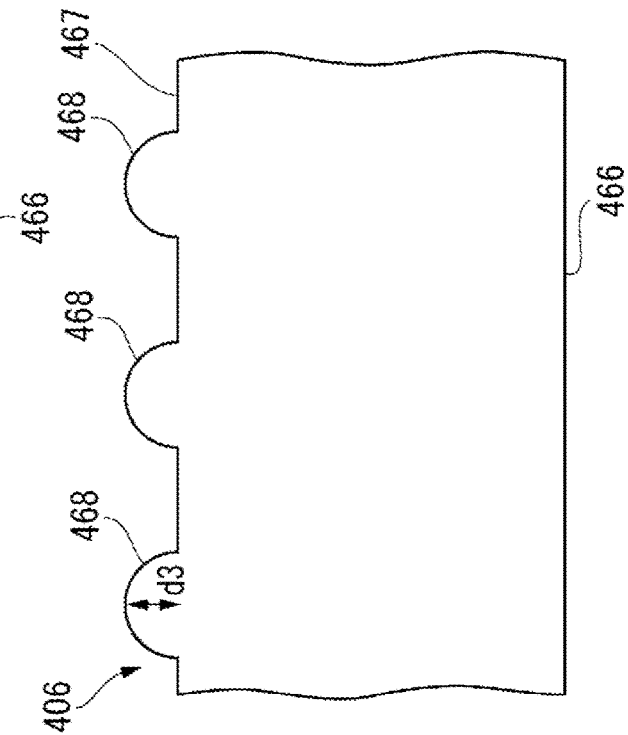
Figure 34A:
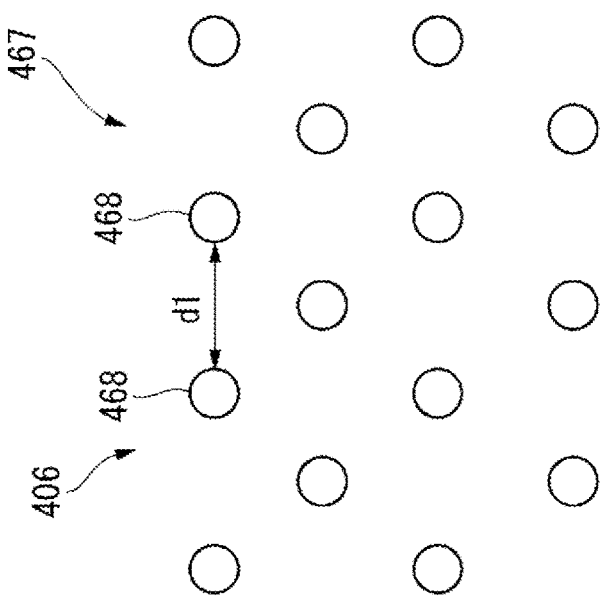

FIG. 34A is a front view showing a plurality of steps formed on a light guide member. FIG. 34B is a cross sectional view showing a part of the light guide member in a case where the steps formed on the light emitting portion are concave portions. FIG. 34C is a cross sectional view showing a part of the light guide member in a case where the steps formed on the light emitting portion are convex portions.

Figure 35:
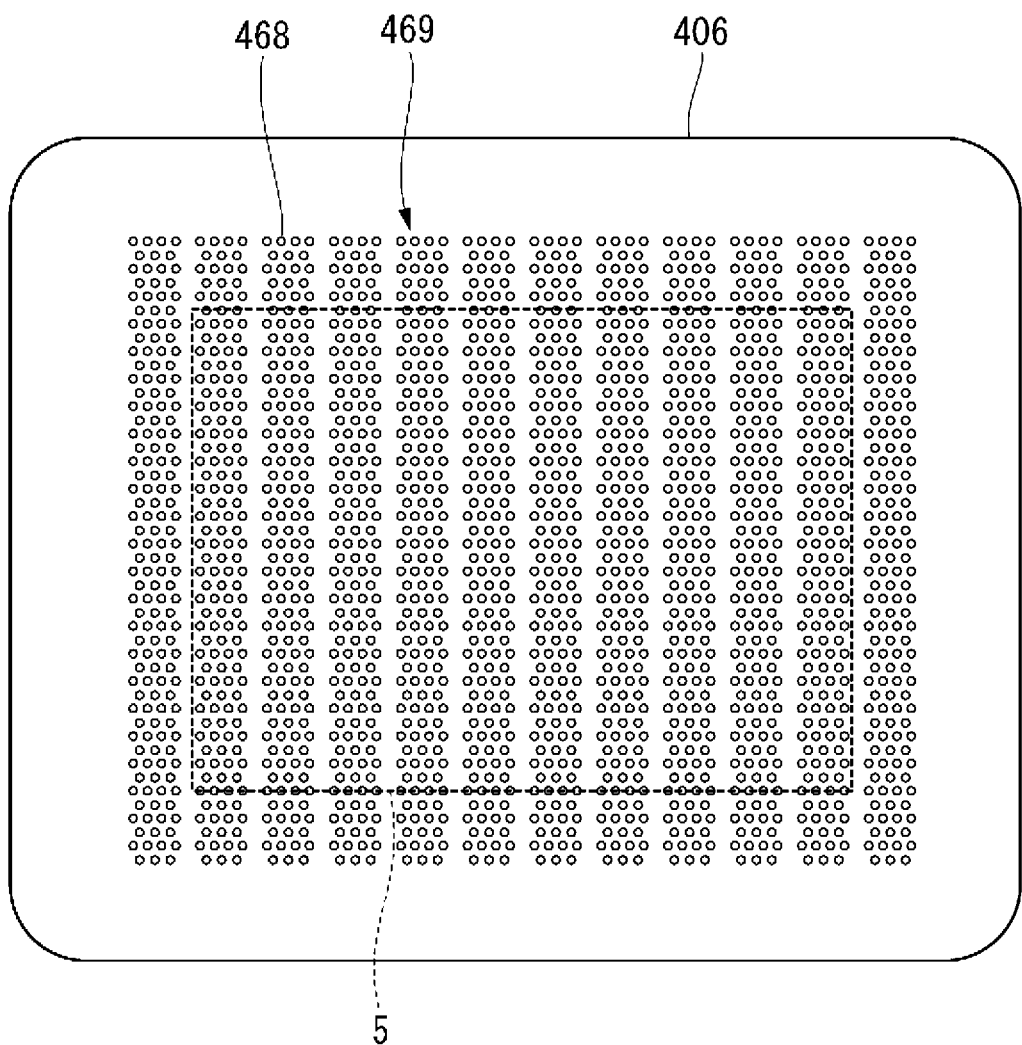

FIG. 35 is a front view schematically showing an optical pattern formed on the light guide member.

Figure 36:
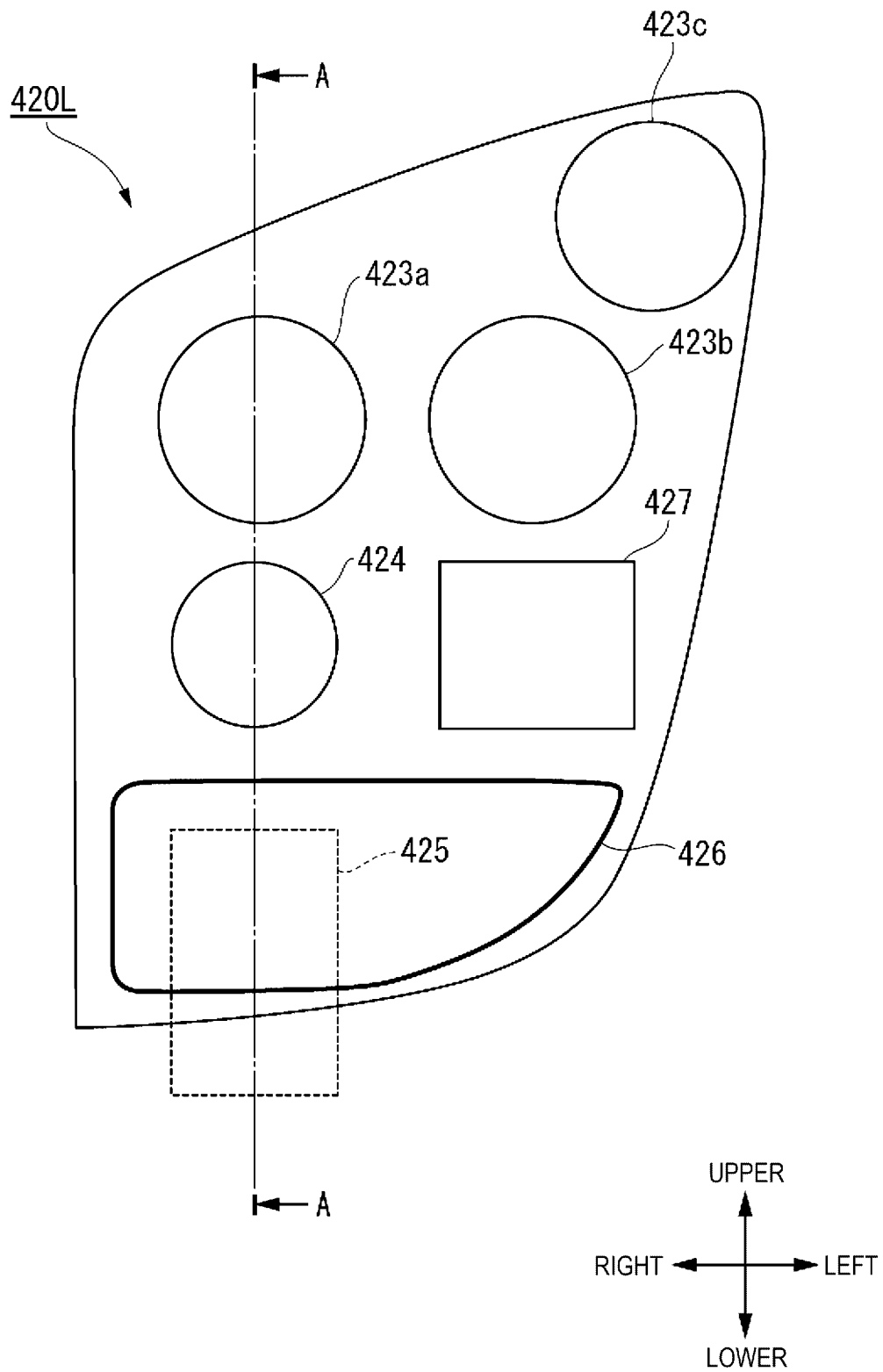

FIG. 36 is a front view showing a left vehicle lamp according to a seventh embodiment.

Figure 37:
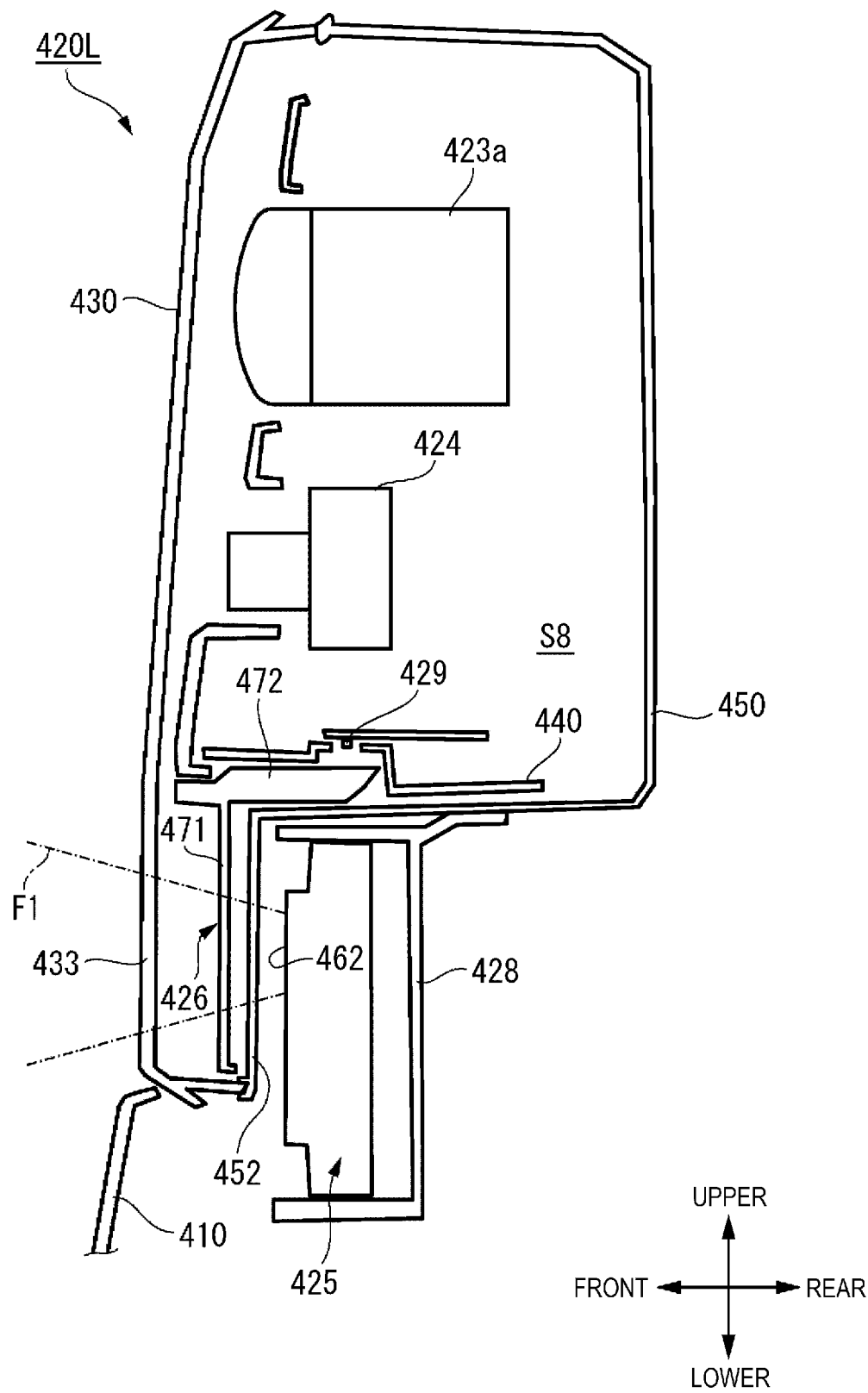

FIG. 37 is a vertical cross sectional view showing the left vehicle lamp taken along a line A-A shown in FIG. 36.

Figure 38:
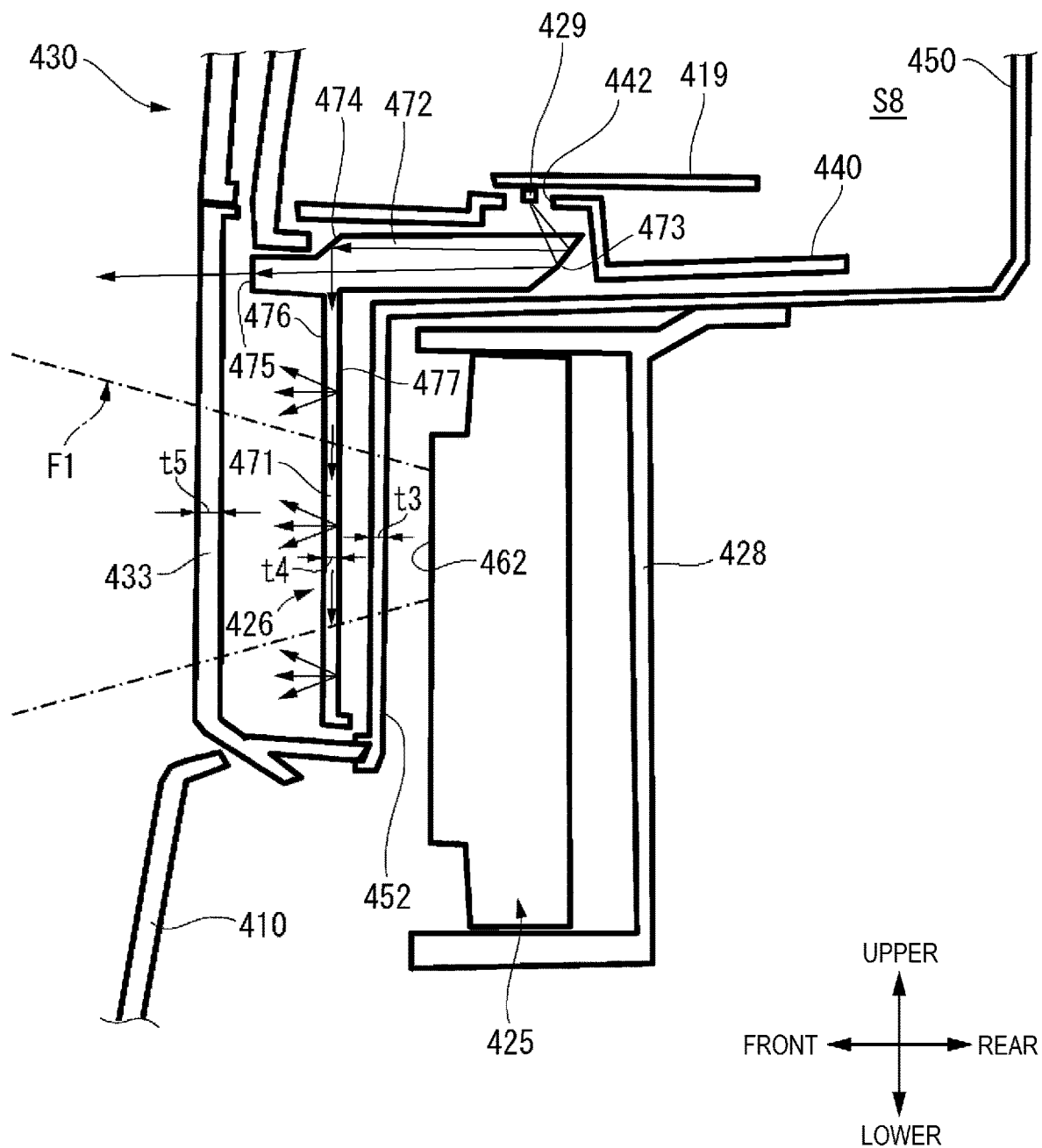

FIG. 38 is an enlarged vertical cross sectional view showing the vicinity of a radar shown in FIG. 37.

Figure 39:
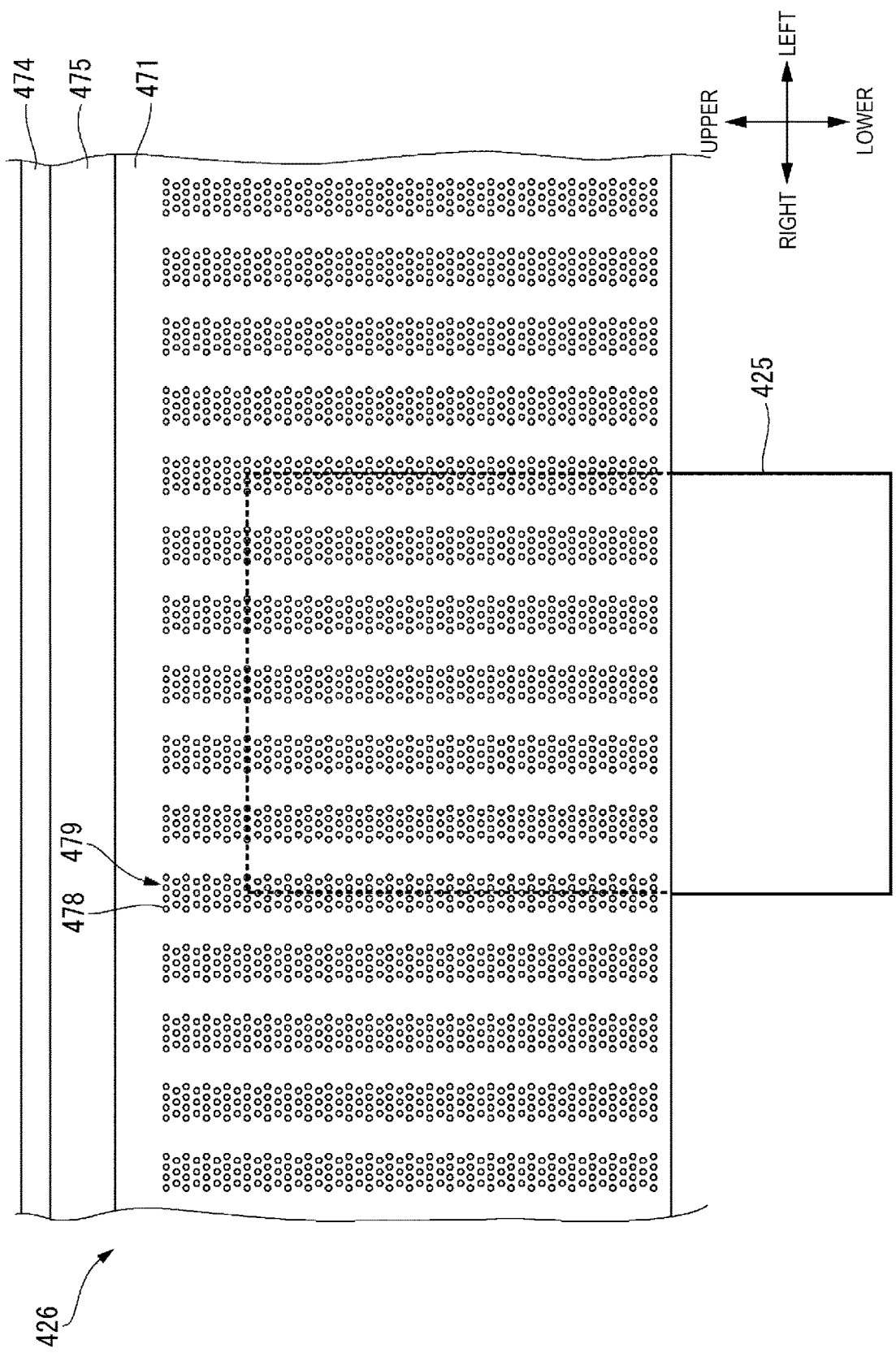

FIG. 39 is a front view schematically showing an optical pattern formed on the light guide member.

FIG. 40 is a rear view showing a vehicle including a left vehicle lamp and a right vehicle lamp according to an eighth embodiment.

FIG. 41 is a longitudinal cross sectional view schematically showing the left vehicle lamp according to the eighth embodiment.

FIG. 42A is a front view showing a plurality of steps formed on a first light guide member. FIG. 42B is a cross sectional view showing a part of the first light guide member in a case where the steps formed on the light emitting portion are concave portions. FIG. 42C is a cross sectional view showing a part of the first light guide member in a case where the steps formed on the light emitting portion are convex portions.

FIG. 43A is a view showing an example of a second optical pattern formed on a second light guide member. FIG. 43B is a view showing an example of a first optical pattern formed on a first light guide member.

FIG. 44 is a longitudinal cross sectional view schematically showing a left vehicle lamp according to a modification of the eighth embodiment.

FIG. 45 is a rear view showing a vehicle including a left vehicle lamp and a right vehicle lamp according to a ninth embodiment.

FIG. 46 is a longitudinal cross sectional view schematically showing the left vehicle lamp according to the ninth embodiment.

Figure 47:
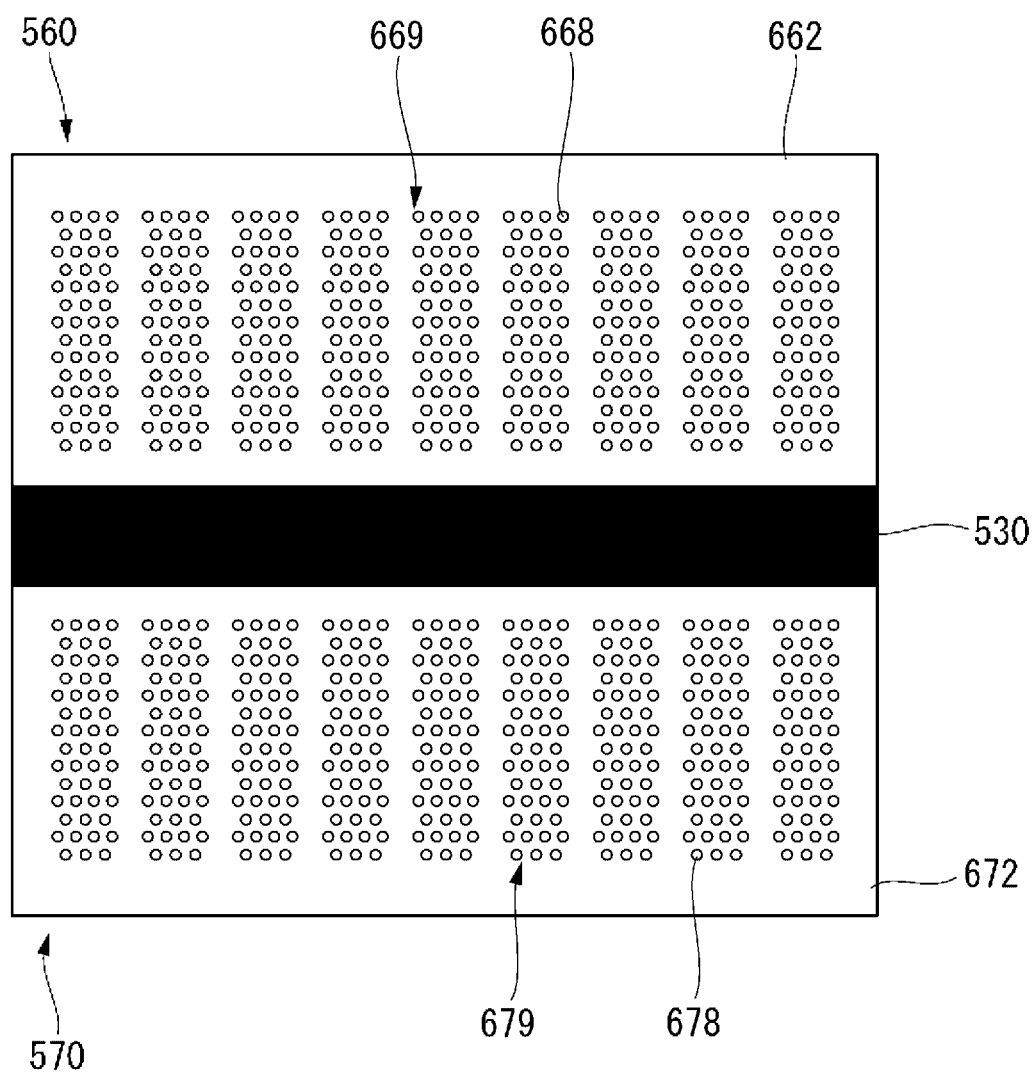

FIG. 47 is a view showing an example of a first optical pattern formed on a first light guide member and an example of a second optical pattern formed on a second light guide member.

FIG. 48 is a front view showing a vehicle including a left vehicle lamp and a right vehicle lamp.

Figure 49:
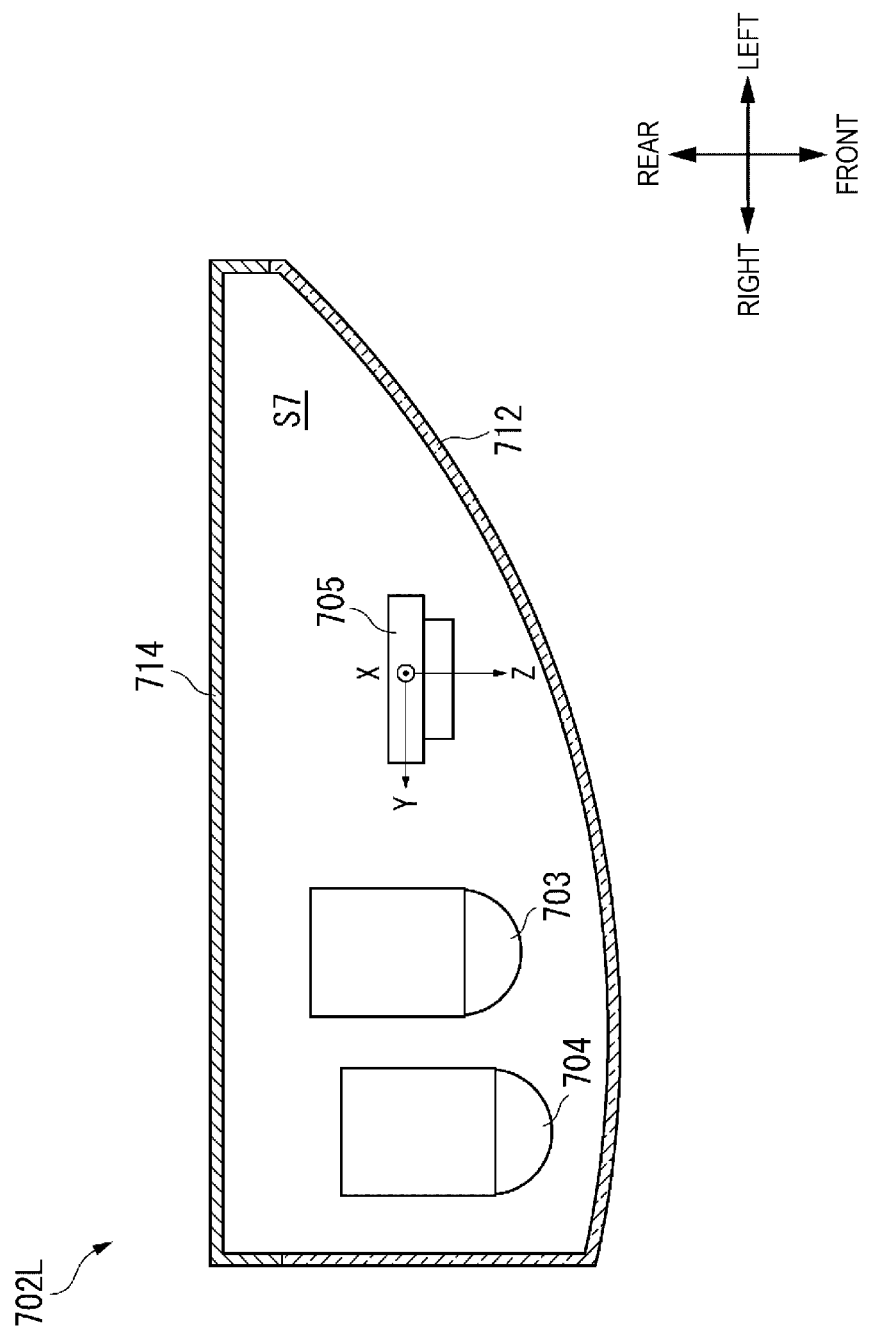

FIG. 49 is a horizontal cross sectional view schematically showing the left vehicle lamp.

Figure 50:
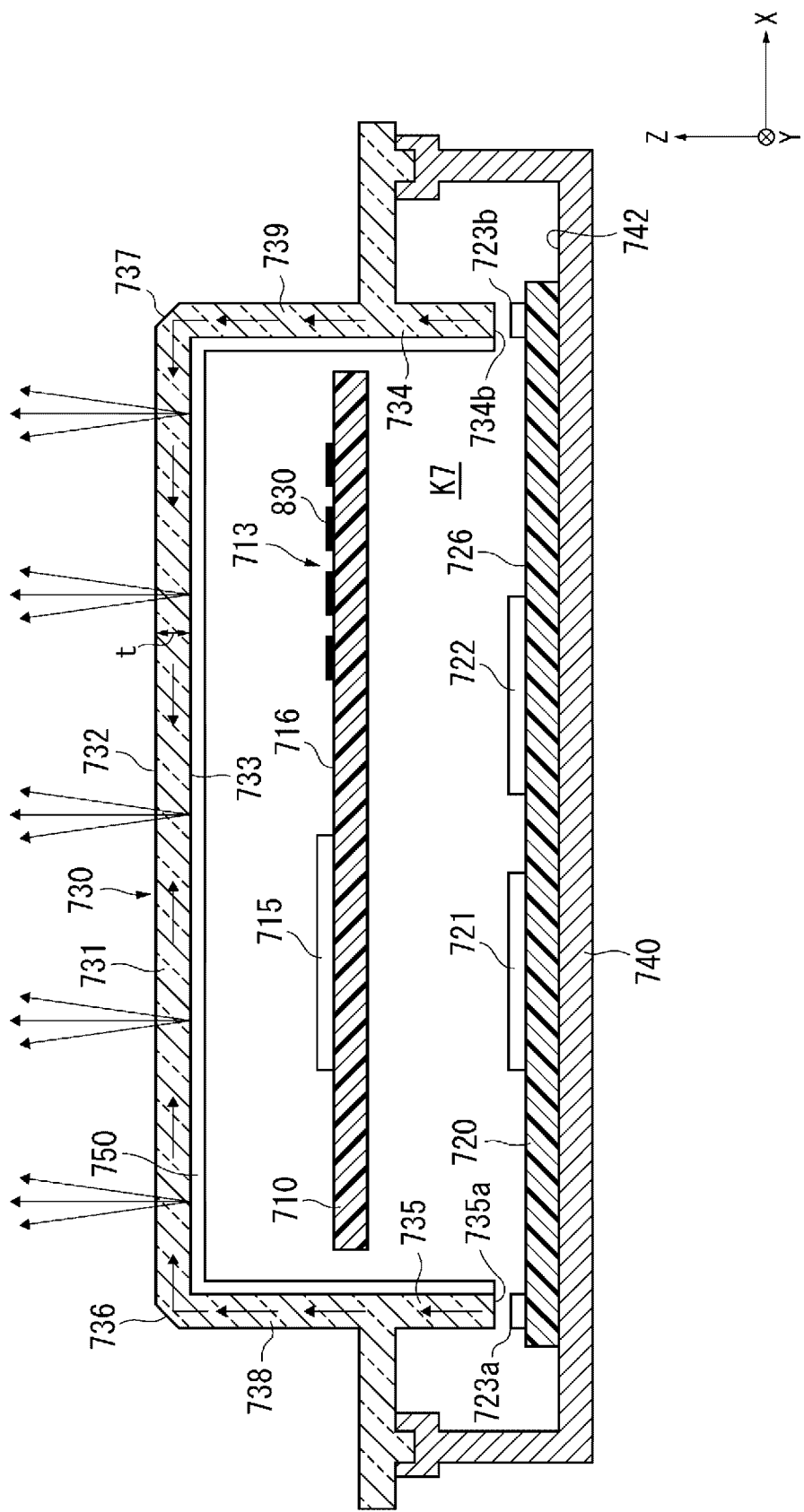

FIG. 50 is a cross sectional view schematically showing a radar according to the present embodiment.

FIG. 51A is a front view showing a plurality of steps formed on a light emitting portion of a light emitting radome. FIG. 51B is a cross sectional view showing a part of the light emitting portion in a case where the steps formed on the light emitting portion are concave portions. FIG. 51C is a cross sectional view showing a part of the light emitting portion in a case where the steps formed on the light emitting portion are convex portions.

FIG. 52A is a view showing an example of components of a radar mounted on a second circuit board. FIG. 52B is a view showing another example of the components of the radar mounted on the second circuit board.

Figure 53:
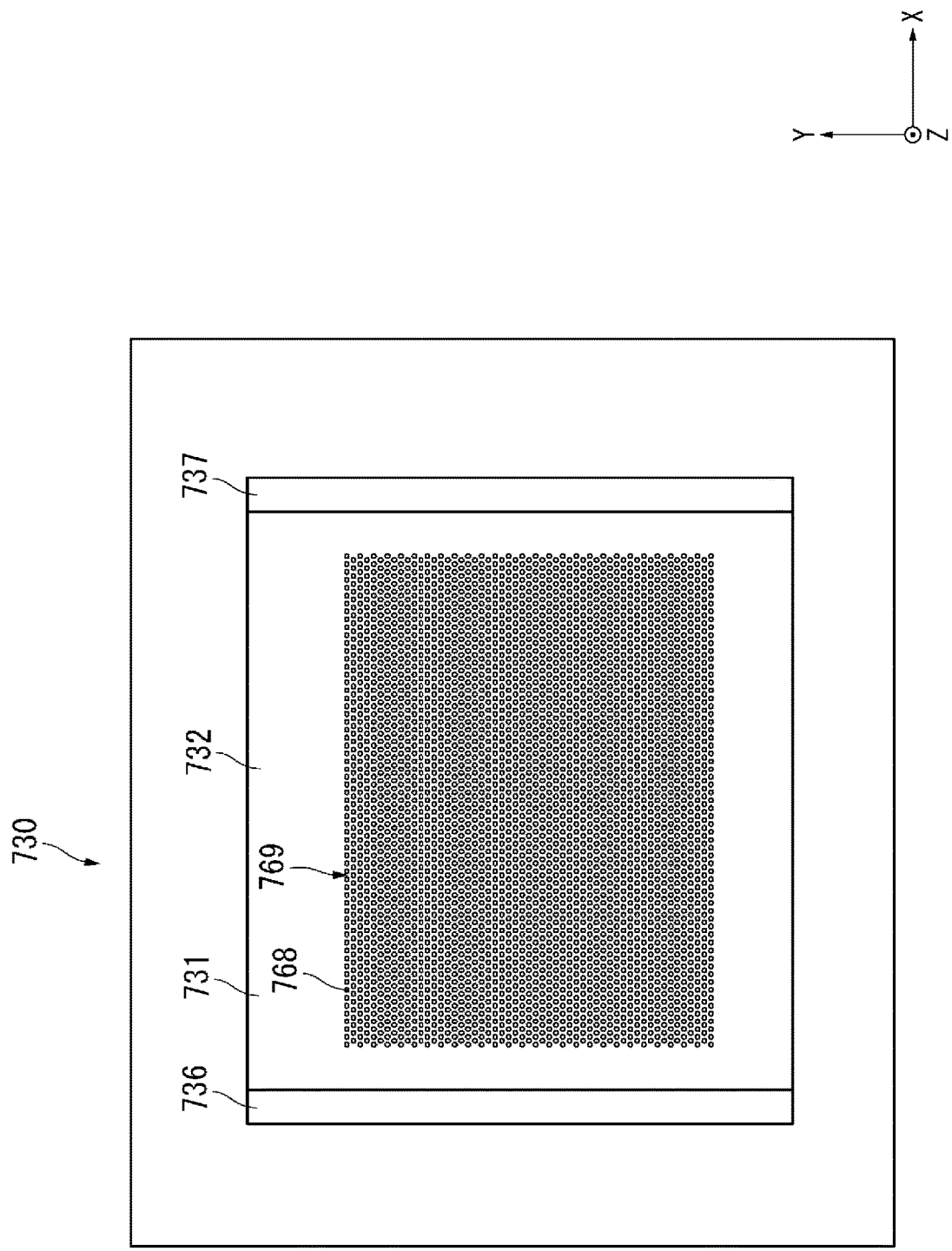

FIG. 53 is a view showing an example of a light emission pattern formed on the light emitting portion of the light emitting radome.

DESCRIPTION OF EMBODIMENTS

First Embodiment

Hereinafter, a first embodiment of the present disclosure (hereinafter, simply referred to as "the present embodiment") will be described with reference to the drawings. Dimensions of members shown in the drawings may be different from actual dimensions of the members for the sake of convenience of description.

In the description of the present embodiment, a "left-right direction", an "upper-lower direction", and a "front-rear direction" may be appropriately referred to for the convenience of description. These directions are relative directions set for a vehicle 1 shown in FIG. 1. Here, the "left-right direction" is a direction including a "left direction" and a "right direction". The "upper-lower direction" is a direction including an "upper direction" and a "lower direction". The "front-rear direction" is a direction including a "front direction" and a "rear direction". Although not shown in FIG. 1, the "front-rear direction" is a direction perpendicular to the left-right direction and the upper-lower direction.

A "horizontal direction" of the vehicle 1 is mentioned in the present embodiment, and the "horizontal direction" is a direction perpendicular to the upper-lower direction (a vertical direction) and includes the left-right direction and the front-rear direction. Further, in the present embodiment, directions (the left-right direction, the upper-lower direction, and the front-rear direction) set for a right vehicle lamp 2R and a left vehicle lamp 2L coincide with directions (the left-right direction, the upper-lower direction, and the front-rear direction) set for the vehicle 1.

First, the vehicle 1 according to the present embodiment will be described with reference to FIG. 1. FIG. 1 is a rear view showing the vehicle 1 including the left vehicle lamp 2L and the right vehicle lamp 2R. As shown in FIG. 1, the left vehicle lamp 2L is disposed at a left rear side of the vehicle 1, and the right vehicle lamp 2R is disposed at a right rear side of the vehicle 1. Each of the left vehicle lamp 2L and the right vehicle lamp 2R includes a radar 5.

In the present embodiment, the left vehicle lamp 2L and the right vehicle lamp 2R function as rear lamps. The left vehicle lamp 2L and the right vehicle lamp 2R have the same configuration. Therefore, a specific configuration of the left vehicle lamp 2L will be described with reference to FIG. 2 in the following description.

The left vehicle lamp 2L and the right vehicle lamp 2R may be collectively and simply referred to as a "vehicle lamp 2" for convenience of description. Although the vehicle lamp 2 that functions as a rear lamp will be described in the present embodiment, the vehicle lamp 2 may be a head lamp that is disposed on a front surface of the vehicle 1 and on which the radar 5 is mounted.

Figure 2:
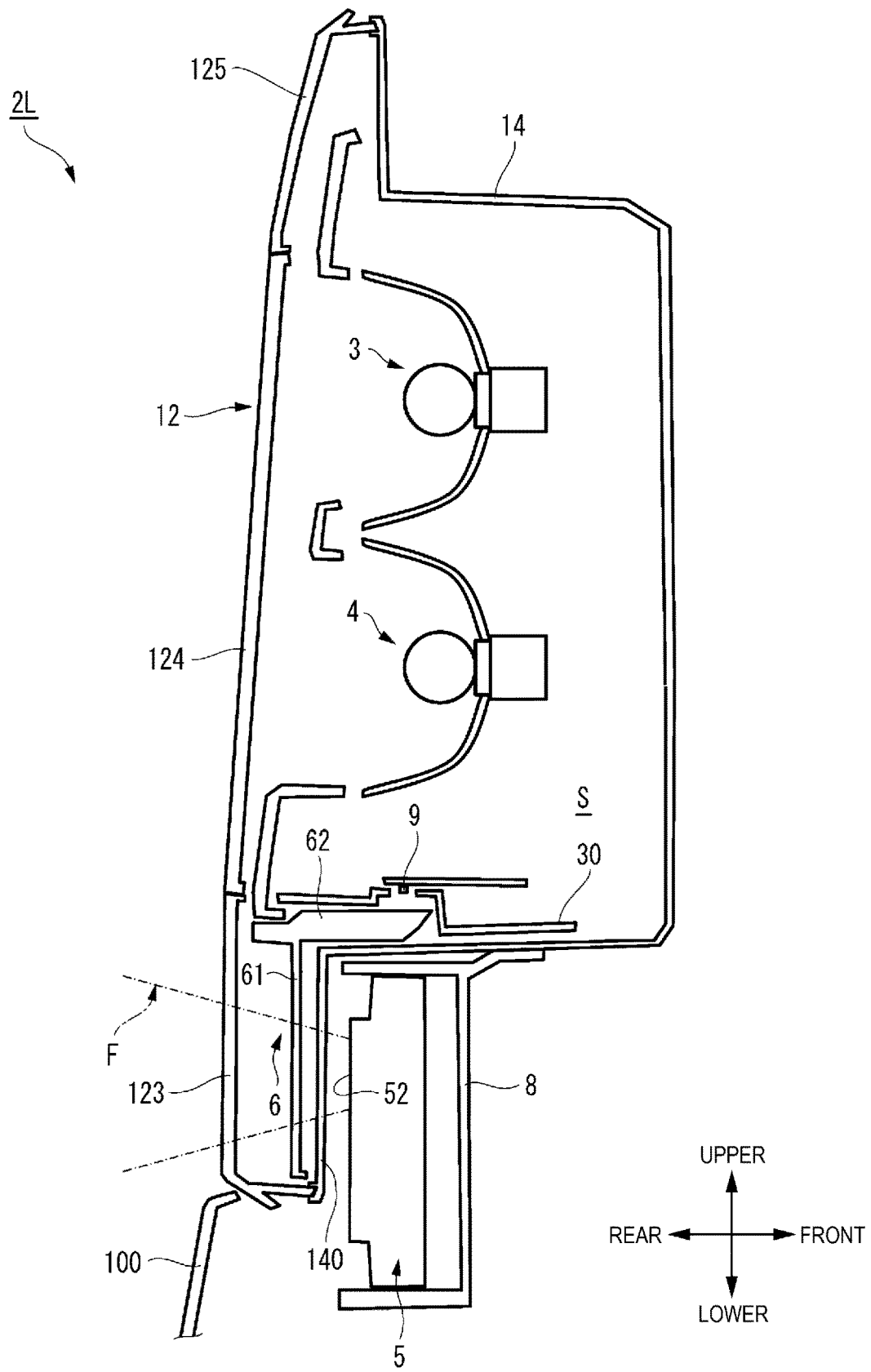
FIG. 2 is a longitudinal cross sectional view showing the left vehicle lamp.

FIG. 2 is a longitudinal cross sectional view (a cross sectional view in the upper-lower direction) showing the left vehicle lamp 2L. As shown in FIG. 2, the left vehicle lamp 2L includes a lamp housing 14, a lamp cover 12 that covers an opening of the lamp housing 14, two illumination units 3 and 4, the radar 5, and a light guide member 6.

The lamp housing 14 may be formed of, for example, a non-transparent resin material such as polypropylene and AAS resin (weather resistant ABS resin). The lamp housing 14 includes a lower extending portion 140 disposed between the light guide member 6 and the radar 5 in the front-rear direction. Since the lower extending portion 140 is present in a field of view F of the radar 5, the lower extending portion 140 is configured to transmit radio waves emitted from the radar 5.

The lamp cover 12 is formed of, for example, a resin material such as polycarbonate or acrylic resin. The lamp cover 12 includes a central light transmitting portion 124, a lower light transmitting portion 123 that is formed integrally with the central light transmitting portion 124 and extends in the lower direction, and an upper extending portion 125 that is formed integrally with the central light transmitting portion 124 and extends in the upper direction.

The central light transmitting portion 124 faces the illumination units 3 and 4, and is configured to transmit light emitted from the illumination units 3 and 4. When each of the illumination units 3 and 4 is one of a tail lamp and a stop lamp, the central light transmitting portion 124 may be formed of a resin material colored in red. When the illumination unit 3 is configured as a tail and stop lamp and the illumination unit 4 is configured as a turn signal lamp or a back up lamp, a portion of the central light transmitting portion 124 that faces the illumination unit 3 may be formed of a resin material colored in red. Further, a portion of the central light transmitting portion 124 that faces the illumination unit 4 may be formed of a transparent resin material.

The lower light transmitting portion 123 is formed integrally with the central light transmitting portion 124 by, for example, two-color molding. The lower light transmitting portion 123 faces the light guide member 6 and is configured to transmit light emitted from the light guide member 6. Further, since the lower light transmitting portion 123 is present in the field of view F of the radar 5, the lower light transmitting portion 123 is configured to transmit radio waves emitted from the radar 5. The lower light transmitting portion 123 is formed of, for example, a transparent resin material. The upper extending portion 125 may also be formed integrally with the central light transmitting portion 124 by two-color molding.

The two illumination units 3 and 4 are disposed in a lamp chamber S formed by a lamp housing 14 and the lamp cover 12, and are configured to emit light toward a rear side of the vehicle 1. Each of the illumination units 3 and 4 functions as at least one of a tail lamp, a stop lamp, a tail and stop lamp, a turn signal lamp, and a back up lamp.

The radar 5 is disposed outside the lamp chamber S, and is configured to acquire radar data indicating a surrounding environment of the vehicle 1 by emitting radio waves (for example, millimeter waves or microwaves) toward an outer side of the vehicle 1. In the present embodiment, the radar 5 is configured to acquire radar data indicating a rear region of the vehicle 1 by emitting radio waves toward a rear side of the vehicle 1. The radar 5 is, for example, a millimeter wave radar or a microwave radar. A vehicle control unit (in-vehicle computer) (not shown) is configured to specify the surrounding environment of the vehicle 1 (in particular, information related to an object present outside the vehicle 1) based on the radar data output from the radar 5.

The radar 5 includes an antenna unit 52, a communication circuit unit (not shown), a housing, and a radome. The antenna unit 52 includes a transmission antenna configured to radiate radio waves (for example, millimeter waves having a wavelength of 1 mm to 10 mm) into the air, and a reception antenna configured to receive radio waved reflected by an object. The radio waves radiated from the transmission antenna are reflected by an object such as another vehicle, and then the radio waves reflected from the object are received by the reception antenna.

The antenna unit 52 may be configured as a patch antenna (a metal pattern formed on a substrate). In this case, the transmission antenna may include a plurality of antenna elements (metal patterns) arranged in a matrix of n rows×m columns. The reception antenna may include, for example, a plurality of antenna elements arranged in a matrix of n rows×(m+1) columns.

The communication circuit unit includes a transmission-side radio frequency (RF) circuit, a reception-side RF circuit, and a signal processing circuit. The communication circuit unit is formed as a monolithic microwave integrated circuit (MMIC). The transmission-side RF circuit is electrically connected to the transmission antenna. The reception-side RF circuit is electrically connected to the reception antenna. The signal processing circuit is configured to generate radar data by processing a digital signal output from the reception-side RF circuit. The antenna unit 52 and the communication circuit unit are disposed in a space formed by the housing and the radome.

The radar 5 is supported and fixed by a support member 8 that is a bracket made of a metal or a resin. The support member 8 is fixed to the lamp housing 14 via a screw (not shown). The support member 8 extends downward from the lamp housing 14. Since the radar 5 and the support member 8 are disposed outside the lamp chamber S, it is possible to suitably prevent the operation of the radar 5 from being adversely affected by heat generated from the illumination units 3 and 4.

The field of view F (a detection range) of the radar 5 in the vertical direction may be, for example, within a range of 3° to 100°. The field of view F of the radar 5 in the horizontal direction may be, for example, within a range of 120° to 180°.

A distance d between the radar 5 and the lower extending portion 140 in the front-rear direction may be set to, for example, 20 mm or more and 100 mm or less. When the distance d between the lower extending portion 140 and the radar 5 is 20 mm or more, radio waves that are emitted from the radar 5 and reflected by the lower extending portion 140 are sufficiently attenuated until reaching the reception antenna of the radar 5. Therefore, it is possible to avoid a situation in which the reflected radio waves received by the radar 5 adversely affect the radar data as a noise component.

In the present embodiment, a part of the radar 5 including the antenna unit 52 is covered by the lamp cover 12, the light guide member 6, and the lamp housing 14, and the other part of the radar 5 is covered by a bumper 100.

The light guide member 6 is disposed in the lamp chamber S and faces the radar 5 via the lower extending portion 140 so as to hide a part of the radar 5 from the outside of the vehicle 1. Since the light guide member 6 is present in the field of view F of the radar 5, the light guide member 6 is configured to transmit radio waves emitted from the radar 5. The light guide member 6 is formed of, for example, a transparent resin material such as polycarbonate or acrylic resin. The light guide member 6 includes a light emitting portion 61 that emits light toward the outside of the vehicle 1, and a light guide portion 62 that guides light emitted from a light source 9.

Figure 3:
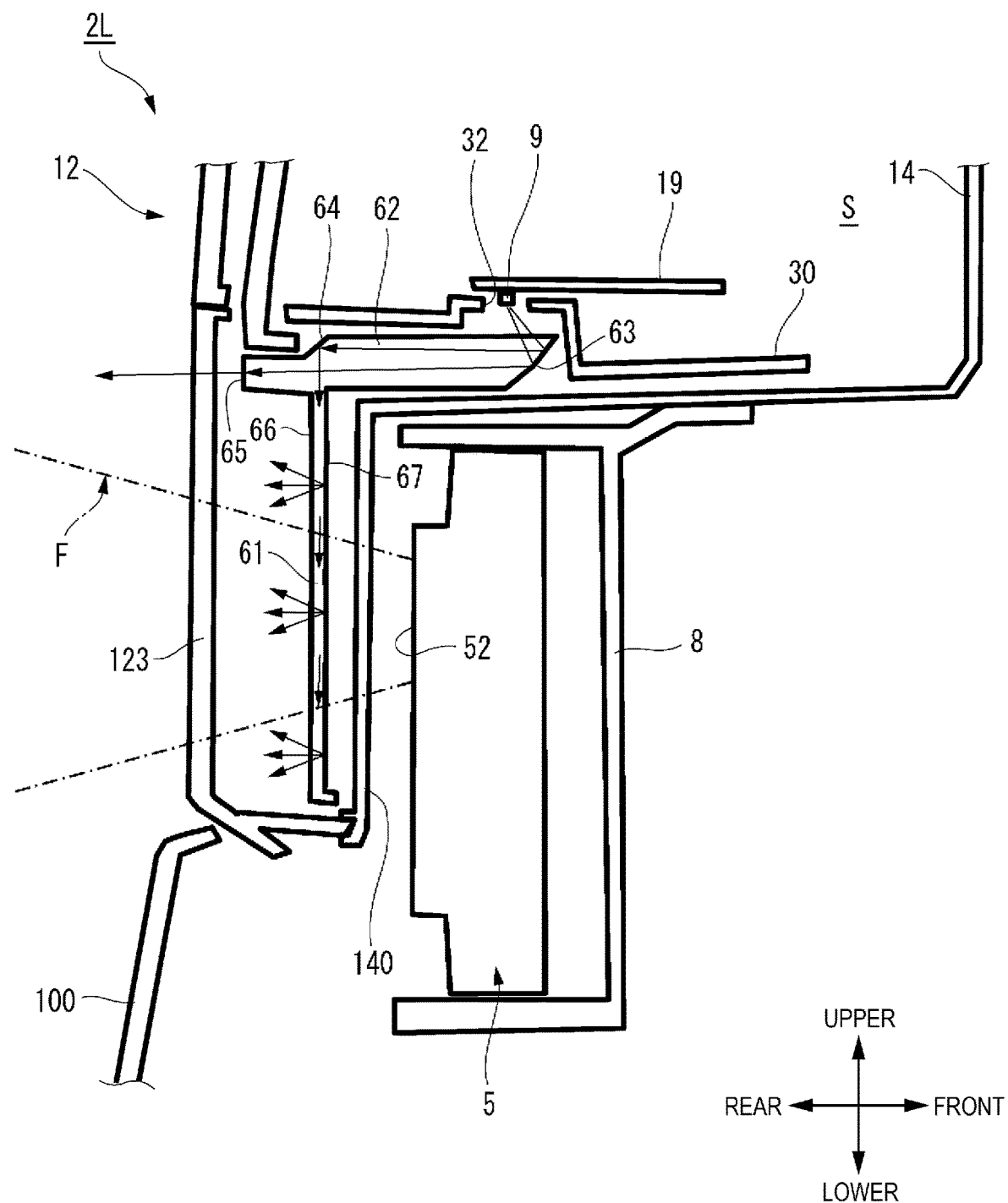
FIG. 3 is an enlarged longitudinal cross sectional view showing the vicinity of a radar shown in FIG. 2.

Hereinafter, a configuration of the light guide member 6 will be specifically described with reference to FIG. 3. FIG. 3 is an enlarged longitudinal cross sectional view showing the vicinity of the radar 5 shown in FIG. 2. As shown in FIG. 3, the left vehicle lamp 2L further includes the light source 9 that is disposed in the lamp chamber S and configured to emit light toward the light guide portion 62 of the light guide member 6. The light source 9 is mounted on a wiring board 19. The light source 9 may be configured with a semiconductor light emitting element such as a light emitting diode (LED) and a laser diode (LD).

The light emitted from the light source 9 is incident on the light guide portion 62 through an opening 32 of a partition member 30, and then is reflected by a reflecting surface 63. A part of the light reflected by the reflecting surface 63 is emitted to the outside of the vehicle 1 via a light emission surface 65. On the other hand, the other part of the light reflected by the reflecting surface 63 is reflected by a reflecting surface 64, and then spreads into the light emitting portion 61.

The light emitting portion 61 includes a first surface 67 that faces the radar 5, a second surface 66 located at a side opposite to the first surface 67, and a plurality of steps 68 (see FIG. 4A) formed on the first surface 67. The plurality of steps 68 are configured to reflect the light spreading in the light emitting portion 61 toward the outside of the vehicle 1.

As shown in FIG. 4A, for example, the plurality of steps 68 may be formed into a lattice shape on the first surface 67 of the light emitting portion 61. An interval d1 between adjacent steps 68 among the plurality of steps 68 is, for example, 400 μm. In this regard, brightness of an optical pattern 69 (see FIG. 5) to be described later can be appropriately adjusted by adjusting the interval d1 between adjacent steps 68.

The steps 68 may be formed on the first surface 67 of the light emitting portion 61 as concave portions (see FIG. 4B), or may be formed on the first surface 67 as convex portions (see FIG. 4C). A depth d2 or a height d3 of the step 68 from the first surface 67 in a thickness direction of the light emitting portion 61 is, for example, in a range of larger than 0 μm and 300 μm or less. For example, when a thickness of the light emitting portion 61 is about 2.4 mm, the depth d2 or the height d3 of the step 68 may be about 30 μm.

In this regard, the depth d2 or the height d3 of the step 68 is preferably smaller than $\lambda/8$. Here, $\lambda$ is a wavelength of radio waves emitted from the radar 5. When a relationship of d2, d3<$\lambda/8$ is satisfied, the height d2 or the depth d3 of the step is less likely to adversely affect the radio waves that are emitted from the radar 5 and are incident on the first surface 67 of the light emitting portion 61. That is, when the depth d2 or the height d3 of the step 68 is smaller than $\lambda/8$, the unevenness of the step 68 can almost be ignored from the viewpoint of radio wave interference. For example, when the wavelength $\lambda$ of the radio waves is 3.92 mm, the depth d2 or the height d3 of step 68 is preferably smaller than 0.49 mm (d<0.49 mm).

In order to efficiently emit the light spreading in the light emitting portion 61 toward the outside of the vehicle 1, it is preferable that the step 68 is formed into a hemispherical concave portion or convex portion. Since the light spreading in the light emitting portion 61 can be reflected toward the outside of the vehicle 1 by the plurality of steps 68, the light emitting portion 61 can be caused to emit light. In other words, a pedestrian or the like present outside the vehicle 1 or an occupant of another vehicle can visually recognize the light emission from the light guide member 6.

As shown in FIG. 5, the optical pattern 69 can be formed on the light emitting portion 61 by a collection of the plurality of steps 68. In the example shown in FIG. 5, the stripe-shaped optical pattern 69 can be formed on the light emitting portion 61 by a collection of the plurality of steps 68. In the present embodiment, a shape of the optical pattern 69 is not particularly limited, and the optical pattern 69 having a predetermined geometric pattern may be formed on the light emitting portion 61. In this manner, the design of the appearance of the left vehicle lamp 2L can be improved by the optical pattern 69 formed on the light emitting portion 61.

The light guide member 6 may function as a lamp configured to present information related to traveling of the vehicle 1 (for example, stop information, turn information, information related to an automatic driving mode, and the like) to the outside of the vehicle 1. Specifically, the light guide member 6 may function as a stop lamp that presents information indicating that the vehicle 1 is stopped to the outside, a turn signal lamp that presents information indicating a turn (a right or left turn or a change of a traveling lane) of the vehicle 1 to the outside, a back up lamp that presents information indicating that the vehicle 1 travels rearward to the outside, or an automatic driving system (ADS) lamp that presents information related to an automatic driving mode of the vehicle 1. As an example of the ADS lamp, the light guide member 6 may function as an ID lamp that is turned on or off in accordance with a driving mode of the vehicle 1. The ID lamp is turned off when the driving mode of the vehicle 1 is a manual driving mode or a driving support mode, and the ID lamp is turned on when the driving mode of the vehicle 1 is an advanced driving support mode or a fully automatic driving mode.

For example, when the illumination unit 3 functions as a tail and stop lamp and the illumination unit 4 functions as a back up lamp, the light guide member 6 may function as a turn signal lamp. In this case, the light source 9 is configured to emit amber light. Further, when the illumination unit 3 functions as a tail and stop lamp and the illumination unit 4 functions as a turn signal lamp, the light guide member 6 may function as a back up lamp or an ADS lamp.

As described above, when the light guide member 6 functions as a turn signal lamp, a back up lamp, or an ADS lamp, it is not necessary to separately provide a lamp (for example, a turn signal lamp) having the same function as the light guide member 6 in the vehicle lamp 2. In this manner, it is possible to reduce the number of components of the vehicle lamp 2.

According to the present embodiment, at least a part of the radar 5 can be hidden from the outside of the vehicle 1 by the light guide member 6 and the lower extending portion 140 of the lamp housing 14, and the optical pattern 69 formed by the light guide member 6 is visually recognized toward the outside. In this manner, the design of the appearance of the vehicle lamp 2 can be improved by the light guide member 6. Further, since the radar 5 is disposed outside the lamp chamber S, it is possible to suitably prevent operation performance of the radar 5 from being adversely affected by the heat generated from the illumination units 3 and 4 disposed inside the lamp chamber S. In this manner, it is possible to improve the design of the appearance of the vehicle lamp 2 and improve reliability of the radar 5 mounted on the vehicle lamp 2.

In the vehicle lamp 2 according to the present embodiment, the lower extending portion 140 that is a part of the lamp housing 14 is disposed between the light guide member 6 and the radar 5 in the front-rear direction. Therefore, even when the light guide member 6 does not emit light, the radar 5 can be hidden from the outside of the vehicle 1 by the lower extending portion 140. In this regard, in a case where the light guide member 6 functions as a turn signal lamp, the light guide member 6 is turned off when the vehicle 1 travels straight or when the vehicle 1 is stopped. However, since the radar 5 is hidden from the outside by the lower extending portion 140, a pedestrian or the like present outside the vehicle 1 cannot visually recognize the radar 5. In this manner, the light guide member 6 and the lower extending portion 140 can reliably hide the radar 5 from the outside of the vehicle 1 regardless of a traveling state of the vehicle 1.

In the present embodiment, the lower extending portion 140 of the lamp housing 14, the light emitting portion 61 of the light guide member 6, and the lower light transmitting portion 123 of the lamp cover 12 are disposed in a manner of facing the radar 5, and are present in the field of view F of the radar 5. Specifically, in the present embodiment, the lower extending portion 140, the light emitting portion 61, and the lower light transmitting portion 123 are disposed in a manner of facing the radar 5 such that all radio waves from the radar present in the field of view F pass through each of the lower extending portion 140, the light emitting portion 61, and the lower light transmitting portion 123.

Therefore, each of the lower extending portion 140, the light emitting portion 61, and the lower light transmitting portion 123 is configured to transmit the radio waves emitted from the radar 5 toward the outside of the vehicle 1. Further, in order to improve the reliability of the radar data acquired by the radar 5, it is desirable to reduce the reflectance of each of the lower extending portion 140, the light emitting portion 61, and the lower light transmitting portion 123 with respect to the radio waves emitted from the radar 5 to be low.

Based on the above viewpoint, a thickness t1 of the light emitting portion 61 of the light guide member 6 will be described below with reference to FIG. 6. FIG. 6 is a view showing radio waves R1 and R2 reflected by the light emitting portion 61. The thickness t1 of the light emitting portion 61 shown in FIG. 6 is defined by the following equation (1).

[Equation 1]

$$t1 = \frac{\lambda}{2\sqrt{\varepsilon_{r1}}} \times n \qquad (1)$$

Here, λ is a wavelength of the radio waves emitted from the radar 5. $\varepsilon_{r1}$ is a relative permittivity of the light guide member 6, and n is an integer equal to or larger than 1.

As described above, when the thickness t1 of the light emitting portion 61 is set to a thickness defined by the above equation (1), the radio waves R2 reflected by the first surface 67 of the light emitting portion 61 that faces the radar 5 via the lower extending portion 140 and the radio waves R1 reflected by the second surface 66 of the light emitting portion 61 that is located at a side opposite to the first surface 67 weaken each other. Specifically, since a phase difference Δθ between the reflected radio waves R2 and the reflected radio waves R1 is (2m+1)π (m is an integer equal to larger than zero), the reflected radio waves R1 and the reflected radio waves R2 weaken each other. As a result, the reflectance of the light emitting portion 61 with respect to the radio waves emitted from the radar 5 can be reduced to be low. Therefore, since an intensity of the radio waves reflected by the light emitting portion 61 is weak, it is possible to avoid a situation in which the reflected radio waves are received by the radar 5 and adversely affect the radar data as a noise component. For example, when the wavelength λ of the radio waves of the radar 5 is 3.922 mm, the relative permittivity $\varepsilon_{r1}$ of the light guide member 6 made of acrylic resin is 2.57, and n=2, the thickness t1 of the light emitting portion 61 is about 2.45 mm.

Further, a thickness t2 of the lower extending portion 140 of the lamp housing 14 will be described below with reference to FIG. 7. FIG. 7 is a view showing the radio waves R1 and R2 reflected by the lower extending portion 140. The thickness t2 of the lower extending portion 140 shown in FIG. 7 is defined by the following equation (2).

[Equation 2]
$$t2 = \frac{\lambda}{2\sqrt{\varepsilon_{r2}}} \times n \quad (2)$$

Here, λ is a wavelength of the radio waves emitted from the radar 5. $\varepsilon_{r2}$ is a relative permittivity of the lamp housing 14, and n is an integer equal to or larger than 1.

As described above, when the thickness t2 of the lower extending portion 140 is set to a thickness defined by the above equation (2), the radio waves R2 reflected by the first surface 143 of the lower extending portion 140 that faces the radar 5 and the radio waves R1 reflected by the second surface 142 of the lower extending portion 140 located at a side opposite to the first surface 143 weaken each other. Specifically, since a phase difference Δθ between the reflected radio waves R2 and the reflected radio waves R1 is (2m+1)π (m is an integer equal to larger than zero), the reflected radio waves R1 and the reflected radio waves R2 weaken each other. As a result, the reflectance of the lower extending portion 140 with respect to the radio waves emitted from the radar 5 can be reduced to be low. Therefore, since an intensity of the radio waves reflected by the lower extending portion 140 is weak, it is possible to avoid a situation in which the reflected radio waves are received by the radar 5 and adversely affect the radar data as a noise component. For example, when the wavelength λ of the radio waves of the radar 5 is 3.922 mm, the relative permittivity $\varepsilon_{r2}$ of the lamp housing 14 made of AAS resin is 2.87, and n=2, the thickness t2 of the lower extending portion 140 is about 2.31 mm.

A thickness t3 of the lower light transmitting portion 123 of the lamp cover 12 will be described below with reference to FIG. 8. FIG. 8 is a view showing the radio waves R1 and R2 reflected by the lower light transmitting portion 123. The thickness t3 of the lower light transmitting portion 123 shown in FIG. 8 is defined by the following equation (3).

[Equation 3]
$$t3 = \frac{\lambda}{2\sqrt{\varepsilon_{r3}}} \times n \quad (3)$$

Here, λ is a wavelength of the radio waves emitted from the radar 5. $\varepsilon_{r3}$ is a relative permittivity of the lamp cover 12, and n is an integer equal to or larger than 1.

In this manner, when the thickness t3 of the lower light transmitting portion 123 is set to a thickness defined by the above equation (3), the radio waves R2 reflected by the first surface 127 of the lower light transmitting portion 123 that faces the radar 5 via the lower extending portion part 140 and the light guide member 6 and the radio waves R1 reflected by the second surface 126 of the lower light transmitting portion 123 located at a side opposite to the first surface 127 weaken each other. Specifically, since a phase difference Δθ between the reflected radio waves R2 and the reflected radio waves R1 is (2m+1)π (m is an integer equal to larger than zero), the reflected radio waves R1 and the reflected radio waves R2 weaken each other. As a result, the reflectance of the lower light transmitting portion 123 with respect to the radio waves emitted from the radar 5 can be reduced to be low. Therefore, since an intensity of the radio waves reflected by the lower light transmitting portion 123 is weak, it is possible to avoid a situation in which the reflected radio waves are received by the radar 5 and adversely affect the radar data as a noise component. For example, when the wavelength λ of the radio waves of the radar 5 is 3.922 mm, the relative permittivity $\varepsilon_{r3}$ of the lamp cover 12 made of acrylic resin is 2.57, and n=2, the thickness t3 of the lower light transmitting portion 123 is about 2.45 mm.

Although a part of the radar 5 including the antenna unit 52 is hidden by the lower extending portion 140, the light emitting portion 61, and the lower light transmitting portion 123, and the other part of the radar 5 is hidden by the bumper 100 in the description of present embodiment, the present embodiment is not limited thereto. In this regard, the entire radar 5 may be hidden by the lower extending portion 140, the light emitting portion 61, and the lower light transmitting portion 123.

Although the two illumination units 3 and 4 are provided in the vehicle lamp 2 in the description of the present embodiment, the present embodiment is not limited thereto. In this regard, the number of illumination units provided in the vehicle lamp 2 is not particularly limited.

Although the lower extending portion 140 of the lamp housing 14 is disposed between the light guide member 6 and the radar 5 in the front-rear direction in the description of the present embodiment, the present embodiment is not limited thereto. For example, the lower extending portion 140 may not be provided between the light guide member 6 and the radar 5. In this case, the radar 5 may be hidden from the outside of the vehicle 1 only by the optical pattern 69 formed on the light emitting portion 61. Further, in this case, a decorative film may be provided on the first surface 67 of the light emitting portion 61. Even when the light emitting portion 61 does not emit light, it is possible to hide the radar 5 from the outside of the vehicle 1 by the decorative film. The decorative film is formed by, for example, a polymer multilayer film mirror (for example, PICASUS (registered trademark) manufactured by Toray Industries, Inc.) in which a polymer thin film having a low refractive index and a polymer thin film having a high refractive index are alternately stacked in multiple layers.

Although the plurality of steps 68 are formed on the first surface 67 of the light emitting portion 61 in the description of the present embodiment, the present embodiment is not limited thereto. In this regard, the plurality of steps 68 may be formed on the second surface 66 of the light emitting portion 61, or may be formed on both the first surface 67 and the second surface 66.

Although the vehicle lamp 2 functions as a rear lamp in the description of the present embodiment, the present embodiment is not limited thereto. For example, the vehicle lamp 2 may be mounted on a front surface of the vehicle 1 and may function as a head lamp on which the radar 5 is mounted. In this case, the illumination unit 3 functions as one of a high beam illumination unit and a low beam illumination unit, and the illumination unit 4 functions as the other one of the high beam illumination unit and the low beam illumination unit. Further, in this case, the radar 5 may be configured to acquire radar data indicating a surrounding environment in a region ahead of the vehicle 1, and the light guide member 6 that hides the radar 5 from the outside of the vehicle 1 may function as a daytime running lamp (DRL).

Further, in a case where the vehicle lamp 2 functions as a head lamp, the light guide member 6 and the lamp cover 12 may be formed of polycarbonate in consideration of heat resistance to heat generated from the illumination units 3 and 4. The lamp housing 14 may be made of polypropylene.

When the wavelength λ of the radio waves of the radar 5 is 3.922 mm, the relative permittivity $\varepsilon_{r1}$ of the light guide member 6 made of polycarbonate is 2.76, and n=2, the thickness t1 of the light emitting portion 61 shown in FIG. 6 is about 2.36 mm.

When the wavelength λ of the radio waves of the radar 5 is 3.922 mm, the relative permittivity $\varepsilon_{r2}$ of the lamp cover 12 made of polypropylene is 2.65, and n=2, the thickness t2 of the lower extending portion 140 shown in FIG. 7 is about 2.41 mm.

When the wavelength λ of the radio waves of the radar 5 is 3.922 mm, the relative permittivity $\varepsilon_{r3}$ of the lamp cover 12 made of polycarbonate is 2.76, and n=2, the thickness t3 of the lower light transmitting portion 123 shown in FIG. 8 is about 2.36 mm Modification of First Embodiment Next, a left vehicle lamp 20L according to a modification of the first embodiment will be described below with reference to FIG. 9. FIG. 9 is a longitudinal cross sectional view showing the left vehicle lamp 20L according to the modification. In the following description, components having the same reference numerals as those of the components already described in the embodiment described above will not be repeatedly described.

As shown in FIG. 9, the left vehicle lamp 20L is different from the left vehicle lamp 2L shown in FIG. 2 in that the radar 5 is fixed to a vehicle body 210 via a support member 8a. The radar 5 is supported and fixed by the support member 8a that is a bracket made of metal or resin. The support member 8a is fixed to the vehicle body 210 via a screw 380 that is a fixing unit. The lamp housing 14 is fixed to the vehicle body 210 via a screw 321.

According to the present example, the radar 5 is separated from the lamp housing 14, and is fixed to the vehicle body 210 in advance via the support member 8a. Therefore, at the time when the left vehicle lamp 20L is fixed to the vehicle body 210, at least a part of the radar 5 can be hidden from the outside of the vehicle by light emitted from the light guide member 6. In this manner, the design of the appearance of the left vehicle lamp 20L can be improved by the light guide member 6.

Second Embodiment

Hereinafter, a second embodiment of the present disclosure (hereinafter, simply referred to as "the present embodiment") will be described with reference to the drawings. Dimensions of members shown in the drawings may be different from actual dimensions of the members for the sake of convenience of description.

In the description of the present embodiment, members having the same reference numerals as those of the members already described in the first embodiment may not be repeatedly described.

First, a vehicle 1A according to the present embodiment will be described with reference to FIG. 10. FIG. 10 is a rear view showing the vehicle 1A including a left vehicle lamp 102L and a right vehicle lamp 102R. As shown in FIG. 10, the left vehicle lamp 102L is disposed at a left rear side of the vehicle 1A, and the right vehicle lamp 102R is disposed at a right rear side of the vehicle 1A. Each of the left vehicle lamp 102L and the right vehicle lamp 102R includes the radar 5.

In the present embodiment, the left vehicle lamp 102L and the right vehicle lamp 102R function as rear lamps. The left vehicle lamp 102L and the right vehicle lamp 102R have the same configuration. Therefore, a specific configuration of the left vehicle lamp 102L will be described with reference to FIG. 11 in the following description.

The left vehicle lamp 102L and the right vehicle lamp 102R may be collectively and simply referred to as a "vehicle lamp 102" for convenience of description. Although the vehicle lamp 102 that functions as a rear lamp will be described in the present embodiment, the vehicle lamp 102 may be a head lamp that is disposed on a front surface of the vehicle 1A and on which the radar 5 is mounted.

FIG. 11 is a longitudinal cross sectional view (a cross sectional view in the upper-lower direction) showing the left vehicle lamp 102L. As shown in FIG. 11, the left vehicle lamp 102L includes the lamp housing 14, the lamp cover 12 that covers an opening of the lamp housing 14, two illumination units 3 and 4, the radar 5, and a light guide member 106.

The light guide member 106 is disposed in the lamp chamber S and faces the radar 5 via the lower extending portion 140 so as to hide a part of the radar 5 from the outside of the vehicle 1A. Since the light guide member 106 is present in the field of view F of the radar 5, the light guide member 106 is configured to transmit radio waves emitted from the radar 5.

The light guide member 106 includes a light emitting portion 161 that emits light toward the outside of the vehicle 1A, a light guide portion 162 that guides light emitted from the light source 9, and a colored resin portion 70 formed of a non-transparent resin. A light emitting portion 51 and the light guide portion 162 of the light guide member 106 are formed of, for example, a transparent resin material such as polycarbonate or acrylic resin. In the present embodiment, the light emitting portion 161 and the colored resin portion 70 are integrally formed by two-color molding.

Hereinafter, the configuration of the light guide member 106 will be specifically described with reference to FIG. 12. FIG. 12 is an enlarged longitudinal cross sectional view showing the vicinity of the radar 5 shown in FIG. 11. As shown in FIG. 12, the left vehicle lamp 102L further includes the light source 9 disposed in the lamp chamber S and configured to emit light toward the light guide portion 162 of the light guide member 106. The light source 9 is mounted on a wiring board 19. The light source 9 may be formed of, for example, a semiconductor light emitting element such as an LED or an LD.

The light emitted from the light source 9 is incident on the light guide portion 162 through the opening 32 of the partition member 30, and then is reflected by a reflecting surface 163. A part of the light reflected by the reflecting surface 163 is emitted to the outside of the vehicle 1A via a light emission surface 165. On the other hand, the other part of the light reflected by the reflecting surface 163 is reflected by a reflecting surface 164, and then spreads into the light emitting portion 161.

The light emitting portion 161 includes a first surface 167 that faces the radar 5, a second surface 166 located at a side opposite to the first surface 167, and a plurality of steps 168 (see FIG. 13A) formed on the first surface 167. The plurality of steps 168 are configured to reflect the light spreading in the light emitting portion 161 toward the outside of the vehicle 1A.

As shown in FIG. 13A, for example, the plurality of steps 168 may be formed into a lattice shape on the first surface 167 of the light emitting portion 161. An interval d1 between adjacent steps 168 among the plurality of steps 168 is, for example, 400 μm. In this regard, the brightness of an optical pattern 169 (see FIG. 14) to be described later can be appropriately adjusted by adjusting the interval d1 between adjacent steps 168.

The steps 168 may be formed on the first surface 167 of the light emitting portion 161 as concave portions (see FIG. 13B), or may be formed on the first surface 167 as convex portions (see FIG. 13C). The depth d2 or the height d3 of the step 168 from the first surface 167 in the thickness direction of the light emitting portion 161 is, for example, in a range of larger than 0 μm and 300 μm or less. For example, when the thickness of the light emitting portion 161 is about 2.4 mm, the depth d2 or the height d3 of the step 168 may be about 30 μm.

In order to efficiently emit the light spreading in the light emitting portion 161 toward the outside of the vehicle 1A, it is preferable that the step 168 is formed into a hemispherical concave portion or convex portion. Since the light spreading in the light emitting portion 161 can be reflected toward the outside of the vehicle 1A by the plurality of steps 168, the light emitting portion 161 can be caused to emit light. In other words, a pedestrian or the like present outside the vehicle 1A or an occupant of another vehicle can visually recognize the light emission from the light guide member 106.

As shown in FIG. 14, the optical pattern 169 can be formed on the light emitting portion 161 by a collection of the plurality of steps 168. In the example shown in FIG. 14, the stripe-shaped optical pattern 169 can be formed on the light emitting portion 161 by a collection of the plurality of steps 168. In the present embodiment, a shape of the optical pattern 169 is not particularly limited, and the optical pattern 169 having a predetermined geometric pattern may be formed on the light emitting portion 161. In this manner, the design of the appearance of the left vehicle lamp 102L can be improved by a plurality of optical patterns 169 formed on the light emitting portion 161.

Next, the colored resin portion 70 of the light guide member 106 will be described below with reference to FIGS. 15A and 15B. FIG. 15A is a view showing the vicinity of a boundary B between the light emitting portion 161 and the colored resin portion 70 of the light guide member 106 according to the present embodiment. FIG. 15B is a view showing the vicinity of a boundary B between a light emitting portion 161a and a colored resin portion 70b of a light guide member 106a according to a comparative example. In the present embodiment, the light emitting portion 161 and the colored resin portion 70 are integrally formed by two-color molding.

As shown in FIG. 15A, an attachment portion 163a of the colored resin portion 70 and an attachment portion 170 of the light emitting portion 161 are attached to each other at the boundary B between the light emitting portion 161 and the colored resin portion 70. Further, at the boundary B, a first surface 165a of the colored resin portion 70 and the first surface 167 of the light emitting portion 161 are flush with each other, and a second surface 168a of the colored resin portion 70 and the second surface 166 of the light emitting portion 161 are flush with each other.

As described above, in the present embodiment, no convex portion is formed at the boundary B, and a surface of the light guide member 106 at the boundary B and the vicinity of the boundary B (specifically, a surface of the colored resin portion 70 and a surface of the light emitting portion 161 at the boundary B and the vicinity of the boundary B) is formed as a smooth surface.

Further, as shown in FIG. 15A, the thickness of the light guide member 106 excluding the light guide portion 162 (that is, the light emitting portion 161 and the colored resin portion 70) is constant along the upper-lower direction.

On the other hand, in the light guide member 106a according to the comparative example shown in FIG. 15B, the light emitting portion 161a and the colored resin portion 70b are integrally formed by two-color molding. On the other hand, at the boundary B between the light emitting portion 161a and the colored resin portion 70b, a convex portion 163b is formed on the colored resin portion 70b, and a convex portion 167b is formed on the light emitting portion 161a.

In the light guide member 106a according to the comparative example, when the boundary B between the light emitting portion 161a and the colored resin portion 70b is present in the field of view F of the radar 5, the radio waves emitted from the radar 5 is reflected by the convex portions 163b and 167b. As a result, the radio waves reflected by the convex portions 163b and 167b are received by the reception antenna of the radar 5, which may adversely affect the radar data.

On the other hand, in the light guide member 106 according to the present embodiment, the light emitting portion 161 and the colored resin portion 70 are integrally formed by the two-color molding method in which the convex portions 163b and 167b are not formed at the boundary B. As described above, in the light guide member 106, since no convex portion is formed at the boundary B, even when the boundary B is present in the field of view F of the radar 5, it is possible to suitably prevent the radio waves reflected by the light guide member 106 from adversely affecting the radar data.

The light guide member 106 may function as a lamp configured to present information related to traveling of the vehicle 1A (for example, stop information, turn information, rearward movement information, information related to an automatic driving mode, and the like) to the outside of the vehicle 1A. Specifically, the light guide member 106 may function as a stop lamp that presents information indicating that the vehicle 1A is stopped to the outside, a turn signal lamp that presents information indicating a turn (a right or left turn or a change of a traveling lane) of the vehicle 1A to the outside, a back up lamp that presents information indicating that the vehicle 1A travels rearward to the outside, or an automatic driving system (ADS) lamp that presents information related to an automatic driving mode of the vehicle 1A. As an example of the ADS lamp, the light guide member 106 may function as an ID lamp that is turned on or off in accordance with a driving mode of the vehicle 1A. The ID lamp is turned off when the driving mode of the vehicle 1A is a manual driving mode or a driving support mode, and the ID lamp is turned on when the driving mode of the vehicle 1A is an advanced driving support mode or a fully automatic driving mode.

For example, when the illumination unit 3 functions as a tail and stop lamp and the illumination unit 4 functions as a back up lamp, the light guide member 106 may function as a turn signal lamp. In this case, the light source 9 is configured to emit amber light. Further, when the illumination unit 3 functions as a tail and stop lamp and the illumination unit 4 functions as a turn signal lamp, the light guide member 106 may function as a back up lamp or an ADS lamp.

As described above, when the light guide member 106 functions as a turn signal lamp, a back up lamp, or an ADS lamp, it is not necessary to separately provide a lamp (for example, a turn signal lamp) having the same function as the light guide member 106 in the vehicle lamp 102. In this manner, it is possible to reduce the number of components of the vehicle lamp 102.

According to the present embodiment, at least a part of the radar 5 can be hidden from the outside of the vehicle 1A by the light guide member 106 and the lower extending portion 140 of the lamp housing 14, and the optical pattern 169 formed by the light guide member 106 is visually recognized toward the outside. In this manner, the design of an appearance of the vehicle lamp 102 can be improved by the light guide member 106. In particular, the design of the appearance of the vehicle lamp 102 can be further improved by the colored resin portion 70 formed integrally with the light emitting portion 161.

Further, since the radar 5 is disposed outside the lamp chamber S, it is possible to suitably prevent operation performance of the radar 5 from being adversely affected by the heat generated from the illumination units 3 and 4 disposed inside the lamp chamber S. In this manner, it is possible to improve the design of the appearance of the vehicle lamp 102 and improve reliability of the radar 5 mounted on the vehicle lamp 102.

In the vehicle lamp 102 according to the present embodiment, the lower extending portion 140 that is a part of the lamp housing 14 is disposed between the light guide member 106 and the radar 5 in the front-rear direction. Therefore, even when the light guide member 106 does not emit light, the radar 5 can be hidden from the outside of the vehicle 1A by the lower extending portion 140. In this regard, in a case where the light guide member 106 functions as a turn signal lamp, the light guide member 106 is turned off when the vehicle 1A travels straight or when the vehicle 1A is stopped. However, since the radar 5 is hidden from the outside by the lower extending portion 140, a pedestrian or the like present outside the vehicle 1A cannot visually recognize the radar 5 directly. In this manner, the light guide member 106 and the lower extending portion 140 can reliably hide the radar 5 from the outside of the vehicle 1A regardless of a traveling state of the vehicle 1A.

In the present embodiment, the lower extending portion 140 of the lamp housing 14, the light emitting portion 161 of the light guide member 106, and the lower light transmitting portion 123 of the lamp cover 12 are disposed in a manner of facing the radar 5, and are present in the field of view F of the radar 5. Specifically, in the present embodiment, the lower extending portion 140, the light emitting portion 161, and the lower light transmitting portion 123 are disposed in a manner of facing the radar 5 such that all radio waves from the radar present in the field of view F pass through each of the lower extending portion 140, the light emitting portion 161, and the lower light transmitting portion 123.

Therefore, each of the lower extending portion 140, the light emitting portion 161, and the lower light transmitting portion 123 is configured to transmit the radio waves emitted from the radar 5 toward the outside of the vehicle 1A. Further, in order to improve the reliability of the radar data acquired by the radar 5, it is desirable to reduce the reflectance of each of the lower extending portion 140, the light emitting portion 61, and the lower light transmitting portion 123 with respect to the radio waves emitted from the radar 5 to be low.

Based on the above viewpoint, a thickness t1 of the light emitting portion 161 of the light guide member 106 will be described below with reference to FIG. 16. FIG. 16 is a view showing radio waves R1 and R2 reflected by the light emitting portion 161. The thickness t1 of the light emitting portion 161 shown in FIG. 16 is defined by the following equation (4).

[Equation 4]

$$t1 = \frac{\lambda}{2\sqrt{\varepsilon_{r1}}} \times n \quad (4)$$

Here, $\lambda$ is a wavelength of the radio waves emitted from the radar 5. $\varepsilon_{r1}$ is a relative permittivity of the light guide member 106, and n is an integer equal to or larger than 1.

As described above, when the thickness t1 of the light emitting portion 161 is set to a thickness defined by the above equation (4), the radio waves R2 reflected by the first surface 167 of the light emitting portion 161 that faces the radar 5 via the lower extending portion 140 and the radio waves R1 reflected by the second surface 166 of the light emitting portion 161 that is located at a side opposite to the first surface 167 weaken each other. Specifically, since a phase difference $\Delta\theta$ between the reflected radio waves R2 and the reflected radio waves R1 is $(2m+1)\pi$ (m is an integer equal to larger than zero), the reflected radio waves R1 and the reflected radio waves R2 weaken each other. As a result, the reflectance of the light emitting portion 161 with respect to the radio waves emitted from the radar 5 can be reduced to be low. Therefore, since an intensity of the radio waves reflected by the light emitting portion 161 is weak, it is possible to avoid a situation in which the reflected radio waves are received by the radar 5 and adversely affect the radar data as a noise component. For example, when the wavelength $\lambda$ of the radio waves of the radar 5 is 3.922 mm, the relative permittivity $\varepsilon_{r1}$ of the light guide member 106 made of acrylic resin is 2.57, and n=2, the thickness t1 of the light emitting portion 161 is about 2.45 mm.

Although the lower extending portion 140 of the lamp housing 14 is disposed between the light guide member 106 and the radar 5 in the front-rear direction in the description of the present embodiment, the present embodiment is not limited thereto. For example, the lower extending portion 140 may not be provided between the light guide member 106 and the radar 5. In this case, the radar 5 may be hidden from the outside of the vehicle 1A only by the optical pattern 169 formed on the light emitting portion 161. Further, in this case, a decorative film may be provided on the first surface 167 of the light emitting portion 161. In this case, even in a situation where the light emitting portion 161 does not emit light, it is possible to hide the radar 5 from the outside of the vehicle 1A by the decorative film. In this manner, the radar 5 can be reliably hidden from the outside of the vehicle 1A by the light emitting portion 161 and the decorative film regardless of whether the light emitting portion 161 emits light or does not emit light. The decorative film is configured to transmit light emitted from the radar 5, and does not contain a metal material. In this regard, the decorative film may be formed by a polymer multilayer film mirror (for example, PICASUS (registered trademark) manufactured by Toray Industries, Inc.) in which a polymer thin film having a low refractive index and a polymer thin film having a high refractive index are alternately stacked in multiple layers.

Third Embodiment

Hereinafter, a third embodiment of the present disclosure (hereinafter, simply referred to as "the present embodiment") will be described with reference to the drawings. Dimensions of members shown in the drawings may be different from actual dimensions of the members for the sake of convenience of description.

In the description of the present embodiment, members having the same reference numerals as those of the members already described in the first embodiment may not be repeatedly described.

First, a vehicle 1B according to the present embodiment will be described with reference to FIG. 17. FIG. 17 is a rear view showing the vehicle 1B including a left vehicle lamp 202L and a right vehicle lamp 202R. As shown in FIG. 17, the left vehicle lamp 202L is disposed at a left rear side of the vehicle 1B, and the right vehicle lamp 202R is disposed at a right rear side of the vehicle 1B. Each of the left vehicle lamp 202L and the right vehicle lamp 202R includes the radar 5.

In the present embodiment, the left vehicle lamp 202L and the right vehicle lamp 202R function as rear lamps. The left vehicle lamp 202L and the right vehicle lamp 202R have the same configuration. Therefore, a specific configuration of the left vehicle lamp 202L will be described with reference to FIG. 18 in the following description.

The left vehicle lamp 202L and the right vehicle lamp 202R may be collectively and simply referred to as a "vehicle lamp 202" for convenience of description. Although the vehicle lamp 202 that functions as a rear lamp will be described in the present embodiment, the vehicle lamp 202 may be a head lamp that is disposed on a front surface of the vehicle 1B and on which the radar 5 is mounted.

FIG. 18 is a longitudinal cross sectional view (a cross sectional view in the upper-lower direction) showing the left vehicle lamp 202L. As shown in FIG. 18, the left vehicle lamp 202L includes a lamp housing 214, a lamp cover 212 that covers an opening of the lamp housing 214, two illumination units 3 and 4, the radar 5, and a light guide member 206.

The lamp housing 214 may be formed of, for example, a non-transparent resin material such as polypropylene and AAS resin (weather resistant ABS resin). The lamp cover 212 is formed of, for example, a resin material such as polycarbonate or acrylic resin. The lamp cover 212 includes a central light transmitting portion 224 and an upper extending portion 225 that is formed integrally with the central light transmitting portion 224 and extends in the upper direction.

The central light transmitting portion 224 faces the illumination units 3 and 4, and is configured to transmit light emitted from the illumination units 3 and 4. When each of the illumination units 3 and 4 is one of a tail lamp and a stop lamp, the central light transmitting portion 224 may be formed of a resin material colored in red. When the illumination unit 3 is configured as a tail and stop lamp and the illumination unit 4 is configured as a turn signal lamp or a back up lamp, a portion of the central light transmitting portion 224 that faces the illumination unit 3 may be formed of a resin material colored in red. Further, a portion of the central light transmitting portion 224 that faces the illumination unit 4 may be formed of a transparent resin material. The upper extending portion 225 is formed integrally with the central light transmitting portion 224 by, for example, two-color molding.

The two illumination units 3 and 4 are disposed in a lamp chamber S2 formed by the lamp housing 214 and the lamp cover 212, and are configured to emit light toward the rear of the vehicle 1B. In this regard, to be precise, the lamp chamber S2 is formed by the lamp housing 214, the lamp cover 212, and an upper extending portion 262 (to be described later) of the light guide member 206 that is formed integrally with the lamp cover 212. Each of the illumination units 3 and 4 functions as at least one of a tail lamp, a stop lamp, a tail and stop lamp, a turn signal lamp, and a back up lamp.

The radar 5 is disposed outside the lamp chamber S2, and is configured to acquire radar data indicating a surrounding environment of the vehicle 1B by emitting radio waves (for example, millimeter waves or microwaves) toward an outer side of the vehicle 1B. In the present embodiment, the radar 5 is configured to acquire radar data indicating a rear region of the vehicle 1B by emitting radio waves toward a rear side of the vehicle 1B. The radar 5 is, for example, a millimeter wave radar or a microwave radar. A vehicle control unit (in-vehicle computer) (not shown) is formed to specify the surrounding environment of the vehicle 1B (in particular, information on an object present outside the vehicle 1B) based on the radar data output from the radar 5.

The radar 5 is supported and fixed by the support member 8 that is a bracket made of a metal or a resin. The support member 8 is fixed to the lamp housing 214 via a screw (not shown). The support member 8 extends downward from the lamp housing 214. Since the radar 5 and the support member 8 are disposed outside the lamp chamber S2, it is possible to suitably prevent the operation of the radar 5 from being adversely affected by heat generated from the illumination units 3 and 4.

The light guide member 206 includes the upper extending portion 262 connected to the central light transmitting portion 224 of the lamp cover 212, and a light emitting portion 261 configured to emit light toward the outside of the vehicle 1B. The light guide member 206 is integrally formed with the central light transmitting portion 224 by two-color molding, and is integrally formed with a vehicle body panel that functions as the bumper 100. The light guide member 206 is disposed in a manner of facing the radar 5 so as to hide a part of the radar 5 from the outside of the vehicle 1B. Since the light guide member 206 is present in the field of view F of the radar 5, the light guide member 206 is configured to transmit radio waves emitted from the radar 5. The light guide member 206 is formed of, for example, a transparent resin material such as polycarbonate or acrylic resin.

A distance d between the radar 5 and the light emitting portion 261 in the front-rear direction may be set to, for example, 20 mm or more and 100 mm or less. When the distance d between the light emitting portion 261 and the radar 5 is 20 mm or more, the radio waves that are emitted from the radar 5 and reflected by the light emitting portion 261 is sufficiently attenuated until reaching the reception antenna of the radar 5. Therefore, it is possible to avoid a situation in which the reflected radio waves received by the radar 5 adversely affect the radar data as a noise component. On the other hand, when the distance d is 100 mm or less, all radio waves in the field of view F emitted from the radar 5 can pass through the light emitting portion 261.

In the present embodiment, most parts of the radar 5 including the antenna unit 52 are covered by the light emitting portion 261, and the remaining part of the radar 5 is covered by the bumper 100 and the lamp housing 214.

Hereinafter, configurations of the light guide member 206 and a photoconductor 7 will be specifically described with reference to FIG. 19. FIG. 19 is an enlarged longitudinal cross sectional view showing the vicinity of the radar 5 shown in FIG. 18. As shown in FIG. 19, the left vehicle lamp 202L further includes the light source 9 and the photoconductor 7. The light source 9 is disposed in the lamp chamber S2 and is configured to emit light toward the photoconductor 7. The light source 9 is mounted on a wiring board 219 and is electrically connected to a light source driving circuit (not shown). The light source 9 may be formed of, for example, a semiconductor light emitting element such as an LED or an LD.

The photoconductor 7 is disposed in the lamp chamber S2 and is optically connected to the light emitting portion 261 of the light guide member 206. The photoconductor 7 is configured to emit a part of light emitted from the light source 9 to the outside of the vehicle 1B and emit the other part of the light emitted from the light source 9 toward the light emitting portion 261. The photoconductor 7 includes a first reflecting surface 73, a second reflecting surface 74, a first light emission surface 75, and a second light emission surface 76.

The light emitted from the light source 9 is incident on the photoconductor 7 through an opening of a partition member 230, and then is reflected by the first reflecting surface 73. A part of the light reflected by the first reflecting surface 73 is emitted toward the outside of the vehicle 1B via the first light emission surface 75 and the upper extending portion 262. On the other hand, the other part of the light reflected by the first reflecting surface 73 is emitted toward the second reflecting surface 74. Thereafter, the light reflected by second reflecting surface 74 is emitted toward the light emitting portion 261 via the second light emission surface 76.

In this manner, since a part of the light emitted from the light source 9 is incident on the light emitting portion 261 via the photoconductor 7, the light guide member 206 can be caused to emit light due to the light emitted from the light source 9. That is, the light guide member 206 can emit light toward the outside of the vehicle 1B due to the light from the light source 9. Since the photoconductor 7 is disposed between the light source 9 and the light guide member 206, a part of the light emitted from the light source 9 can be efficiently emitted toward the outside of the vehicle 1B, and the other part of the light emitted from the light source can be efficiently emitted toward the light guide member 206.

The light emitting portion 261 includes a first surface 267 that faces the radar 5, a second surface 266 located at a side opposite to the first surface 267, and a plurality of steps 268 (see FIG. 20A) formed on the first surface 267. The plurality of steps 268 are configured to reflect light spreading in the light emitting portion 261 toward the outside of the vehicle 1B.

As shown in FIG. 20A, for example, the plurality of steps 268 may be formed into a lattice shape on the first surface 267 of the light emitting portion 261. An interval d1 between adjacent steps 268 among the plurality of steps 268 is, for example, 400 µm. In this regard, the brightness of the optical pattern 269 (see FIG. 21) to be described later can be appropriately adjusted by adjusting the interval d1 between adjacent steps 268.

The steps 268 may be formed on the first surface 267 of the light emitting portion 261 as concave portions (see FIG. 20B), or may be formed on the first surface 267 as convex portions (see FIG. 20C). A depth d2 or a height d3 of the step 268 from the first surface 267 in the thickness direction of the light emitting portion 261 is, for example, in a range of larger than 0 µm and 300 µm or less. For example, when the thickness of the light emitting portion 261 is about 2.4 mm, the depth d2 or the height d3 of the step 268 may be about 30 µm.

Further, in order to efficiently emit the light spreading in the light emitting portion 261 toward the outside of the vehicle 1B, it is preferable that the step 268 is formed into a hemispherical concave portion or convex portion. Since the light spreading inside the light emitting portion 261 can be reflected toward the outside of the vehicle 1B by the plurality of steps 268, the light emitting portion 261 can be caused to emit light. In other words, a pedestrian or the like present outside the vehicle 1B or an occupant of another vehicle can visually recognize the light emission of the light guide member 206.

As shown in FIG. 21, the optical pattern 269 can be formed on the light emitting portion 261 by a collection of the plurality of steps 268. In the example shown in FIG. 21, the stripe-shaped optical pattern 269 can be formed on the light emitting portion 261 by a collection of the plurality of steps 268. In the present embodiment, a shape of the optical pattern 269 is not particularly limited, and the optical pattern 269 having a predetermined geometric pattern may be formed on the light emitting portion 261. In this manner, the design of the appearance of the left vehicle lamp 202L can be improved by a plurality of optical patterns 269 formed on the light emitting portion 261.

The light guide member 206 may function as a lamp configured to present information related to traveling of the vehicle 1B (for example, stop information, turn information, rearward movement information, information related to an automatic driving mode, and the like) to the outside of the vehicle 1B. Specifically, the light guide member 206 may function as a stop lamp that presents information indicating that the vehicle 1B is stopped to the outside, a turn signal lamp that presents information indicating a turn (a right or left turn or a change of a traveling lane) of the vehicle 1B to the outside, a back up lamp that presents information indicating that the vehicle 1B travels rearward to the outside, or an automatic driving system (ADS) lamp that presents information related to an automatic driving mode of the vehicle 1B. As an example of the ADS lamp, the light guide member 206 may function as an ID lamp that is turned on or off in accordance with a driving mode of the vehicle 1B. The ID lamp is turned off when the driving mode of the vehicle 1B is a manual driving mode or a driving support mode, and the ID lamp is turned on when the driving mode of the vehicle 1B is an advanced driving support mode or a fully automatic driving mode.

For example, when the illumination unit 3 functions as a tail and stop lamp and the illumination unit 4 functions as a back up lamp, the light guide member 206 may function as a turn signal lamp. In this case, the light source 9 is configured to emit amber light. Further, when the illumination unit 3 functions as a tail and stop lamp and the illumination unit 4 functions as a turn signal lamp, the light guide member 206 may function as a back up lamp or an ADS lamp.

As described above, when the light guide member 206 functions as a turn signal lamp, a back up lamp, or an ADS lamp, it is not necessary to separately provide a lamp (for example, a turn signal lamp) having the same function as the light guide member 206 in the vehicle lamp 202. In this manner, it is possible to reduce the number of components of the vehicle lamp 202.

According to the present embodiment, at least a part of the radar 5 can be hidden from the outside of the vehicle 1B by the light guide member 206, and light from the light guide member 206 is emitted toward the outside of the vehicle 1B. In this manner, the design of the appearance of the vehicle lamp 202 can be improved by the light guide member 206.

Further, since the light guide member 206 is formed integrally with the lamp cover 212, it is possible to save time and effort for attaching the light guide member 206 to the vehicle lamp 202, and it is possible to further improve the design of the appearance of the vehicle lamp 202 by integrating the light guide member 206 and the lamp cover 212.

According to the present embodiment, the light guide member 206 is formed integrally with a vehicle body panel that functions as the bumper 100. In this manner, it is possible to further improve the design of the appearance of the vehicle 1B by integrating the lamp cover 212, the light guide member 206, and the vehicle body panel.

In the present embodiment, the light emitting portion 261 of the light guide member 206 is disposed in a manner of facing the radar 5, and is present in the field of view F of the radar 5. Specifically, the light emitting portion 261 is disposed in a manner of facing the radar 5 such that all radio waves in the field of view F emitted from the radar 5 pass through the light emitting portion 261.

Therefore, the light emitting portion 261 is configured to transmit the radio waves emitted from the radar 5 toward the outside of the vehicle 1B. Further, in order to improve the reliability of the radar data acquired by the radar 5, it is desirable to reduce the reflectance of the light emitting portion 261 with respect to the radio waves emitted from the radar 5 to be low.

Based on the above viewpoint, a thickness t1 of the light emitting portion 261 of the light guide member 206 will be described below with reference to FIG. 22. FIG. 22 is a view showing radio waves R1 and R2 reflected by the light emitting portion 261. The thickness t1 of the light emitting portion 261 shown in FIG. 22 is defined by the following equation (5).

[Equation 5]

$$t1 = \frac{\lambda}{2\sqrt{\varepsilon_{r1}}} \times n \quad (5)$$

Here, $\lambda$ is a wavelength of the radio waves emitted from the radar 5. $\varepsilon_{r1}$ is a relative permittivity of the light guide member 206 (light emitting portion 261), and n is an integer equal to or larger than 1.

As described above, when the thickness t1 of the light emitting portion 261 is set to a thickness defined by the above equation (5), the radio waves R2 reflected by the first surface 267 of the light emitting portion 261 that faces the radar 5 and the radio waves R1 reflected by the second surface 266 of the light emitting portion 261 that is located at a side opposite to the first surface 267 weaken each other. Specifically, since a phase difference $\Delta\theta$ between the reflected radio waves R2 and the reflected radio waves R1 is $(2m+1)\pi$ (m is an integer equal to larger than zero), the reflected radio waves R1 and the reflected radio waves R2 weaken each other. As a result, the reflectance of the light emitting portion 261 with respect to the radio waves emitted from the radar 5 can be reduced to be low. Therefore, since an intensity of the radio waves reflected by the light emitting portion 261 is weak, it is possible to avoid a situation in which the reflected radio waves are received by the radar 5 and adversely affect the radar data as a noise component. For example, when the wavelength $\lambda$ of the radio waves of the radar 5 is 3.922 mm, the relative permittivity $\varepsilon_{r1}$ of the light guide member 206 made of acrylic resin is 2.57, and n=2, the thickness t1 of the light emitting portion 261 is about 2.45 mm.

Although most parts of the radar 5 including the antenna unit 52 are hidden by the light emitting portion 261, and the remaining part of the radar 5 is hidden by the bumper 100 and the lamp housing 214 in the description of the present embodiment, the present embodiment is not limited thereto. In this regard, the entire radar 5 may be hidden by the light emitting portion 261.

Although two illumination units 3 and 4 are provided in the vehicle lamp 202 in the description of the present embodiment, the present embodiment is not limited thereto. In this regard, the number of illumination units provided in the vehicle lamp 202 is not particularly limited.

Although the light emitted from the light source 9 is incident on the light emitting portion 261 via the photoconductor 7 in the description of the present embodiment, the present embodiment is not limited thereto. In this regard, no photoconductor 7 may be provided in the vehicle lamp 202. In this case, the light emitted from the light source 9 may be directly incident on the light emitting portion 261.

The light guide member 206 may not include the upper extending portion 262. In this case, the central light transmitting portion 224 of the lamp cover 212 may be connected to one end of the lamp housing 214, and one end of the light emitting portion 261 may be formed integrally with the central light transmitting portion 224.

In the vehicle lamp 202 according to the present embodiment, a decorative film may be provided on the first surface 267 of the light emitting portion 261. In this case, even in a situation where the light emitting portion 261 does not emit light, it is possible to hide the radar 5 from the outside of the vehicle 1B by the decorative film. In this manner, the radar 5 can be reliably hidden from the outside of the vehicle 1B by the light emitting portion 261 and the decorative film regardless of whether the light emitting portion 261 emits light or does not emit light. The decorative film is configured to transmit light emitted from the radar 5, and does not contain a metal material. In this regard, the decorative film may be formed by a polymer multilayer film mirror (for example, PICASUS (registered trademark) manufactured by Toray Industries, Inc.) in which a polymer thin film having a low refractive index and a polymer thin film having a high refractive index are alternately stacked in multiple layers.

Although a plurality of steps 268 are formed on the first surface 267 of the light emitting portion 261 in the description of the present embodiment, the present embodiment is not limited thereto. In this regard, the plurality of steps 268 may be formed on the second surface 266 of the light emitting portion 261, or may be formed on both the first surface 267 and the second surface 266.

Although the vehicle lamp 202 functions as a rear lamp in the description of the present embodiment, the present embodiment is not limited thereto. For example, the vehicle lamp 202 may be mounted on a front surface of the vehicle 1B and may function as a head lamp on which the radar 5 is mounted. In this case, the illumination unit 3 functions as one of a high beam illumination unit and a low beam illumination unit, and the illumination unit 4 functions as the other one of the high beam illumination unit and the low beam illumination unit. Further, in this case, the radar 5 is configured to acquire radar data indicating a surrounding environment in a front region of the vehicle 1B. The light guide member 206 that hides the radar 5 from the outside of the vehicle 1B may function as one of a daytime running lamp (DRL), a turn signal lamp, and an ADS lamp.

Further, in a case where the vehicle lamp 202 functions as a head lamp, the light guide member 206 and the lamp cover 212 may be formed of polycarbonate in consideration of heat resistance to heat generated from the illumination units 3 and 4. The lamp housing 214 may be made of polypropylene.

When the wavelength λ of the radio waves of the radar 5 is 3.922 mm, the relative permittivity $\varepsilon_{r1}$ of the light guide member 206 made of polycarbonate is 2.76, and n=2, the thickness t1 of the light emitting portion 261 shown in FIG. 22 is about 2.36 mm.

Fourth Embodiment

Hereinafter, a fourth embodiment of the present disclosure (hereinafter, simply referred to as "the present embodiment") will be described with reference to the drawings. Dimensions of members shown in the drawings may be different from actual dimensions of the members for the sake of convenience of description.

In the description of the present embodiment, members having the same reference numerals as those of the members already described in the third embodiment may not be repeatedly described.

First, a vehicle 1C according to the present embodiment will be described with reference to FIG. 23. FIG. 23 is a rear view showing the vehicle 1C including a left vehicle lamp 302L and a right vehicle lamp 302R. As shown in FIG. 23, the left vehicle lamp 302L is disposed at a left rear side of the vehicle 1C, and the right vehicle lamp 302R is disposed at a right rear side of the vehicle 1C. Each of the left vehicle lamp 302L and the right vehicle lamp 302R includes the radar 5.

In the present embodiment, the left vehicle lamp 302L and the right vehicle lamp 302R function as rear lamps. The left vehicle lamp 302L and the right vehicle lamp 302R have the same configuration. Therefore, a specific configuration of the left vehicle lamp 302L will be described with reference to FIG. 24 in the following description.

The left vehicle lamp 302L and the right vehicle lamp 302R may be collectively and simply referred to as a "vehicle lamp 302" for convenience of description. Although the vehicle lamp 302 that functions as a rear lamp will be described in the present embodiment, the vehicle lamp 302 may be a head lamp that is disposed on a front surface of the vehicle 1C and on which the radar 5 is mounted.

FIG. 24 is a longitudinal cross sectional view (a cross sectional view in the upper-lower direction) showing the left vehicle lamp 302L. As shown in FIG. 24, the left vehicle lamp 302L includes the lamp housing 214, the lamp cover 212 that covers an opening of the lamp housing 214, two illumination units 3 and 4, the radar 5, and the light guide member 206.

The light guide member 206 includes the upper extending portion 262 connected to the central light transmitting portion 224 of the lamp cover 212, and a light emitting portion 261 configured to emit light toward the outside of the vehicle 1C. The light guide member 206 is integrally formed with the central light transmitting portion 224 by two-color molding, and is integrally formed with a vehicle body panel that functions as the bumper 100. The light guide member 206 is disposed in a manner of facing the radar 5 so as to hide a part of the radar 5 from the outside of the vehicle 1C. Since the light guide member 206 is present in the field of view F of the radar 5, the light guide member 206 is configured to transmit radio waves emitted from the radar 5. The light guide member 206 is formed of, for example, a transparent resin material such as polycarbonate or acrylic resin.

A distance d between the radar 5 and the light emitting portion 261 in the front-rear direction may be set to, for example, 20 mm or more and 100 mm or less. When the distance d between the light emitting portion 261 and the radar 5 is 20 mm or more, the radio waves that are emitted from the radar 5 and reflected by the light emitting portion 261 is sufficiently attenuated until reaching the reception antenna of the radar 5. Therefore, it is possible to avoid a situation in which the reflected radio waves received by the radar 5 adversely affect the radar data as a noise component. On the other hand, when the distance d is 100 mm or less, all radio waves in the field of view F emitted from the radar 5 can pass through the light emitting portion 261.

In the present embodiment, most parts of the radar 5 including the antenna unit 52 are covered by the light emitting portion 261, and the remaining part of the radar 5 is covered by the bumper 100 and the lamp housing 214.

Hereinafter, configurations of the light guide member 206 and the photoconductor 7 will be specifically described with reference to FIG. 25. FIG. 25 is an enlarged longitudinal cross sectional view showing the vicinity of the radar 5 shown in FIG. 24. As shown in FIG. 25, the left vehicle lamp 302L further includes the light source 9 and the photoconductor 7. The light source 9 is disposed in the lamp chamber S1 and is configured to emit light toward the photoconductor 7. The light source 9 is mounted on a wiring board 219 and is electrically connected to a light source driving circuit (not shown). The light source 9 may be formed of, for example, a semiconductor light emitting element such as an LED or an LD.

As shown in FIG. 25, a decorative film 10 is bonded to the first surface 267 of the light emitting portion 261. The decorative film 10 is configured to transmit radio waves emitted from the radar 5 and hide the radar 5 from the outside of the vehicle 1C. The decorative film 10 does not contain a metal material. The decorative film 10 has a high transmittance in a frequency band of radio waves (for example, millimeter waves) emitted from the radar 5. A thickness of the decorative film 10 is, for example, 0.1 mm. The decorative film 10 may be provided on the entire or a part of the first surface 267. For example, when the decorative film 10 is provided on a part of the first surface 267, the decorative film 10 may be provided on the first surface 267 so as to face a portion of the first surface 267 other than a portion of the first surface 267 where the first surface 267 faces the antenna unit 52 of the radar 5.

As shown in FIG. 26, as an example of a layer structure of the decorative film 10, the decorative film 10 includes a binder layer 110 that functions as an adhesive layer, a decorative layer 111 that is formed on the binder layer 110, a multilayer mirror 112 that is formed on the decorative layer 111, a hard coat layer 113 that is formed on the multilayer mirror 112, and a protective layer 114 that is formed on the hard coat layer 113. In the multilayer mirror 112, for example, a plurality of polymer layers having low refractive indexes and a plurality of polymer layers having high refractive indexes are alternately stacked. Since the multilayer mirror 112 is provided on the decorative film 10, it is possible to increase the reflectance of the decorative film 10 with respect to visible light. For example, PICASUS (registered trademark) manufactured by Toray Industries, Inc. may be used as the multilayer mirror 112.

According to the present embodiment, at least a part of the radar 5 can be hidden from the outside of the vehicle 1C by the light guide member 206, and light from the light guide member 206 is emitted toward the outside of the vehicle 1C. In this manner, the design of the appearance of the vehicle lamp 302 can be improved by the light guide member 206. Further, since the light guide member 206 is formed integrally with the lamp cover 212, it is possible to save time and effort for attaching the light guide member 206 to the vehicle lamp 302, and it is possible to further improve the design of the appearance of the vehicle lamp 302 by integrating the light guide member 206 and the lamp cover 212.

According to the present embodiment, the light guide member 206 is formed integrally with a vehicle body panel that functions as the bumper 100. In this manner, it is possible to further improve the design of the appearance of the vehicle 1C by integrating the lamp cover 212, the light guide member 206, and the vehicle body panel.

In addition, even when the light guide member 206 does not emit light, the radar 5 can be hidden from the outside of the vehicle 1C by the decorative film 10, so that the radar 5 can be reliably hidden from the outside of the vehicle 1C regardless whether the light guide member 206 emits light.

Further, the decorative film 10 faces the radar 5 so that all radio waves in the field of view F emitted from the radar 5 pass through the decorative film 10, and the decorative film 10 does not contain a metal material and has a high transmittance with respect to the radio waves. Therefore, it is possible to suitably prevent the decorative film 10 from adversely affecting the radio waves emitted from the radar 5. As a result, it is possible to suitably prevent the reliability of the radar data from being lowered by the decorative film 10.

In the present embodiment, the light emitting portion 261 of the light guide member 206 is disposed in a manner of facing the radar 5, and is present in the field of view F of the radar 5. Specifically, the light emitting portion 261 is disposed in a manner of facing the radar 5 such that all radio waves in the field of view F emitted from the radar 5 pass through the light emitting portion 261.

Therefore, the light emitting portion 261 is configured to transmit the radio waves emitted from the radar 5 toward the outside of the vehicle 1C. Further, in order to improve the reliability of the radar data acquired by the radar 5, it is desirable to reduce the reflectance of the light emitting portion 261 with respect to the radio waves emitted from the radar 5 to be low.

Although most parts of the radar 5 including the antenna unit 52 are hidden by the light emitting portion 261, and the remaining part of the radar 5 is hidden by the bumper 100 and the lamp housing 214 in the description of the present embodiment, the present embodiment is not limited thereto. In this regard, the entire radar 5 may be hidden by the light emitting portion 261.

Fifth Embodiment

Hereinafter, a fifth embodiment of the present disclosure (hereinafter, simply referred to as "the present embodiment") will be described with reference to the drawings. Dimensions of members shown in the drawings may be different from actual dimensions of the members for the sake of convenience of description.

In the description of the present embodiment, members having the same reference numerals as those of the members already described in the first embodiment may not be repeatedly described.

It is assumed that directions (the upper-lower direction, the front-rear direction, and the left-right direction) set for a radar module 300 shown in FIG. 27 coincide with the directions (the upper-lower direction, the front-rear direction, and the left-right direction) set for the a left vehicle lamp 402L.

First, the left vehicle lamp 402L according to the present embodiment will be described below with reference to FIG. 27. FIG. 27 is a vertical cross sectional view schematically showing the left vehicle lamp 402L and the radar module 300. As shown in FIG. 27, the left vehicle lamp 402L is a rear lamp (or a rear combination lamp) disposed at a left rear side of a vehicle (not shown), and includes a lamp housing 314, a lamp cover 312 that covers an opening of the lamp housing 314, and two illumination units 3 and 4. Although the left vehicle lamp 402L that functions as a rear lamp will be described in the present embodiment, the left vehicle lamp 402L may be a head lamp that is disposed at a left front side of a vehicle. Further, a right vehicle lamp disposed at a right side of the vehicle is not particularly mentioned in the present embodiment. The right vehicle lamp has the same configuration as the left vehicle lamp 402L.

The lamp cover 312 is formed of, for example, a resin material such as polycarbonate or acrylic resin. The lamp cover 312 includes a central light transmitting portion 324, a lower light transmitting portion 323 that is formed integrally with the central light transmitting portion 324 and extends in the lower direction, and an upper extending portion 325 that is formed integrally with the central light transmitting portion 324 and extends in the upper direction.

The central light transmitting portion 324 faces the illumination units 3 and 4, and is configured to transmit light emitted from the illumination units 3 and 4. When each of the illumination units 3 and 4 is one of a tail lamp and a stop lamp, the central light transmitting portion 324 may be formed of a resin material colored in red. When the illumination unit 3 is configured as a tail and stop lamp and the illumination unit 4 is configured as a turn signal lamp or a back up lamp, a portion of the central light transmitting portion 324 that faces the illumination unit 3 may be formed of a resin material colored in red. Further, a portion of the central light transmitting portion 324 that faces the illumination unit 4 may be formed of a transparent resin material.

The lower light transmitting portion 323 is formed integrally with the central light transmitting portion 324 by, for example, two-color molding. The lower light transmitting portion 323 faces a photoconductor 360 and is configured to transmit light emitted from the photoconductor 360. The lower light transmitting portion 323 is formed of, for example, a transparent resin material. The upper extending portion 325 may also be formed integrally with the central light transmitting portion 324 by two-color molding.

The two illumination units 3 and 4 are disposed in a lamp chamber S2 formed by the lamp housing 314 and the lamp cover 312, and are configured to emit light toward the rear of the vehicle. Each of the illumination units 3 and 4 functions as at least one of a tail lamp, a stop lamp, a tail and stop lamp, a turn signal lamp, and a back up lamp.

The left vehicle lamp 402L further includes the light source 9 and the photoconductor 360 that are disposed in the lamp chamber S2. The light source 9 is configured to emit light toward the photoconductor 360. The light source 9 is mounted on a wiring board 319 and is electrically connected to a light source driving circuit (not shown). The light source 9 includes, for example, a semiconductor light emitting element such as an LED or an LD.

The photoconductor 360 may be optically connected to a light guide member 330. The photoconductor 360 is configured to emit a part of the light emitted from the light source 9 toward the outside of the vehicle, and emit the other part of the light emitted from the light source 9 toward the light guide member 330. The photoconductor 360 includes reflecting surfaces 363 and 364 and a light emission surface 365.

The light emitted from the light source 9 is incident on the photoconductor 360 through an opening of a partition member 370, and then is reflected by the reflecting surface 363. A part of the light reflected by the reflecting surface 363 is emitted to the outside of the vehicle via the light emission surface 365 and the lower light transmitting portion 323. On the other hand, the other part of the light reflected by reflecting surface 363 is emitted toward the reflecting surface 364. Thereafter, the light reflected by the reflecting surface 364 is incident on the light guide member 330 through an air gap between the light guide member 330 and the lower light transmitting portion 323. A distance d of the air gap between the light guide member 330 and the lower light transmitting portion 323 is, for example, 75 mm.

A color of the light emitted from the light source 9 may be the same as a color of light emitted from a first light source 323a and a color of light emitted from a second light source 323b to be described later (see FIG. 28). In this case, a pedestrian or the like present outside the vehicle can visually recognize the integrity between the left vehicle lamp 402L and the radar module 300 by the light emitted from a lower portion of the left vehicle lamp 402L and the light emitted from the light guide member 330 of the radar module 300. In this manner, it is possible to improve the design of the appearance of the vehicle on which the left vehicle lamp 402L and the radar module 300 are mounted.

Next, a structure of the radar module 300 will be described below. As shown in FIG. 27, the radar module 300 is mounted on the left vehicle lamp 402L. Specifically, the radar module 300 is disposed outside the lamp chamber S2 of the left vehicle lamp 402L, and is fixed to the lamp housing 314 via the support member 308 attached to the lamp housing 314. The radar module 300 includes the radar 5.

A specific structure of the radar module 300 will be described below with reference to FIG. 28. FIG. 28 is an enlarged vertical cross sectional view showing the radar module 300 shown in FIG. 27. As shown in FIG. 28, the radar module 300 further includes the light guide member 330, a support member 340, a circuit board 320, the first light source 323a, and the second light source 323b.

The light guide member 330 is disposed in a manner of facing the radar 5 so as to hide the radar 5 from the outside of the vehicle. The light guide member 330 is configured to transmit radio waves emitted from the radar 5. The light guide member 330 is formed of, for example, a transparent resin material such as an acrylic resin or polycarbonate.

The support member 340 is fixed to the light guide member 330 and supports the radar 5. In particular, the support member 340 is fixed to the light guide member 330 by engaging a first engagement concave portion 343a of the support member 340 with a first engagement convex portion 330a of the light guide member 330 and engaging a second engagement concave portion 343b of the support member 340 with a second engagement convex portion 330b of the light guide member 330. The radar 5 is disposed on a surface 326 of the circuit board 320, and the circuit board 320 is disposed on an inner surface 342 of the support member 340. In this manner, the radar 5 is supported by the support member 340 via the circuit board 320.

A space K is defined by the light guide member 330 and the support member 340, and the radar 5 and the circuit board 320 are disposed in the space K. A plurality of first light sources 323a, a plurality of second light sources 323b, and a light source control circuit unit (not shown) are disposed on the surface 326 of the circuit board 320.

Each of the first light source 323a and the second light source 323b includes, for example, a semiconductor light emitting element such as an LED or an LD. As shown in FIG. 31, a plurality of first light sources 323a (eight first light sources 323a in the example shown in FIG. 31) are arranged in the left-right direction in the vicinity of a first end portion 328 of the circuit board 320. Similarly, a plurality of second light sources 323b (eight second light sources 323b in the example shown in FIG. 31) are arranged in the left-right direction in the vicinity of a second end portion 329 of the circuit board 320 located at a side opposite to the first end portion 328.

Each of the first light sources 323a is configured to emit light toward an end surface 335a of a first extending portion 335 of the light guide member 330. Similarly, each of the second light sources 323b is configured to emit light toward an end surface 334b of a second extending portion 334 of the light guide member 330.

In the present embodiment, the number of the first light sources 323a and the number of the second light sources 323b are not particularly limited. For example, each of the number of first light sources 323a and the number of second light sources 323b may be one.

The light source control circuit unit is electrically connected to each of the first light source 323a and the second light source 323b, and is configured to control turning on of each of the first light source 323a and the second light source 323b. When the light guide member 330 functions as a turn signal lamp, the light source control circuit portion may control the turning on of each of the first light source 323a and the second light source 323b based on an instruction signal transmitted from a vehicle control unit.

Next, a structure of the light guide member 330 will be described in more detail. The light guide member 330 includes a light emitting portion 331, a first light guide portion 338 connected to one end of the light emitting portion 331, a second light guide portion 339 connected to the other end of the light emitting portion 331, the first extending portion 335 connected to the first light guide portion 338, and the second extending portion 334 connected to the second light guide portion 339.

The light emitting portion 331 includes an inner surface 333 (an example of a first surface) that faces the radar 5, an outer surface 332 (an example of a second surface) located at a side opposite to the inner surface 333, and a plurality of steps 368 (see FIG. 29A) formed on the inner surface 333. The plurality of steps 368 are configured to emit the light spreading in the light emitting portion 331 of the light guide member 330 toward the outside of the vehicle.

As shown in FIG. 29A, for example, the plurality of steps 368 may be formed into a lattice shape on the inner surface 333 of the light emitting portion 331. An interval d1 between adjacent steps 368 among the plurality of steps 368 is, for example, 400 μm. In this regard, the brightness of an optical pattern 369 (see FIG. 30) to be described later can be appropriately adjusted by adjusting the interval d1 between adjacent steps 368.

The plurality of steps 368 may be formed on the inner surface 333 of the light emitting portion 331 as concave portions (see FIG. 29B), or may be formed on the inner surface 333 as convex portions (see FIG. 29C). A depth d2 or a height d3 of the step 368 from the inner surface 333 in the thickness direction of the light emitting portion 331 is, for example, in a range of larger than 0 μm and 300 μm or less. For example, when the thickness of the light emitting portion 331 is about 2.4 mm, the depth d2 or the height d3 of the step 368 may be about 30 μm.

Further, in order to efficiently emit the light spreading in the light emitting portion 331 toward the outside of the vehicle, it is preferable that the step 368 is formed into a hemispherical concave portion or convex portion. Since the light spreading inside the light emitting portion 331 can be reflected toward the outside of the vehicle by the plurality of steps 368, the light emitting portion 331 can be caused to emit light. In other words, a pedestrian or the like present outside the vehicle or an occupant of another vehicle can visually recognize the light emission of the radar module 300.

As shown in FIG. 30, the optical pattern 369 can be formed on the light emitting portion 331 by a collection of the plurality of steps 368. In the example shown in FIG. 30, the rectangular optical pattern 369 can be formed on the light emitting portion 331 by a collection of the plurality of steps 368. In the present embodiment, a shape of the optical pattern 369 is not particularly limited, and the optical pattern 369 having a predetermined geometric pattern may be formed on the light emitting portion 331. In this manner, the design of the appearance of the radar module 300 can be improved by the optical pattern 369 formed on the light emitting portion 331.

Returning to FIG. 28, a reflecting surface 336 is formed between the first light guide portion 338 and the light emitting portion 331. The first extending portion 335 is disposed in the space K and extends toward the circuit board 320. The end surface 335a of the first extending portion 335 faces the first light source 323a with a gap between the end surface 335a and the first light source 323a.

The light emitted from the first light source 323a is incident on the first extending portion 335 and then spreads into the first light guide portion 338. Thereafter, the light spreading inside the first light guide portion 338 is reflected toward the light emitting portion 331 by the reflecting surface 336. Thereafter, the light spreading inside the light emitting portion 331 is reflected toward the outside of the vehicle by the plurality of steps 368 formed on the inner surface 333. In this manner, the light emitting portion 331 of the light guide member 330 emits light due to the light emitted from the first light source 323a. More specifically, the optical pattern 369 formed in the light emitting portion 331 emits light due to the light emitted from the first light source 323a.

A reflecting surface 337 is formed between the second light guide portion 339 and the light emitting portion 331. The second extending portion 334 is disposed in the space K and extends toward the circuit board 320. The end surface 334b of the second extending portion 334 faces the second light source 323b with a gap between the end surface 334b and the second light source 323b.

The light emitted from the second light source 323b is incident on the second extending portion 334 and then spreads into the second light guide portion 339. Thereafter, the light spreading inside the second light guide portion 339 is reflected by the reflecting surface 337 toward the light emitting portion 331. Thereafter, the light spreading inside the light emitting portion 331 is reflected toward the outside of the vehicle by the plurality of steps 368 formed on the inner surface 333. In this manner, the light emitting portion 331 of the light guide member 330 emits light due to the light emitted from the second light source 323b. More specifically, the optical pattern 369 emits light due to the light emitted from the second light source 323b.

According to the present embodiment, the light guide member 330 can hide the radar 5 from the outside of the vehicle, and light is emitted from the light guide member 330 toward the outside of the vehicle. In this manner, the design of the appearance of the radar module 300 can be improved by the light guide member 330.

The light guide member 330 may function as a lamp configured to present information related to traveling of the vehicle (for example, stop information, turn information, rearward movement information, information related to an automatic driving mode, and the like) to the outside of the vehicle. Specifically, the light guide member 330 may function as a stop lamp that presents information indicating that the vehicle is stopped to the outside, a turn signal lamp that presents information indicating a turn (a right or left turn or a change of a traveling lane) of the vehicle to the outside, a back up lamp that presents information indicating that the vehicle travels rearward to the outside, or an automatic driving system (ADS) lamp that presents information related to an automatic driving mode of the vehicle. As an example of the ADS lamp, the light guide member 330 may function as an ID lamp that is turned on or off in accordance with a driving mode of the vehicle. The ID lamp is turned off when the vehicle driving mode is a manual driving mode or a driving support mode, and the ID lamp is turned on when the driving mode of the vehicle is an advanced driving support mode or a fully automatic driving mode.

For example, when the illumination unit 3 functions as a tail and stop lamp and the illumination unit 4 functions as a back up lamp, the light guide member 330 may function as a turn signal lamp. In this case, the first light source 323a and the second light source 323b are configured to emit amber light. Further, when the illumination unit 3 functions as a tail and stop lamp and the illumination unit 4 functions as a turn signal lamp, the light guide member 330 may function as a back up lamp or an ADS lamp.

As described above, when the light guide member 330 functions as a turn signal lamp, a back up lamp, or an ADS lamp, it is not necessary to separately provide a lamp (for example, a turn signal lamp) having the same function as the light guide member 330 in the left vehicle lamp 402L. In this manner, it is possible to reduce the number of components of the left vehicle lamp 402L.

In the present embodiment, the light emitting portion 331 is disposed in a manner of facing the radar 5. Therefore, the light emitting portion 331 is configured to transmit the radio waves emitted from the radar 5 toward the outside of the radar 5. Further, in order to improve the reliability of the radar data acquired by the radar 5, it is desirable to reduce the reflectance of the light emitting portion 331 with respect to the radio waves emitted from the radar 5 to be low.

Based on the above viewpoint, a thickness t1 (see FIGS. 29A to 29C) of the light emitting portion 331 is defined by the following equation (6).

[Equation 6]

$$t1 = \frac{\lambda}{2\sqrt{\varepsilon_r}} \times n \tag{6}$$

Here, λ is a wavelength of the radio waves emitted from the radar 5. $\varepsilon_r$ is a relative permittivity of the light guide member 330 (light emitting portion 331), and n is an integer equal to or larger than 1.

As described above, when the thickness t1 of the light emitting portion 331 is set to a thickness defined by the above equation (6), radio waves reflected by the inner surface 333 of the light emitting portion 331 that faces the radar 5 and radio waves reflected by an outer surface 332 of the light emitting portion 331 weaken each other. As a result, the reflectance of the light emitting portion 331 with respect to the radio waves emitted from the radar 5 can be reduced to be low. Therefore, since an intensity of the radio waves reflected by the light emitting portion 331 is weak, it is possible to avoid a situation in which the reflected radio waves are received by the reception antenna of the radar 5 and adversely affect the radar data as a noise component. For example, when the wavelength λ of the radio waves is 3.922 mm, the relative permittivity $\varepsilon_r$ of the light guide member 330 made of acrylic resin is 2.57, and n=2, the thickness t1 of the light emitting portion 331 is about 2.45 mm.

In addition, a decorative film may be provided on the inner surface 333 of the light emitting portion 331. Even when the light emitting portion 331 does not emit light, it is possible to hide the radar 5 from the outside of the vehicle by the decorative film. The decorative film is configured to transmit the radio waves emitted from the radar 5 and hide the radar 5 from the outside of the vehicle. The decorative film does not contain a metal material. The decorative film has a high transmittance in a frequency band of radio waves (for example, millimeter waves) emitted from the radar 5. A thickness of the decorative film is, for example, 0.1 mm.

As an example of a layer structure of the decorative film, the decorative film may include a binder layer that functions as an adhesive layer, a decorative layer that is formed on the binder layer, a multilayer mirror that is formed on the decorative layer, a hard coat layer that is formed on the multilayer mirror, and a protective layer that is formed on the hard coat layer. In the multilayer mirror, for example, a plurality of polymer layers having low refractive indexes and a plurality of polymer layers having high refractive indexes are alternately stacked. Since the multilayer mirror is provided on the decorative film, it is possible to increase the reflectance of the decorative film with respect to visible light. For example, PICASUS (registered trademark) manufactured by Toray Industries, Inc. may be used as the multilayer mirror.

In addition, the plurality of steps 368 may be formed on the outer surface 332 of the light emitting portion 331 of the light guide member 330, or may be formed on both the outer surface 332 and the inner surface 333.

Although the left vehicle lamp 402L functions as a rear lamp in the description of the present embodiment, the present embodiment is not limited thereto. For example, the left vehicle lamp 402L may function as a head lamp mounted on a front surface of the vehicle. In this case, the radar module 300 may be configured to acquire radar data indicating a surrounding environment in a front region of the vehicle, and the light guide member 330 that hides the radar 5 from the outside of the vehicle may function as a daytime running lamp (DRL).

Sixth Embodiment

Hereinafter, a sixth embodiment of the present disclosure (hereinafter, referred to as the present embodiment) will be described with reference to the drawings. Dimensions of members shown in the drawings may be different from actual dimensions of the members for the sake of convenience of description.

In the description of the present embodiment, members having the same reference numerals as those of the members already described in the first embodiment may not be repeatedly described.

A "horizontal direction" of a vehicle 1D is mentioned in the present embodiment, and the "horizontal direction" is a direction perpendicular to the upper-lower direction (a vertical direction) and includes the left-right direction and the front-rear direction. Further, in the present embodiment, directions (the left-right direction, the upper-lower direction, and the front-rear direction) set for a right vehicle lamp 502R and a left vehicle lamp 502L coincide with directions (the left-right direction, the upper-lower direction, and the front-rear direction) set for the vehicle 1D.

First, the vehicle 1D according to the present embodiment will be described with reference to FIG. 32. FIG. 32 is a front view showing the vehicle 1D including the left vehicle lamp 502L and the right vehicle lamp 502R. As shown in FIG. 32, the left vehicle lamp 502L is disposed at a left front side of the vehicle 1D, and the right vehicle lamp 502R is disposed at a right front side of the vehicle 1D. Each of the left vehicle lamp 502L and the right vehicle lamp 502R includes an illumination unit 403, a camera 404, a LiDAR unit 407, a radar 5, and a light guide member 406.

In the present embodiment, the left vehicle lamp 502L and the right vehicle lamp 502R function as head lamps. The left vehicle lamp 502L and the right vehicle lamp 502R have the same configuration. Therefore, a specific configuration of the left vehicle lamp 502L will be described with reference to FIG. 33A and FIG. 33B in the following description.

The left vehicle lamp 502L and the right vehicle lamp 502R may be collectively and simply referred to as a "vehicle lamp 502" for convenience of description. Although the vehicle lamp 502 that functions as a head lamp will be described in the present embodiment, the vehicle lamp 502 may be a rear lamp that is disposed on a rear surface of the vehicle 1D and includes an illumination unit, a camera, a LiDAR unit, a radar, and a light guide member.

Next, a specific configuration of the left vehicle lamp 502L according to the present embodiment will be described below with reference to FIG. 33A and FIG. 33B. FIG. 33A is a front view showing the left vehicle lamp 502L. FIG. 33B is a horizontal cross sectional view showing the left vehicle lamp 502L. As shown in FIG. 33A and FIG. 33B, the left vehicle lamp 502L includes a lamp housing 414, a lamp cover 412 that covers an opening of the lamp housing 414, the illumination unit 403, the camera 404, the LiDAR unit 407, the radar 5, the light guide member 406, and a light source 408.

The lamp housing 414 is formed of, for example, a non-transparent resin material such as polypropylene and AAS resin (weather resistant ABS resin). The lamp cover 412 is formed of, for example, a transparent resin material such as polycarbonate or acrylic resin.

The illumination unit 403 is disposed in a lamp chamber S3 formed by the lamp housing 414 and the lamp cover 412, and is configured to emit light toward a front side of the vehicle 1D. In particular, the illumination unit 403 is configured to emit a low beam light distribution pattern and a high beam light distribution pattern toward the front side of the vehicle 1D.

The camera 404 is disposed in the lamp chamber S3, and is configured to acquire image data indicating a surrounding environment of the vehicle 1D and then transmit the image data to a vehicle control unit (in-vehicle computer) (not shown). The LiDAR unit 407 is disposed in the lamp chamber S3, and is configured to acquire 3D mapping data (point cloud data) indicating a surrounding environment of the vehicle 1D and then transmit the 3D mapping data to the vehicle control unit. The radar 5 is disposed in the lamp chamber S3. The radar 5 is configured to acquire radar data indicating a surrounding environment of the vehicle 1D by emitting radio waves (for example, millimeter waves or microwaves) toward the outside of the vehicle 1D, and then transmit the acquired radar data to the vehicle control unit. The radar 5 is, for example, a millimeter wave radar or a microwave radar.

The vehicle control unit receives the image data, the 3D mapping data, and the radar data, and then specifies surrounding environment information of the vehicle 1D based on the received image data, the 3D mapping data, and the radar data. Here, it is assumed that the surrounding environment information includes information related to an object such as a pedestrian or another vehicle present outside the vehicle 1D (a position of the object from the own vehicle, a distance of the object to the own vehicle, an angle of the object relative to the own vehicle, and the like). Thereafter, the vehicle control unit controls the traveling of the vehicle 1D based on the specified surrounding environment information, map information, current position information, and the like.

The radar 5 includes an antenna unit 52, a communication circuit unit (not shown), a housing, and a radome. The antenna unit 52 includes a transmission antenna configured to radiate radio waves (for example, millimeter waves having a wavelength of 1 mm to 10 mm) into the air, and a reception antenna configured to receive radio waved reflected by an object. The radio waves radiated from the transmission antenna are reflected by an object such as another vehicle, and then the radio waves reflected from the object are received by the reception antenna.

The antenna unit 52 may be configured as a patch antenna (a metal pattern formed on a substrate). In this case, the transmission antenna may include a plurality of antenna elements (metal patterns) arranged in a matrix of n rows×m columns. The reception antenna may include, for example, a plurality of antenna elements arranged in a matrix of n rows×(m+1) columns.

The communication circuit unit includes a transmission-side radio frequency (RF) circuit, a reception-side RF circuit, and a signal processing circuit. The communication circuit unit is formed as a monolithic microwave integrated circuit (MMIC). The transmission-side RF circuit is electrically connected to the transmission antenna. The reception-side RF circuit is electrically connected to the reception antenna. The signal processing circuit is configured to generate radar data by processing a digital signal output from the reception-side RF circuit. The antenna unit 52 and the communication circuit unit are disposed in a space formed by the housing and the radome.

The field of view F (a detection range) of the radar 5 in the vertical direction may be, for example, within a range of 3° to 100°. The field of view F of the radar 5 in the horizontal direction may be, for example, within a range of 120° to 180°.

The light guide member 406 is disposed in the lamp chamber S3 in a manner of facing the radar 5 so as to hide the radar 5 from the outside of the vehicle 1D. Since the light guide member 406 is present in the field of view F of the radar 5, the light guide member 406 is configured to transmit the radio waves emitted from the radar 5. The light guide member 406 is formed of, for example, a transparent resin material such as polycarbonate or acrylic resin. Although the entire radar 5 including the antenna unit 52 is covered by the light guide member 406 in the present embodiment, a part of the radar 5 may be covered by the light guide member 406.

In the present embodiment, the light guide member 406 is disposed in a manner of facing the radar 5, and is present in the field of view F of the radar 5. Specifically, the light guide member 406 is disposed in a manner of facing the radar 5 such that all radio waves in the field of view F emitted from the radar 5 pass through the light guide member 406.

Therefore, the light guide member 406 is configured to transmit the radio waves emitted from the radar 5 toward the outside of the vehicle 1D. Further, in order to improve the reliability of the radar data acquired by the radar 5, it is desirable to reduce the reflectance of the light guide member 406 with respect to the radio waves emitted from the radar 5 to be low. Therefore, a thickness t1 of the light guide member 406 is defined by the following equation (7).

[Equation 7]

$$t1 = \frac{\lambda}{2\sqrt{\varepsilon_{r1}}} \times n \qquad (7)$$

Here, $\lambda$ is a wavelength of the radio waves emitted from the radar 5. $\varepsilon_{r1}$ is a relative permittivity of the light guide member 406, and n is an integer equal to or larger than 1.

In a case where the thickness t1 of the light guide member 406 is set to a thickness defined by the above equation (7), radio waves R2 reflected by a first surface 467 of the light guide member 406 that faces the radar 5 and radio waves R1 reflected by a second surface 466 of the light guide member 406 located at a side opposite to the first surface 467 weaken each other. Specifically, since a phase difference $\Delta\theta$ between the reflected radio waves R2 and the reflected radio waves R1 is $(2m+1)\pi$ (m is an integer equal to larger than zero), the reflected radio waves R1 and the reflected radio waves R2 weaken each other. As a result, the reflectance of the light guide member 406 with respect to the radio waves emitted from the radar 5 can be reduced to be low. Therefore, since an intensity of the radio waves reflected by the light guide member 406 is weak, it is possible to avoid a situation in which the reflected radio waves are received by the radar 5 and adversely affect the radar data as a noise component. For example, when the wavelength $\lambda$ of the radio waves of the radar 5 is 3.922 mm, the relative permittivity $\varepsilon_{r1}$ of the light guide member 406 made of acrylic resin is 2.57, and n=2, the thickness t1 of the light emitting portion 406 is about 2.45 mm.

A thickness t2 of a part of the lamp cover 412 where the lamp cover 412 faces the light guide member 406 is defined by the following equation (8).

[Equation 8]

$$t2 = \frac{\lambda}{2\sqrt{\varepsilon_{r2}}} \times n \qquad (8)$$

Here, $\lambda$ is a wavelength of the radio waves emitted from the radar 5. $\varepsilon_{r2}$ is a relative permittivity of the lamp cover 412, and n is an integer equal to or larger than 1.

As described above, when the thickness t2 of the lamp cover 412 is set to a thickness defined by the expression (8), the radio waves reflected by a first surface 436 of the lamp cover 412 that faces the radar 5 via the light guide member 406 and the radio waves R1 reflected by a second surface 437 of the lamp cover 412 located at a side opposite to the first surface 436 weaken each other. As a result, the reflectance of the lamp cover 412 with respect to the radio waves emitted from the radar 5 can be reduced to be low. Therefore, since an intensity of the radio waves reflected by the lamp cover 412 is weak, it is possible to avoid a situation in which the reflected radio waves are received by the radar 5 and adversely affect the radar data as a noise component. For example, when the wavelength λ of the radio waves of the radar 5 is 3.922 mm, the relative permittivity $\varepsilon_{r,2}$ of the lamp cover 412 made of acrylic resin is 2.57, and n=2, the thickness t2 of a part of the lamp cover 412 where the lamp cover 412 faces the light guide member 406 is about 2.45 mm.

The light source 408 is disposed in the lamp chamber S3, and is configured to emit light toward the light guide member 406. The light source 408 is mounted on a wiring board (not shown) and is electrically connected to a light source driving circuit (not shown). The light source 408 may be formed of, for example, a semiconductor light emitting element such as an LED or an LD.

The light emitted from the light source 408 is incident on an end surface 465 of the light guide member 406, and then spreads into the light guide member 406. Thereafter, the light spreading inside the light guide member 406 is reflected by a plurality of steps 468 (see FIGS. 34A to 34C) formed on the first surface 467 of the light guide member 406, and then is emitted toward the outside of the vehicle 1D.

As shown in FIGS. 34A to 34C, a plurality of steps 468 are formed on the first surface 467 of the light guide member 406, and are configured to reflect light spreading inside the light guide member 406 toward the outside of the vehicle 1D. As shown in FIG. 34A, an interval d1 between adjacent steps 468 among the plurality of steps 468 is, for example, 400 μm. In this regard, the brightness of an optical pattern 469 (see FIG. 35) to be described later can be appropriately adjusted by adjusting the interval d1 between adjacent steps 468.

The step 468 may be formed on the first surface 467 of the light guide member 406 as concave portions (see FIG. 34B), or may be formed on the first surface 467 as convex portions (see FIG. 34C). A depth d2 or a height d3 of the step 468 from the first surface 467 in the thickness direction of the light guide member 406 is, for example, in a range of larger than 0 μm and 300 μm or less. For example, when the thickness of the light guide member 406 is about 2.4 mm, the depth d2 or the height d3 of the step 468 may be about 30 μm.

Further, in order to efficiently emit the light spreading inside the light guide member 406 toward the outside of the vehicle 1D, it is preferable that the step 468 is formed into a hemispherical concave portion or convex portion. Since the light spreading inside the light guide member 406 can be reflected toward the outside of the vehicle 1D by the plurality of steps 468, the light guide member 406 can be caused to emit light. In other words, a pedestrian or the like present outside the vehicle 1D or an occupant of another vehicle can visually recognize the light emission of the light guide member 406.

As shown in FIG. 35, the optical pattern 469 can be formed on the light guide member 406 by a collection of the plurality of steps 468. In the example shown in FIG. 35, the rectangular optical pattern 469 can be formed on the light guide member 406 by a collection of the plurality of steps 468. In the present embodiment, a shape of the optical pattern 469 is not particularly limited, and the optical pattern 469 having a predetermined geometric pattern may be formed on the light guide member 406. In this manner, the design of the appearance of the left vehicle lamp 502L can be improved by the plurality of optical patterns 469 formed on the light guide member 406.

The light guide member 406 may function as a lamp configured to present information related to traveling of the vehicle 1D (for example, turn information, information related to an automatic driving mode, or the like) to the outside of the vehicle 1D. Specifically, the light guide member 406 may function as a turn signal lamp that presents information indicating a turn (a right or left turn or a change of a traveling lane) of the vehicle 1D to the outside or an automatic driving system (ADS) lamp that presents information related to an automatic driving mode of the vehicle 1D. As an example of the ADS lamp, the light guide member 406 may function as an ID lamp that is turned on or off in accordance with a driving mode of the vehicle 1D. The ID lamp is turned off when the driving mode of the vehicle 1D is a manual driving mode or a driving support mode, and the ID lamp is turned on when the driving mode of the vehicle 1D is an advanced driving support mode or a fully automatic driving mode. The light guide member 406 may also function as a daytime running lamp (DRL) or a clearance lamp.

As described above, when the light guide member 406 functions as a turn signal lamp, an ADS lamp, a DRL, or a clearance lamp, it is not necessary to separately provide a lamp (for example, a turn signal lamp) having the same function as the light guide member 406 in the vehicle lamp 502. In this manner, it is possible to reduce the number of components of the vehicle lamp 502.

According to the present embodiment, the light guide member 406 can hide the radar 5 from the outside of the vehicle 1D, and light is emitted from the light guide member 406 toward the outside of the vehicle 1D. As described above, the light guide member 406 can improve the design of the appearance of the vehicle lamp 502 on which the camera 404, the LiDAR unit 407, and the radar 5 are mounted. In particular, the optical pattern 469 formed on the light guide member 406 can improve the design of the appearance of the vehicle lamp 502.

Since the camera 404, the LiDAR unit 407, and the radar 5 are disposed in the lamp chamber S3 of the vehicle lamp 502 in the present embodiment, it is possible to effectively utilize a space of the lamp chamber S3 and reduce the size of the entire vehicle lamp 502.

Seventh Embodiment

Next, a seventh embodiment of the present disclosure (hereinafter referred to as the present embodiment) will be described with reference to FIGS. 36 to 39. FIG. 36 is a front view showing a left vehicle lamp 420L according to the seventh embodiment. FIG. 37 is a vertical cross sectional view showing the left vehicle lamp 420L taken along a line A-A shown in FIG. 36. FIG. 38 is an enlarged vertical cross sectional view showing the vicinity of a radar 425 shown in FIG. 37. FIG. 39 is a front view schematically showing an optical pattern 479 formed on a light guide member 426.

The left vehicle lamp 420L according to the seventh embodiment is greatly different from the left vehicle lamp 502L according to the sixth embodiment in that the radar 425 is disposed outside a lamp chamber S8 of the left vehicle lamp 420L. In the following description, components having the same reference numerals as those of the components already described in the sixth embodiment will not be repeatedly described.

As shown in FIG. 36, the left vehicle lamp 420L includes illumination units 423a to 423c, a camera 424, a LiDAR unit 427, the radar 425, and the light guide member 426. The left vehicle lamp 420L is disposed at a left front side of a vehicle (not shown). In the present embodiment, a right vehicle lamp (not shown) disposed at a right front side of the vehicle has the same configuration as that of the left vehicle lamp 420L.

As shown in FIG. 37, the left vehicle lamp 420L further includes a lamp housing 450 and a lamp cover 430 that covers an opening of the lamp housing 450. The illumination units 423a to 423c, the camera 424, the LiDAR unit 427, and the light guide member 426 are disposed in the lamp chamber S8 formed by the lamp housing 450 and the lamp cover 430. On the other hand, the radar 425 is disposed outside the lamp chamber S8.

The illumination unit 423a is configured to emit a high beam light distribution pattern toward the outside of the vehicle. The illumination unit 423b is configured to emit a low beam light distribution pattern toward the outside of the vehicle. The illumination unit 423c functions as a turn signal lamp. The camera 424 has the same function as the camera 404 according to the sixth embodiment. The LiDAR unit 427 has the same function as the LiDAR unit 407 according to the sixth embodiment. The radar 425 has the same function as the radar 5 according to the sixth embodiment. The radar 425 is configured to acquire radar data indicating a surrounding environment of the vehicle by emitting radio waves (for example, millimeter waves or microwaves) toward the outside of the vehicle 1D, and then transmit the acquired radar data to the vehicle control unit. The radar 425 is, for example, a millimeter wave radar or a microwave radar. An antenna unit 462 of the radar 425 may be configured as a patch antenna.

The radar 425 is supported and fixed by a support member 428 that is a bracket made of metal or resin. The support member 428 is fixed to the lamp housing 450 via a screw (not shown). The support member 428 extends downward from the lamp housing 450. Since the radar 425 and the support member 428 are disposed outside the lamp chamber S8, it is possible to suitably prevent the operation of the radar 425 from being adversely affected by heat generated from the illumination units 423a to 423c.

The lamp housing 450 is formed of, for example, a non-transparent resin material such as polypropylene or AAS resin (weather resistant ABS resin). The lamp housing 450 includes a lower extending portion 452 disposed between the light guide member 426 and the radar 425 in the front-rear direction. Since the lower extending portion 452 is present in the field of view F1 of the radar 425, the lower extending portion 452 is configured to transmit radio waves emitted from the radar 425.

The lamp cover 430 is formed of, for example, a transparent resin material such as polycarbonate or acrylic resin. The lamp cover 430 includes a lower light transmitting portion 433 that faces the light guide member 426 and the radar 425. Since the lower light transmitting portion 433 is present in the field of view F1 of the radar 425, the lower light transmitting portion 433 is configured to transmit radio waves emitted from the radar 425.

In the present embodiment, a part of the radar 425 including the antenna unit 462 is covered by the lamp cover 430, the light guide member 426, and the lamp housing 450, and the other part of the radar 425 is covered by a bumper 410.

The light guide member 426 is disposed in the lamp chamber S8 and faces the radar 425 via the lower extending portion 452 so as to hide a part of the radar 425 from the outside of the vehicle. Since the light guide member 426 is present in the field of view F1 of the radar 425, the light guide member 426 is configured to transmit radio waves emitted from the radar 425. The light guide member 426 is formed of, for example, a transparent resin material such as polycarbonate or acrylic resin. The light guide member 426 includes a light emitting portion 471 that emits light toward the outside of the vehicle 1D, and a light guide portion 472 that guides light emitted from a light source 429.

Hereinafter, a configuration of the light guide member 426 will be specifically described with reference to FIG. 38. As shown in FIG. 38, the left vehicle lamp 420L further includes the light source 429 that is disposed in the lamp chamber S8 and configured to emit light toward the light guide portion 472 of the light guide member 426. The light source 429 is mounted on the wiring board 19. The light source 429 includes, for example, a semiconductor light emitting element such as an LED or an LD.

The light emitted from the light source 429 is incident on the light guide portion 472 through an opening 442 of a partition member 440, and then is reflected by a reflecting surface 473. A part of the light reflected by the reflecting surface 473 is emitted to the outside of the vehicle via a light emission surface 475. On the other hand, another part of the light reflected by the reflecting surface 473 is reflected by the reflecting surface 474 and then spreads into the light emitting portion 471.

The light emitting portion 471 includes a first surface 477 that faces the radar 425, a second surface 476 located at a side opposite to the first surface 477, and a plurality of steps 478 (see FIG. 39) formed on the first surface 477. The plurality of steps 478 are configured to reflect the light spreading in the light emitting portion 471 toward the outside of the vehicle.

For example, the plurality of steps 478 may be formed into a lattice shape on the first surface 477 of the light emitting portion 471. An interval between adjacent steps 478 among the plurality of steps 478 is, for example, 400 μm. In this regard, the brightness of the optical pattern 479 to be described later can be appropriately adjusted by adjusting the interval between adjacent steps 478. The steps 478 may be formed on the first surface 477 of the light emitting portion 471 as concave portions or convex portions.

Since the light spreading inside the light emitting portion 471 can be reflected toward the outside of the vehicle by the plurality of steps 478, the light emitting portion 471 can be caused to emit light. In other words, a pedestrian or an occupant of another vehicle present outside the vehicle can visually recognize the light emission of the light guide member 426.

The optical pattern 479 can be formed on the light emitting portion 471 by a collection of the plurality of steps 478. In the example shown in FIG. 39, the stripe-shaped optical pattern 479 can be formed on the light emitting portion 471 by a collection of the plurality of steps 478. In this manner, the design of the appearance of the left vehicle lamp 420L can be improved by the optical pattern 479 formed on the light emitting portion 471.

The light guide member 426 may function as a lamp configured to present information related to traveling of the vehicle (for example, turn information, information related to an automatic driving mode, or the like) to the outside of the vehicle. Specifically, the light guide member 426 may function as a turn signal lamp or an ADS lamp. The light guide member 426 may also function as a DRL or a clearance lamp.

As described above, when the light guide member 426 functions as a turn signal lamp, an ADS lamp, a DRL, or a clearance lamp, it is not necessary to separately provide a lamp (for example, a turn signal lamp) having the same function as the light guide member 426 in the left vehicle lamp 420L. In this manner, it is possible to reduce the number of components of the left vehicle lamp 420L.

According to the present embodiment, the light guide member 426 can hide the radar 425 from the outside of the vehicle, and light is emitted from the light guide member 426 toward the outside of the vehicle. As described above, the light guide member 426 can improve the design of the appearance of the left vehicle lamp 420L on which the camera 424, the LiDAR unit 427, and the radar 425 are mounted. In particular, the optical pattern 479 formed on the light guide member 426 can improve the design of the appearance of the left vehicle lamp 420L.

In the present embodiment, the lower extending portion 452 of the lamp housing 450, the light emitting portion 471 of the light guide member 426, and the lower light transmitting portion 433 of the lamp cover 430 are disposed in a manner of facing the radar 425, and are present in the field of view F1 of the radar 425. Specifically, in the present embodiment, all radio waves present in the field of view F1 from the radar 425 pass through the lower extending portion 452, the light emitting portion 471, and the lower light transmitting portion 433.

Therefore, each of the lower extending portion 452, the light emitting portion 471, and the lower light transmitting portion 433 is configured to transmit the radio waves emitted from the radar 425 toward the outside of the vehicle 1D. Further, in order to improve the reliability of the radar data acquired by the radar 425, it is desirable to reduce the reflectance of each of the lower extending portion 452, the light emitting portion 471, and the lower light transmitting portion 433 with respect to the radio waves emitted from the radar 425 to be low.

As shown in FIG. 38, a thickness t3 of the lower extending portion 452 of the lamp housing 450 is defined by the following equation (9).

[Equation 9]
$$t3 = \frac{\lambda}{2\sqrt{\varepsilon_{r3}}} \times n \tag{9}$$

Here, $\lambda$ is a wavelength of the radio waves emitted from the radar 425. $\varepsilon_{r3}$ is a relative permittivity of the lamp housing 450, and n is an integer equal to or larger than 1. For example, when the wavelength $\lambda$ of the radio waves of the radar 425 is 3.922 mm, the relative permittivity $\varepsilon_{r3}$ of the lamp housing 450 made of AAS resin is 2.87, and n=2, the thickness t3 of the lower extending portion 452 is about 2.31 mm.

A thickness t4 of the light emitting portion 471 of the light guide member 426 is defined by the following equation (10).

[Equation 10]
$$t4 = \frac{\lambda}{2\sqrt{\varepsilon_{r4}}} \times n \tag{10}$$

Here, $\lambda$ is a wavelength of the radio waves emitted from the radar 425. $\varepsilon_{r4}$ is a relative permittivity of the light guide member 426, and n is an integer equal to or larger than 1. For example, when the wavelength $\lambda$ of the radio waves of the radar 425 is 3.922 mm, the relative permittivity $\varepsilon_{r4}$ of the light guide member 426 made of acrylic resin is 2.57, and n=2, the thickness t4 of the light emitting portion 471 is about 2.45 mm.

A thickness t5 of the lower light transmitting portion 433 of the lamp cover 430 is defined by the following equation (11).

[Equation 11]
$$t5 = \frac{\lambda}{2\sqrt{\varepsilon_{r5}}} \times n \tag{11}$$

Here, $\lambda$ is a wavelength of the radio waves emitted from the radar 425. $\varepsilon_{r5}$ is a relative permittivity of the lamp cover 430, and n is an integer equal to or larger than 1. For example, when the wavelength $\lambda$ of the radio waves of the radar 425 is 3.922 mm, the relative permittivity $\varepsilon_{r5}$ of the lamp cover 430 made of acrylic resin is 2.57, and n=2, the thickness t5 of the lower light transmitting portion 433 is about 2.45 mm.

Although a part of the radar 425 including the antenna unit 462 is hidden by the lower extending portion 452, the light emitting portion 471, and the lower light transmitting portion 433, and the other part of the radar 425 is hidden by the bumper 410 in the description of the seventh embodiment, the present embodiment is not limited thereto. In this regard, the entire radar 425 may be hidden by the lower extending portion 452, the light emitting portion 471, and the lower light transmitting portion 433.

In the sixth embodiment and the seventh embodiment, the number of illumination units provided in the vehicle lamp is not particularly limited.

Although the lower extending portion 452 of the lamp housing 450 is disposed between the light guide member 426 and the radar 425 in the front-rear direction in the description of the seventh embodiment, the present embodiment is not limited thereto. For example, the lower extending portion 452 may not be provided between the light guide member 426 and the radar 425. In this case, the radar 425 may be hidden from the outside of the vehicle only by the optical pattern 479 formed on the light emitting portion 471. Further, in this case, a decorative film may be provided on the first surface 477 of the light emitting portion 471. Even when the light emitting portion 471 does not emit light, it is possible to hide the radar 425 from the outside of the vehicle by the decorative film.

Although the plurality of steps 468 are formed on the first surface 467 of the light guide member 406 in the description of the sixth embodiment, the present embodiment is not limited thereto. In this regard, the plurality of steps 468 may be formed on the second surface 466 of the light guide member 406, or may be formed on both the first surface 467 and the second surface 466. Similarly, a plurality of steps 478 may be formed on the second surface 476 of the light emitting portion 471, or may be formed on both the first surface 477 and the second surface 476 in the seventh embodiment.

Eighth Embodiment

Hereinafter, an eighth embodiment of the present disclosure (hereinafter, referred to as the present embodiment) will be described with reference to the drawings. Dimensions of members shown in the drawings may be different from actual dimensions of the members for the sake of convenience of description.

In the description of the present embodiment, members having the same reference numerals as those of the members already described in the first embodiment may not be repeatedly described.

In the description of the present embodiment, a "left-right direction", an "upper-lower direction", and a "front-rear direction" may be appropriately referred to for the convenience of description. These directions are relative directions set for a vehicle 1E shown in FIG. 40. Here, the "left-right direction" is a direction including a "left direction" and a "right direction". The "upper-lower direction" is a direction including an "upper direction" and a "lower direction". The "front-rear direction" is a direction including a "front direction" and a "rear direction". Although not shown in FIG. 40, the "front-rear direction" is a direction perpendicular to the left-right direction and the upper-lower direction.

A "horizontal direction" of the vehicle 1E is mentioned in the present embodiment, and the "horizontal direction" is a direction perpendicular to the upper-lower direction (a vertical direction) and includes the left-right direction and the front-rear direction. Further, in the present embodiment, directions (the left-right direction, the upper-lower direction, and the front-rear direction) set for a right vehicle lamp 602R and a left vehicle lamp 602L coincide with directions (the left-right direction, the upper-lower direction, and the front-rear direction) set for the vehicle 1E.

First, the vehicle 1E according to the present embodiment will be described with reference to FIG. 40. FIG. 40 is a rear view showing the vehicle 1E including the left vehicle lamp 602L and the right vehicle lamp 602R. As shown in FIG. 40, the left vehicle lamp 602L is disposed at a left rear side of the vehicle 1E, and the right vehicle lamp 602R is disposed at a right rear side of the vehicle 1E. Each of the left vehicle lamp 602L and the right vehicle lamp 602R includes the radar 5.

In the present embodiment, the left vehicle lamp 602L and the right vehicle lamp 602R function as rear lamps (or rear combination lamps). The left vehicle lamp 602L and the right vehicle lamp 602R have the same configuration. Therefore, a specific configuration of the left vehicle lamp 602L will be described with reference to FIG. 41 in the following description. The left vehicle lamp 602L and the right vehicle lamp 602R may be collectively and simply referred to as a "vehicle lamp 602" for convenience of description.

FIG. 41 is a longitudinal cross sectional view (a cross sectional view in the upper-lower direction) showing the left vehicle lamp 602L. As shown in FIG. 41, the left vehicle lamp 602L includes a lamp housing 514, a lamp cover 512 that covers an opening of the lamp housing 514, the radar 5, a first light guide member 507, a first light source 508a, a second light guide member 506, and a second light source 508b.

The lamp housing 514 may be formed of, for example, a non-transparent resin material such as polypropylene or AAS resin (weather resistant ABS resin). The lamp cover 512 is formed of, for example, a resin material such as polycarbonate or acrylic resin. A lamp chamber S4 is formed by the lamp cover 512 and the lamp housing 514. The radar 5, the first light guide member 507, the first light source 508a, the second light guide member 506, and the second light source 508b are disposed in the lamp chamber S4.

The radar 5 is disposed in the lamp chamber S4, and is configured to acquire radar data indicating a surrounding environment of the vehicle 1E by emitting radio waves (for example, millimeter waves or microwaves) toward the outside of the vehicle 1E. In the present embodiment, the radar 5 is configured to acquire radar data indicating a rear region of the vehicle 1E by emitting radio waves toward a rear side of the vehicle 1E. The radar 5 is, for example, a millimeter wave radar or a microwave radar. A vehicle control unit (in-vehicle computer) (not shown) is formed to specify the surrounding environment of the vehicle 1E (in particular, information on an object present outside the vehicle 1E) based on the radar data output from the radar 5.

The radar 5 may be supported and fixed by a support member (not shown) that is a bracket made of metal or resin. The support member may be fixed to the lamp housing 514. The field of view F (a detection range) of the radar 5 in the vertical direction may be, for example, within a range of 3° to 100°. The field of view F of the radar 5 in the horizontal direction may be, for example, within a range of 120° to 180°.

(Configuration of First Light Guide Member 507)

The first light guide member 507 is disposed in the lamp chamber S4 in a manner of facing the radar 5, and is configured to emit light toward the outside of the vehicle 1E. In this manner, at least a part of the radar 5 can be hidden from the outside of the vehicle 1E by the light emission of the first light guide member 507. Since the first light guide member 507 is present in the field of view F of the radar 5, the first light guide member 507 is configured to transmit radio waves emitted from the radar 5. The first light guide member 507 is formed of, for example, a transparent resin material such as polycarbonate or acrylic resin.

A distance d between the radar 5 and the first light guide member 507 in the front-rear direction may be set to, for example, 20 mm or more and 100 mm or less. When the distance d between the first light guide member 507 and the radar 5 is 20 mm or more, radio waves that are emitted from the radar 5 and reflected by the first light guide member 507 is sufficiently attenuated until reaching the reception antenna of the radar 5. Therefore, it is possible to avoid a situation in which the reflected radio waves received by the radar 5 adversely affect the radar data as a noise component. On the other hand, when the distance d is 100 mm or less, all radio waves in the field of view F emitted from the radar 5 can pass through the first light guide member 507.

A thickness t1 of the first light guide member 507 is defined by the following equation (12).

[Equation 12]

$$t1 = \frac{\lambda}{2\sqrt{\varepsilon_{r1}}} \times n \quad (12)$$

Here, $\lambda$ is a wavelength of the radio waves emitted from the radar 5. $\varepsilon_{r1}$ is a relative permittivity of the first light guide member 507, and n is an integer equal to or larger than 1.

As described above, when the thickness t1 of the first light guide member 507 is set to a thickness defined by the above equation (12), radio waves R1 reflected by a first surface 572 of the first light guide member 507 that faces the radar 5 and radio waves R2 reflected by a second surface 571 of the first light guide member 507 located at a side opposite to the first surface 572 weaken each other. Specifically, since a phase difference $\Delta\theta$ between the reflected radio waves R2 and the reflected radio waves R1 is $(2m+1)\pi$ (m is an integer equal to larger than zero), the reflected radio waves R1 and the reflected radio waves R2 weaken each other. As a result, the reflectance of the first light guide member 507 with respect to the radio waves emitted from the radar 5 can be reduced to be low.

Therefore, since an intensity of the radio waves reflected by the first light guide member 507 is weak, it is possible to avoid a situation in which the reflected radio waves are received by the radar 5 and adversely affect the radar data as a noise component. For example, when the wavelength λ of the radio waves of the radar 5 is 3.922 mm, the relative permittivity $\varepsilon_{r1}$ of the first light guide member 507 made of acrylic resin is 2.57, and n=2, the thickness t1 of the first light guide member 507 is about 2.45 mm.

The first light source 508a is disposed on a wiring board 510 and is electrically connected to a light source driving circuit (not shown). The first light source 508a may be formed of, for example, a semiconductor light emitting element such as an LED or an LD.

The first light source 508a is configured to emit light toward the first light guide member 507. The light emitted from the first light source 508a spreads into the first light guide member 507 and is reflected toward the outside of the vehicle 1E by a plurality of first steps 578 formed on the first surface 572 of the first light guide member 507. In this manner, the plurality of first steps 578 are configured to emit the light spreading inside the first light guide member 507 toward the outside of the vehicle 1E.

As shown in FIG. 42A, for example, the plurality of first steps 578 may be formed into a lattice shape on the first surface 572 of the first light guide member 507. An interval d1 between adjacent first steps 578 among the plurality of first steps 578 is, for example, 400 μm. In this regard, the brightness of a first optical pattern 579 (see FIG. 43B) to be described later can be appropriately adjusted by adjusting the interval d1 between adjacent first steps 578.

The first steps 578 may be formed on the first surface 572 as concave portions (see FIG. 42B), or may be formed on the first surface 572 as convex portions (see FIG. 42C). A depth d2 or a height d3 of the first step 578 from the first surface 572 in the thickness direction of the first light guide member 507 is, for example, in a range of larger than 0 μm and 300 μm or less. For example, when the thickness of the first light guide member 507 is about 2.4 mm, the depth d2 or the height d3 of the first step 578 may be about 30 μm.

Further, in order to efficiently emit the light spreading inside the first light guide member 507 toward the outside of the vehicle 1E, it is preferable that the first step 578 is formed into a hemispherical concave portion or convex portion. Since the light spreading inside the first light guide member 507 can be reflected toward the outside of the vehicle 1E by the plurality of first steps 578, the first light guide member 507 can be caused to emit light. In other words, a pedestrian or the like present outside the vehicle 1E or an occupant of another vehicle can visually recognize the light emission of the first light guide member 507.

Further, as shown in FIG. 43B, the first optical pattern 579 can be formed on the first surface 572 of the first light guide member 507 by a collection of the plurality of first steps 578. In the example shown in FIG. 43B, the rectangular first optical pattern 579 can be formed on the first surface 572 by a collection of the plurality of first steps 578. In the present embodiment, a shape of the first optical pattern 579 is not particularly limited, and the first optical pattern 579 having a predetermined geometric pattern may be formed on the first surface 572. In this manner, the first optical pattern 579 formed on the first light guide member 507 can improve the design of the appearance of the left vehicle lamp 602L. The first optical pattern 579 is formed in a region of the first surface 572 below a center line C2 passing through the center of the first light guide member 507 in the upper-lower direction.

In addition, a decorative film may be bonded onto the first surface 572 of the first light guide member 507. The decorative film is configured to transmit radio waves emitted from the radar 5 and hide the radar 5 from the outside of the vehicle 1E. A thickness of the decorative film is, for example, 0.1 mm. The decorative film bonded to the first surface 572 can hide the radar 5 from the outside of the vehicle 1E even in a state where the first light guide member 507 does not emit light.

(Configuration of Second Light Guide Member 506)

The second light guide member 506 is disposed in the lamp chamber S4 in a manner of facing the radar 5 via the first light guide member 507, and is configured to emit light toward the outside of the vehicle 1E. In this manner, at least a part of the radar 5 can be hidden from the outside of the vehicle 1E by the light emission of the second light guide member 506. Since the second light guide member 506 is present in the field of view F of the radar 5, the second light guide member 506 is configured to transmit radio waves emitted from the radar 5. The second light guide member 506 is formed of, for example, a transparent resin material such as polycarbonate or acrylic resin. An external dimension of the second light guide member 506 may be the same as an external dimension of the first light guide member 507.

A thickness t2 of the second light guide member 506 is defined by the following equation (13).

[Equation 13]

$$t2 = \frac{\lambda}{2\sqrt{\varepsilon_{r2}}} \times n \tag{13}$$

Here, λ is a wavelength of the radio waves emitted from the radar 5. $\varepsilon_{r2}$ is a relative permittivity of the second light guide member 506, and n is an integer equal to or larger than 1.

As described above, when the thickness t2 of the second light guide member 506 is set to a thickness defined by the above equation (13), radio waves R1 reflected by a first surface 562 of the second light guide member 506 that faces the radar 5 via the first light guide member 507 and radio waves R2 reflected by a second surface 561 of the second light guide member 506 located at a side opposite to the first surface 562 weaken each other. Specifically, since a phase difference Δθ between the reflected radio waves R2 and the reflected radio waves R1 is (2m+1)π (m is an integer equal to larger than zero), the reflected radio waves R1 and the reflected radio waves R2 weaken each other. As a result, the reflectance of the second light guide member 506 with respect to the radio waves emitted from the radar 5 can be reduced to be low.

Therefore, since an intensity of the radio waves reflected by the second light guide member 506 is weak, it is possible to avoid a situation in which the reflected radio waves are received by the radar 5 and adversely affect the radar data as a noise component. For example, when the wavelength λ of the radio waves of the radar 5 is 3.922 mm, the relative permittivity $\varepsilon_{r2}$ of the second light guide member 506 made of acrylic resin is 2.57, and n=2, the thickness t2 of the second light guide member 506 is about 2.45 mm.

The second light source 508b is disposed on a wiring board 510 and is electrically connected to a light source driving circuit (not shown). The second light source 508b may be formed of, for example, a semiconductor light emitting element such as an LED or an LD.

The second light source 508b is configured to emit light toward the second light guide member 506. The light emitted from the second light source 508b spreads into the second light guide member 506, and is reflected toward the outside of the vehicle 1E by a plurality of second steps 568 formed on the first surface 562 of the second light guide member 506. In this manner, the plurality of second steps 568 are configured to emit the light spreading inside the second light guide member 506 toward the outside of the vehicle 1E.

The plurality of second steps 568 may have the same configuration as the plurality of first steps 578 shown in FIGS. 42A to 42. That is, the plurality of second steps 568 may be formed into a lattice shape on the first surface 562 of the second light guide member 506. An interval between adjacent second steps 568 is, for example, 400 μm.

Further, the second steps 568 may be formed on the first surface 562 as concave portions or convex portions. A depth or height of the second step 568 from the first surface 562 in the thickness direction of the second light guide member 506 is, for example, in a range of larger than 0 μm and 300 μm or less.

Further, in order to efficiently emit the light spreading inside the second light guide member 506 toward the outside of the vehicle 1E, it is preferable that the second step 568 is formed into a hemispherical concave portion or convex portion. Since the light spreading inside the second light guide member 506 can be reflected toward the outside of the vehicle 1E by the plurality of second steps 568, the second light guide member 506 can be caused to emit light. In other words, a pedestrian or the like present outside the vehicle 1E or an occupant of another vehicle can visually recognize the light emission of the second light guide member 506.

Further, as shown in FIG. 43A, a second optical pattern 569 can be formed on the first surface 562 of the second light guide member 506 by a collection of the plurality of second steps 568. In the example shown in FIG. 43A, the rectangular second optical pattern 569 can be formed on the first surface 562 by a collection of the plurality of second steps 568. In the present embodiment, a shape of the second optical pattern 569 is not particularly limited, and the second optical pattern 569 having a predetermined geometric pattern may be formed on the first surface 572. In this manner, the design of the appearance of the left vehicle lamp 602L can be improved by the second optical pattern 569 formed on the second light guide member 506.

The second optical pattern 569 is formed in a region of the first surface 562 above a center line C1 passing through the center of the second light guide member 506 in the upper-lower direction. In particular, when the first light guide member 507 and the second light guide member 506 are viewed from the front, the first optical pattern 579 and the second optical pattern 569 do not overlap each other. In other words, when the vehicle lamp 602 is viewed from the front, the first steps 578 and the second steps 568 do not overlap each other. In this manner, it is possible to suitably prevent the light emitted from the first light guide member 507 and the light emitted from the second light guide member 506 from being mixed with each other.

A decorative film may be bonded to the first surface 562 of the second light guide member 506. The decorative film is configured to transmit radio waves emitted from the radar 5 and hide the radar 5 from the outside of the vehicle 1E. A thickness of the decorative film is, for example, 0.1 mm. The decorative film bonded to the first surface 562 can hide the radar 5 from the outside of the vehicle 1E even in a state where the second light guide member 506 does not emit light.

The first light guide member 507 and the second light guide member 506 may function as a lamp configured to present information related to traveling of the vehicle 1E (for example, stop information, turn information, rearward movement information, information related to an automatic driving mode, and the like) to the outside of the vehicle 1E. Specifically, the first light guide member 507 and the second light guide member 506 may function as a stop lamp that presents information indicating that the vehicle 1E is stopped to the outside, a turn signal lamp that presents information indicating a turn (a right or left turn or a change of a traveling lane) of the vehicle 1E to the outside, a back up lamp that presents information indicating that the vehicle 1E travels rearward to the outside, or an automatic driving system (ADS) lamp that presents information related to an automatic driving mode of the vehicle 1E. In particular, as an example of the ADS lamp, the first light guide member 507 or the second light guide member 506 may function as an ID lamp that is turned on or off in accordance with a driving mode of the vehicle 1E. The ID lamp is turned off when the driving mode of the vehicle 1E is a manual driving mode or a driving support mode, and the ID lamp is turned on when the driving mode of the vehicle 1E is an advanced driving support mode or a fully automatic driving mode.

In this respect, it is preferable that a lamp implemented by the first light guide member 507 and a lamp implemented by the second light guide member 506 are different from each other. For example, when the first light guide member 507 functions as a stop lamp, the second light guide member 506 may function as a lamp (for example, a turn signal lamp) other than a stop lamp.

In a case where the second light guide member 506 functions as a tail and stop lamp and the first light guide member 507 functions as a turn signal lamp and a back up lamp, a lamp unit other than the first light guide member 507 and the second light guide member 506 may not be disposed in the lamp chamber S4. In this case, the second light source 508b may be a red light source that emits red light. Furthermore, the first light source 508a may include a yellow light source that emits yellow light and a white light source that emits white light.

An illumination unit such as a stop lamp may be provided in the lamp chamber S4 in accordance with lamp functions of the first light guide member 507 and the second light guide member 506. For example, when the first light guide member 507 functions as an ID lamp and the second light guide member 506 functions as a turn signal lamp, a tail and stop lamp and a back up lamp may be provided in the lamp chamber S4.

According to the present embodiment, since the first optical pattern 579 is formed on the first light guide member 507 by the plurality of first steps 578, the first light guide member 507 can be caused to emit light. Similarly, since the second optical pattern 569 is formed on the second light guide member 506 by the plurality of second steps 568, the second light guide member 506 can be caused to emit light. In this manner, the radar 5 can be hidden from the outside of the vehicle 1E by the light emission of the two light guide members. Therefore, the first light guide member 507 and the second light guide member 506 can further improve the design of the appearance of the vehicle lamp 602 on which the radar 5 is mounted. In addition, since the first light guide member 507 and the second light guide member 506 function as different lamps, the number of components of the vehicle lamp 602 can be reduced.

(Modification of Eighth Embodiment)

Next, a left vehicle lamp 620L according to a modification of the eighth embodiment will be described with reference to FIG. 44. FIG. 44 is a longitudinal cross sectional view schematically showing the left vehicle lamp 620L according to the modification of the eighth embodiment. The vehicle lamp 602 according to the eighth embodiment is a rear lamp, while the left vehicle lamp 620L according to the modification is a left head lamp mounted on a left front surface of a vehicle. In the following description, components having the same reference numerals as those of the components already described in the eighth embodiment will not be repeatedly described.

As shown in FIG. 44, the left vehicle lamp 620L includes a lamp housing 540, a lamp cover 520, an illumination unit 503, the radar 5, a first light guide member 507, a first light source 508a, a second light guide member 506, and a second light source 508b.

The lamp cover 520 is disposed in a manner of covering an opening of the lamp housing 540. The illumination unit 503 is disposed in a lamp chamber S5 formed by the lamp cover 520 and the lamp housing 540. The illumination unit 503 is configured to emit, for example, a high beam light distribution pattern and/or a low beam light distribution pattern toward a front side of the vehicle.

The radar 5 is disposed outside the lamp chamber S5, and is configured to acquire radar data indicating a surrounding environment of the vehicle by emitting radio waves to the outside of the vehicle. Similarly, the first light guide member 507 and the second light guide member 506 are disposed outside the lamp chamber S5 in a manner of facing the radar 5. Similarly, the first light source 508a and the second light source 508b are disposed outside the lamp chamber S5. The light emitted from the first light guide member 507 and the light emitted from the second light guide member 506 are emitted to the outside of the vehicle via a lower extending portion 550 of the lamp housing 540.

In a case where the first light guide member 507 and the second light guide member 506 are mounted on the left vehicle lamp 620L that is a left head lamp, one of the first light guide member 507 and the second light guide member 506 may function as a daytime running lamp (DRL), and the other one of the first light guide member 507 and the second light guide member 506 may function as a turn signal lamp. In this manner, since the radar 5 can be hidden by the light emission of the first light guide member 507 and the second light guide member 506, it is possible to further improve the design of the appearance of the left vehicle lamp 620L on which the radar 5 is mounted.

Since one of the first light guide member 507 and the second light guide member 506 functions as the DRL and the other one of the first light guide member 507 and the second light guide member 506 functions as the turn signal lamp, it is not necessary to separately provide the DRL and the turn signal lamp in the left vehicle lamp 620L. In this manner, it is possible to reduce the number of components of the left vehicle lamp 620L.

Ninth Embodiment

Next, a vehicle lamp according to a ninth embodiment will be described below with reference to FIGS. 45 to 47. FIG. 45 is a rear view showing a vehicle 1F including a left vehicle lamp 200L and a right vehicle lamp 200R according to the ninth embodiment. FIG. 46 is a longitudinal cross sectional view schematically showing the left vehicle lamp 200L according to the ninth embodiment. FIG. 47 is a view showing an example of a first optical pattern 679 formed on a first light guide member 570 and an example of a second optical pattern 669 formed on a second light guide member 560.

As shown in FIG. 45, the left vehicle lamp 200L according to the ninth embodiment is greatly different from the left vehicle lamp 602L according to the eighth embodiment in that the first light guide member 570 and the second light guide member 560 are integrally formed via a partition member 530. In the following description, components having the same reference numerals as those of the components already described in the eighth embodiment will not be repeatedly described.

As shown in FIG. 45, the left vehicle lamp 200L is disposed at a left rear side of the vehicle 1F, and the right vehicle lamp 200R is disposed at a right rear side of the vehicle 1F. Each of the left vehicle lamp 200L and the right vehicle lamp 200R includes the radar 5.

In the present embodiment, the left vehicle lamp 200L and the right vehicle lamp 200R function as rear lamps (or rear combination lamps). The left vehicle lamp 200L and the right vehicle lamp 200R have the same configuration. Therefore, a specific configuration of the left vehicle lamp 200L will be described with reference to FIG. 46 in the following description. The left vehicle lamp 200L and the right vehicle lamp 200R may be collectively and simply referred to as a "vehicle lamp 200" for convenience of description.

As shown in FIG. 46, the left vehicle lamp 200L includes the lamp housing 514, the lamp cover 512 that covers an opening of the lamp housing 514, the radar 5, the first light guide member 570, the first light source 508a, the second light guide member 560, the second light source 508b, and the partition member 530.

The first light guide member 570 is disposed in the lamp chamber S4 in a manner of facing the radar 5, and is configured to emit light toward the outside of the vehicle 1F. In this manner, at least a part of the radar 5 can be hidden from the outside of the vehicle 1E by the light emission of the first light guide member 570. Since the first light guide member 570 is present in the field of view F of the radar 5, the first light guide member 570 is configured to transmit radio waves emitted from the radar 5. The first light guide member 570 is formed of, for example, a transparent resin material such as polycarbonate or acrylic resin. The first light guide member 570 may have the thickness t1 defined by the equation (12) described above. Accordingly, the reflectance of the first light guide member 570 with respect to the radio waves emitted from the radar 5 can be reduced to be low.

The first light source 508a is disposed on a wiring board 510a and is electrically connected to a light source driving circuit (not shown). The first light source 508a is configured to emit light toward the first light guide member 570. The light emitted from the first light source 508a spreads into the first light guide member 570 and is reflected toward the outside of the vehicle 1E by a plurality of first steps 678 formed on a first surface 672 of the first light guide member 570. In this manner, the plurality of first steps 678 are configured to emit the light spreading inside the first light guide member 570 toward the outside of the vehicle 1E.

The plurality of first steps 678 have the same configuration as the plurality of first steps 578 shown in FIG. 42A. That is, the plurality of first steps 678 may be formed into a lattice shape on the first surface 672 of the first light guide member 570. The first steps 678 may be formed as concave portions or convex portions on the first surface 672. Since the light spreading inside the first light guide member 570 can be reflected toward the outside of the vehicle 1F by the plurality of first steps 678, the first light guide member 570 can be caused to emit light.

Further, as shown in FIG. 47, the first optical pattern 679 can be formed on the first surface 672 of the first light guide member 570 by a collection of the plurality of first steps 678. In the example shown in FIG. 47, the rectangular first optical pattern 679 can be formed on the first surface 672 by a collection of the plurality of first steps 678. In this manner, the first optical pattern 679 formed on the first light guide member 570 can improve the design of the appearance of the left vehicle lamp 200L.

The second light guide member 560 is disposed in the lamp chamber S4 in a manner of facing the radar 5, and is configured to emit light toward the outside of the vehicle 1F. In this manner, at least a part of the radar 5 can be hidden from the outside of the vehicle 1F by the light emission of the second light guide member 560. The second light guide member 560 is configured to transmit radio waves emitted from the radar 5. The second light guide member 560 is formed of, for example, a transparent resin material such as polycarbonate or acrylic resin. The second light guide member 560 may have the thickness t2 defined by the equation (13) described above. Accordingly, the reflectance of the second light guide member 560 with respect to the radio waves emitted from the radar 5 can be reduced to be low.

The second light source 508*b* is disposed on a wiring board 510*b* and is electrically connected to a light source driving circuit (not shown). The second light source 508*b* is configured to emit light toward the second light guide member 560. The light emitted from the second light source 508*b* spreads into the second light guide member 560, and is reflected toward the outside of the vehicle 1F by a plurality of second steps 668 formed on a first surface 662 of the second light guide member 560. In this manner, the plurality of second steps 668 are configured to emit the light spreading inside the second light guide member 560 toward the outside of the vehicle 1F.

The plurality of second steps 668 have the same configuration as the plurality of first steps 578 shown in FIG. 42A. That is, the plurality of second steps 668 may be formed into a lattice shape on the first surface 662 of the second light guide member 560. The second steps 668 may be formed as concave portions or convex portions on the first surface 662. Since the light spreading inside the second light guide member 560 can be reflected toward the outside of the vehicle 1F by the plurality of second steps 668, the second light guide member 560 can be caused to emit light.

Further, as shown in FIG. 47, the second optical pattern 669 can be formed on the first surface 662 of the second light guide member 560 by a collection of the plurality of second steps 668. In the example shown in FIG. 47, the rectangular second optical pattern 669 can be formed on the first surface 662 by a collection of the plurality of second steps 668. In this manner, the design of the appearance of the left vehicle lamp 200L can be improved by the second optical pattern 669 formed on the second light guide member 560.

The partition member 530 is provided between the first light guide member 570 and the second light guide member 560 in the upper-lower direction, and is formed of a non-transparent resin member. In this regard, the partition member 530 is integrally formed with the first light guide member 570 formed of a transparent resin member by two-color molding, and is integrally formed with the second light guide member 560 formed of a transparent resin member by two-color molding. In this manner, the first light guide member 570 and the second light guide member 560 are integrally formed with each other via the partition member 530.

As described above, according to the present embodiment, it is possible to suitably prevent a situation in which the light emitted from the first light guide member 570 and the light emitted from the second light guide member 560 are mixed by the partition member 530. Further, since a boundary between the first optical pattern 679 formed on the first light guide member 570 and the second optical pattern 669 formed on the second light guide member 560 is clearly defined by the partition member 530, it is possible to further improve the design of the appearance of the vehicle lamp 200.

In addition, no convex portion is formed at a boundary between the first light guide member 570 and the partition member 530, and no convex portion is formed at a boundary between the second light guide member 560 and the partition member 530. That is, the first surface 672 of the first light guide member 570 and a surface 539 of the partition member 530 that faces the radar 5 form a continuous smooth surface at the boundary between the first light guide member 570 and the partition member 530. The first surface 662 of the second light guide member 560 and the surface 539 of the partition member 530 form a continuous smooth surface at the boundary between the second light guide member 560 and the partition member 530.

As described above, according to the present embodiment, even when the partition member 530 is present in the field of view F of the radar 5, it is possible to suitably prevent the radar data from being adversely affected by radio waves reflected by a boundary portion between the partition member 530 and the first light guide member 570 or a boundary portion between the partition member 530 and the second light guide member 560.

The first light guide member 570 and the second light guide member 560 may function as a lamp configured to present information related to traveling of the vehicle 1F (for example, stop information, turn information, rearward movement information, information related to an automatic driving mode, and the like) to the outside of the vehicle 1F. Specifically, the first light guide member 570 and the second light guide member 560 may function as a stop lamp, a turn signal lamp, a back up lamp, or an ADS lamp.

According to the present embodiment, since the first optical pattern 679 is formed on the first light guide member 570 by the plurality of first steps 678, the first light guide member 570 can be caused to emit light. Similarly, since the second optical pattern 669 is formed on the second light guide member 560 by the plurality of second steps 668, the second light guide member 560 can be caused to emit light. In this manner, the radar 5 can be hidden from the outside of the vehicle 1E by the light emission of the two light guide members. Therefore, the first light guide member 570 and the second light guide member 560 can further improve the design of the appearance of the vehicle lamp 602 on which the radar 5 is mounted. In addition, since the first light guide member 570 and the second light guide member 560 function as different lamps, the number of components of the vehicle lamp 200 can be reduced.

Although the plurality of first steps 578 are formed on the first surface 572 of the first light guide member 507 in the description of the present embodiment, the present embodiment is not limited thereto. In this regard, the plurality of first steps 578 may be formed on the second surface 571 of the first light guide member 507, or may be formed on both the first surface 572 and the second surface 571. Similarly, the plurality of second steps 568 may be formed on the second surface 561 of the second light guide member 506, or may be formed on both the first surface 562 and the second surface 561.

Tenth Embodiment

Hereinafter, a tenth embodiment of the present disclosure (hereinafter, simply referred to as "the present embodiment") will be described with reference to the drawings. Dimensions of members shown in the drawings may be different from actual dimensions of the members for the sake of convenience of description.

In the description of the present embodiment, a "left-right direction", an "upper-lower direction", and a "front-rear direction" may be appropriately referred to for the convenience of description. These directions are relative directions set for a vehicle 1G shown in FIG. 48. Here, the "left-right direction" is a direction including a "left direction" and a "right direction". The "upper-lower direction" is a direction including an "upper direction" and a "lower direction". The "front-rear direction" is a direction including a "front direction" and a "rear direction". Although not shown in FIG. 48, the "front-rear direction" is a direction perpendicular to the left-right direction and the upper-lower direction.

A "horizontal direction" of the vehicle 1G is mentioned in the present embodiment, and the "horizontal direction" is a direction perpendicular to the upper-lower direction (a vertical direction) and includes the left-right direction and the front-rear direction. In the present embodiment, directions (the left-right direction, the upper-lower direction, and the front-rear direction) set for a right vehicle lamp 702R and a left vehicle lamp 702L coincide with directions (the left-right direction, the upper-lower direction, and the front-rear direction) set for the vehicle 1G.

Further, an "X axis direction", a "Y axis direction", and a "Z axis direction" may be referred to as appropriate in the description of the present embodiment. These directions are relative directions set for a radar 705 shown in FIG. 49. Here, one of the X axis direction, the Y axis direction, and the Z axis direction is perpendicular to the other two directions. For convenience of explanation, it is assumed that the X axis direction of the radar 705 is parallel to the upper-lower direction of the vehicle 1G. The Y axis direction of the radar 705 is parallel to the left-right direction of the vehicle 1G. The Z axis direction of the radar 705 is parallel to the front-rear direction of the vehicle 1G.

First, the vehicle 1G according to the present embodiment will be described with reference to FIG. 48. FIG. 48 is a front view showing the vehicle 1G including the left vehicle lamp 702L and the right vehicle lamp 702R. As shown in FIG. 48, the left vehicle lamp 702L is disposed at a left front side of the vehicle 1G, and the right vehicle lamp 702R is disposed at a right front side of the vehicle 1G. Each of the left vehicle lamp 702L and the right vehicle lamp 702R includes the radar 705. In the present embodiment, the left vehicle lamp 702L and the right vehicle lamp 702R have the same configuration. Therefore, a specific configuration of the left vehicle lamp 702L will be described with reference to FIG. 49 in the following description.

The left vehicle lamp 702L and the right vehicle lamp 702R may be collectively and simply referred to as a "vehicle lamp 702" for convenience of description.

Although the vehicle lamp 702 that functions as a head lamp will be described in the present embodiment, the vehicle lamp 702 may be a rear lamp that is disposed on a rear surface of the vehicle 1G and on which the radar 705 is mounted.

FIG. 49 is a horizontal cross sectional view schematically showing the left vehicle lamp 702L. As shown in FIG. 49, the left vehicle lamp 702L includes a lamp housing 714, a lamp cover 712 that covers an opening of the lamp housing 714, two illumination units 703 and 704, and the radar 705.

The illumination units 703 and 704 are disposed in a lamp chamber S7 formed by the lamp housing 714 and the lamp cover 712. One of the illumination units 703 and 704 functions as a high beam illumination unit configured to emit a high beam light distribution pattern to a front side of the vehicle 1G, and the other one of the illumination units 703 and 704 functions as a low beam illumination unit configured to emit a low beam light distribution pattern to the front side of the vehicle 1G.

The radar 705 is disposed in the lamp chamber S7, and is configured to acquire radar data indicating a surrounding environment of the vehicle 1G by emitting radio waves (for example, millimeter waves or microwaves) toward the outside of the vehicle 1G. In the present embodiment, the radar 705 is configured to acquire radar data indicating a front region of the vehicle 1G by emitting radio waves toward the front side of the vehicle 1G. The radar 705 is, for example, a millimeter wave radar or a microwave radar. A vehicle control unit (in-vehicle computer) (not shown) is formed to specify the surrounding environment of the vehicle 1G (in particular, information on an object present outside the vehicle 1G) based on the radar data output from the radar 705. The field of view F (a detection range) of the radar 705 in the vertical direction (the X axis direction) may be, for example, within a range of 3° to 100°. The field of view F of the radar 705 in the horizontal direction perpendicular to the X axis direction may be, for example, within a range of 120° to 180°. The radar 705 may be disposed outside the lamp chamber S7 or may be disposed at a predetermined location of the vehicle 1G.

Next, a specific configuration of the radar 705 will be described below with reference to FIG. 50. FIG. 50 is a cross sectional view (in particular, a cross sectional view orthogonal to the Y axis direction) schematically showing the radar 705. As shown in FIG. 50, the radar 705 includes a first circuit board 710, a second circuit board 720, a radar housing 740, and a light emitting radome 730 that covers an opening of the radar housing 740.

A space K7 is defined by the light emitting radome 730 and the radar housing 740. The first circuit board 710 is disposed in the space K7. An antenna unit 713 and an RF (radio frequency) circuit unit 715 configured as a monolithic microwave integrated circuit (MMIC) are disposed on a surface 716 of the first circuit board 710.

The antenna unit 713 includes a plurality of metal patterns 830 (patch antennas) formed on the surface 716 of the first circuit board 710. The antenna unit 713 includes a transmission antenna and a reception antenna. The transmission antenna is configured to transmit radio waves (for example, millimeter waves having a wavelength of 1 mm to 10 mm) to the outside of the radar 705. The reception antenna is configured to receive radio waves reflected by an object (for example, another vehicle) present outside the radar 705. The radio waves radiated from the transmission antenna are reflected by an object such as another vehicle, and then the radio waves reflected from the object are received by the reception antenna. In this manner, information related to the object present outside the vehicle 1G is acquired based on a high frequency signal input to the transmission antenna and a high frequency signal output from the reception antenna.

The transmission antenna may include a plurality of metal patterns 830 arranged in a matrix of N rows×M columns. On the other hand, the reception antenna may include a plurality of metal patterns 830 arranged in N rows×(M+1) columns. In the present example, the transmission antenna is configured with the metal patterns 830 arranged in 4 rows×3 columns. The reception antenna is configured with the metal patterns 830 arranged in 4 rows×4 columns.

The RF circuit unit 715 includes a transmission-side RF circuit and a reception-side RF circuit. The transmission-side RF circuit is electrically connected to the transmission antenna, and is configured to input a high frequency signal (a TX signal) to the transmission antenna. The reception-side RF circuit is electrically connected to the reception antenna and the transmission-side RF circuit. The reception-side RF circuit is configured to generate an intermediate frequency (IF) signal based on the TX signal and a high frequency signal (an RX signal) output from the reception antenna, and perform an AD conversion on the IF signal.

The second circuit board 720 is disposed in the space K7 and is disposed on a surface 742 of the radar housing 740. The second circuit board 720 is electrically connected to the first circuit board 710 via an electrical connector (not shown) or the like. A signal processing circuit unit 721, a plurality of first light sources 723a, a plurality of second light sources 723b, and a light source control circuit unit 722 are disposed on a surface 726 of the second circuit board 720.

The signal processing circuit unit 721 is electrically connected to the RF circuit unit 715, and is configured to generate radar data indicating information related to an object (a distance, a direction, a relative speed, and the like of the object) based on the IF signal (a digital signal) output from the reception-side RF circuit. The signal processing circuit unit 721 may include a digital signal processor (DSP) and a microcontroller. The signal processing circuit unit 721 transmits the radar data to a vehicle control unit (not shown). Thereafter, the vehicle control unit specifies surrounding environment information of the vehicle 1G based on the radar data transmitted from the signal processing circuit unit 721.

Each of the first light sources 723a and the second light sources 723b includes, for example, a semiconductor light emitting element such as an LED or an LD. As shown in FIG. 50 and FIG. 52A, the plurality of first light sources 723a (six first light sources 723a in the example shown in FIG. 52A) are arranged in the Y axis direction in the vicinity of a first end portion 728 of the second circuit board 720. Similarly, the plurality of second light sources 723b (six second light sources 723b in the example shown in FIG. 52A) are arranged in the Y axis direction in the vicinity of a second end portion 729 of the second circuit board 720 located at a side opposite to the first end portion 728. Each of the first light sources 723a is configured to emit light toward an end surface 735a of a first extending portion 735 of the light emitting radome 730. Similarly, each of the second light sources 723b is configured to emit light toward an end surface 734b of a second extending portion 734 of the light emitting radome 730.

Although the six first light sources 723a are arranged in the Y axis direction in the vicinity of the first end portion 728, and the six second light sources 723b are arranged in the Y axis direction in the vicinity of the second end portion 729 in the example shown in FIG. 52A, the number of the first light sources 723a and the number of the second light sources 723b are not particularly limited in the present embodiment. For example, each of the number of first light sources 723a and the number of second light sources 723b may be one.

As shown in FIG. 52B, two first light sources 723a may be disposed in the vicinity of the first end portion 728, and two second light sources 723b may be disposed in the vicinity of the second end portion 729. In this case, one of the two first light sources 723a is disposed in the vicinity of a corner portion 725a of the second circuit board 720, and the other one of the two first light sources 723a is disposed in the vicinity of a corner portion 725b of the second circuit board 720. Further, a first photoconductor 727a is disposed between the two first light sources 723a. In this case, light emitted from the two first light sources 723a is incident on the first photoconductor 727a. Thereafter, the light spreading inside the first photoconductor 727a is reflected toward the end surface 735a of the first extending portion 735 by a plurality of steps formed on a surface of the first photoconductor 727a.

Similarly, one of the two second light sources 723b is disposed in the vicinity of a corner portion 725c of the second circuit board 720, and the other one of the two second light sources 723b is disposed in the vicinity of a corner portion 725d of the second circuit board 720. Further, a first photoconductor 727b is disposed between the two second light sources 723b. In this case, the light emitted from the second light sources 723b is incident on the first photoconductor 727b. Thereafter, the light spreading inside the first photoconductor 727b is reflected toward the end surface 734b of the second extending portion 734 by a plurality of steps formed on a surface of the first photoconductor 727b.

The light source control circuit unit 722 is electrically connected to each of the first light sources 723a and the second light sources 723b, and is configured to control turning on of the first light sources 723a and the second light sources 723b. When the radar 705 functions as a turn signal lamp, the light source control circuit unit 722 may control the turning on of the first light sources 723a and the second light sources 723b based on an instruction signal transmitted from a vehicle control unit.

Next, a structure of the light emitting radome 730 will be specifically described. The light emitting radome 730 is formed of, for example, a transparent resin material such as acrylic resin or polycarbonate. The light emitting radome 730 includes a light emitting portion 731, a first light guide portion 738 connected to one end of the light emitting portion 731, a second light guide portion 739 connected to the other end of the light emitting portion 731, the first extending portion 735 connected to the first light guide portion 738, and the second extending portion 734 connected to the second light guide portion 739.

The light emitting portion 731 has an inner surface 733 (an example of a first surface) that faces the first circuit board 710, an outer surface 732 (an example of a second surface) located at a side opposite to the inner surface 733, and a plurality of steps 768 (see FIG. 51A) formed on the inner surface 733. The plurality of steps 768 are configured to emit the light spreading inside the light emitting portion 731 of the light emitting radome 730 toward the outside of the radar 705 (in particular, the +Z axis direction).

As shown in FIG. 51A, the plurality of steps 768 may be formed, for example, into a lattice shape on the inner surface 733 of the light emitting portion 731. An interval d1 between adjacent steps 768 among the plurality of steps 768 is, for example, 400 µm. In this regard, the brightness of an optical pattern 769 (see FIG. 53) to be described later can be appropriately adjusted by adjusting the interval d1 between adjacent steps 768.

The steps 768 may be formed on the inner surface 733 of the light emitting portion 731 as concave portions (see FIG. 51B), or may be formed on the inner surface 733 as convex portions (see FIG. 51C). A depth d2 or a height d3 of the step 768 from the inner surface 733 in the thickness direction of the light emitting portion 731 is, for example, in a range of larger than 0 µm and 300 µm or less. For example, when the thickness of the light emitting portion 731 is about 2.4 mm, the depth d2 or the height d3 of the step 768 may be about 30 µm.

Further, in order to efficiently emit the light spreading inside the light emitting portion 731 to the outside of the radar 705, it is preferable that the step 768 is formed into a hemispherical concave portion or convex portion. Since the light spreading inside the light emitting portion 731 can be reflected toward the outside of the radar 705 by the plurality of steps 768, the light emitting portion 731 can be caused to emit light. In other words, a pedestrian or the like present outside the vehicle 1G or an occupant of another vehicle can visually recognize the light emission of the radar 705.

As shown in FIG. 53, the optical pattern 769 can be formed on the light emitting portion 731 by a collection of the plurality of steps 768. In the example shown in FIG. 53, the rectangular optical pattern 769 can be formed on the light emitting portion 731 by a collection of the plurality of steps 768. In the present embodiment, a shape of the optical pattern 769 is not particularly limited, and the optical pattern 769 having a predetermined geometric pattern may be formed on the light emitting portion 731. In this manner, the design of the appearance of the radar 705 can be improved by the optical pattern 769 formed on the light emitting portion 731.

As shown in FIG. 50, a decorative film 750 is bonded to the inner surface 733 of the light emitting portion 731. Further, the decorative film 750 is bonded to an inner surface of the first light guide portion 738 and an inner surface of the first extending portion 735, and is bonded to an inner surface of the second light guide portion 739 and an inner surface of the second extending portion 734.

The decorative film 750 is configured to transmit radio waves emitted from the antenna unit 713 and hide the first circuit board 710 and the second circuit board 720 from the outside of the radar 705. The decorative film 750 does not contain a metal material. The decorative film 750 has a high transmittance in a frequency band of radio waves (for example, millimeter waves) emitted from the antenna unit 713. A thickness of the decorative film 750 is, for example, 0.1 mm.

As an example of a layer structure of the decorative film 750, the decorative film 750 includes a binder layer that functions as an adhesive layer, a decorative layer that is formed on the binder layer, a multilayer mirror that is formed on the decorative layer, a hard coat layer that is formed on the multilayer mirror, and a protective layer that is formed on the hard coat layer. In the multilayer mirror, for example, a plurality of polymer layers having low refractive indexes and a plurality of polymer layers having high refractive indexes are alternately stacked. Since the multilayer mirror is provided on the decorative film 750, it is possible to increase the reflectance of the decorative film 750 with respect to visible light. For example, PICASUS (registered trademark) manufactured by Toray Industries, Inc. may be used as the multilayer mirror.

A reflecting surface 736 is formed between the first light guide portion 738 and the light emitting portion 731. The first extending portion 735 is disposed in the space K7 and extends toward the second circuit board 720. The end surface 735a of the first extending portion 735 faces the first light source 723a with a gap between the end surface 735a and the first light source 723a.

The light emitted from the first light source 723a is incident on the first extending portion 735 and then spreads into the first light guide portion 738. Thereafter, the light spreading inside the first light guide portion 738 is reflected toward the light emitting portion 731 by the reflecting surface 736. Thereafter, the light spreading inside the light emitting portion 731 is reflected toward the outside of the radar 705 by the plurality of steps 768 formed on the inner surface 733. In this manner, the light emitting portion 731 of the light emitting radome 730 emits light due to the light emitted from the first light source 723a.

A reflecting surface 737 is formed between the second light guide portion 739 and the light emitting portion 731. The second extending portion 734 is disposed in the space K7 and extends toward the second circuit board 720. The end surface 734b of the second extending portion 734 faces the second light source 723b with a gap between the end surface 734b and the second light source 723b.

The light emitted from the second light source 723b is incident on the second extending portion 734, and then spreads into the second light guide portion 739. Thereafter, the light spreading inside the second light guide portion 739 is reflected by the reflecting surface 737 toward the light emitting portion 731. Thereafter, the light spreading inside the light emitting portion 731 is reflected toward the outside of the radar 705 by the plurality of steps 768 formed on the inner surface 733. In this manner, the light emitting portion 731 of the light emitting radome 730 emits light due to the light emitted from the second light source 723b.

According to the present embodiment, light is emitted to the outside of the radar 705 by the plurality of steps 768 formed on the light emitting portion 731. In this manner, the light emitting radome 730 can improve the design of the appearance of the radar 705. Further, the radar 705 can be positively used as a decorative member for improving the design of the appearance of the vehicle 1G.

In particular, the design of the appearance of the radar 705 can be improved by the optical pattern 769 formed by the plurality of steps 768. Further, the light emitted from the first light source 723a can be efficiently guided to the light emitting portion 731 by the first extending portion 735 provided in the light emitting radome 730, and the light emitted from the second light source 723b can be efficiently guided to the light emitting portion 731 by the second extending portion 734 provided in the light emitting radome 730.

Further, according to the present embodiment, the first circuit board 710 and the second circuit board 720 can be hidden from the outside of the radar 705 by the decorative film 750 even in a situation where the light emitting radome 730 does not emit light.

Further, the decorative film 750 faces the radar 705 so that all radio waves in the field of view emitted from the radar 705 pass through the decorative film 750. The decorative film 750 does not contain a metal material and has a high transmittance with respect to the radio waves. Therefore, it is possible to suitably prevent the decorative film 750 from adversely affecting the radio waves emitted from the radar 705. As a result, it is possible to suitably prevent the reliability of the radar data from being lowered by the decorative film 750.

In the present embodiment, the light emitting portion 731 is disposed in a manner of facing the antenna unit 713. Therefore, the light emitting portion 731 is configured to transmit the radio waves emitted from the antenna unit 713 toward the outside of the radar 705. Further, in order to improve the reliability of the radar data acquired by the radar 705, it is desirable to reduce the reflectance of the light emitting portion 731 with respect to the radio waves emitted from the antenna unit 713 to be low.

Based on the above viewpoint, a thickness t (see FIG. 50) of the light emitting portion 731 will be described below. The thickness t of the light emitting portion 731 is defined by the following equation (14).

[Equation 14]

$$t2 = \frac{\lambda}{2\sqrt{\varepsilon_r}} \times n \qquad (14)$$

Here, $\lambda$ is a wavelength of the radio wave emitted from the transmission antenna of the antenna unit 713. $\varepsilon_r$ is the relative permittivity of the light emitting radome 730 (the light emitting portion 731), and n is an integer equal to or larger than 1.

As described above, when the thickness t of the light emitting portion 731 is set to a thickness defined by the above equation (14), radio waves R1 reflected by the inner surface 733 of the light emitting portion 731 that faces the antenna unit 713 and radio waves R2 reflected by the outer surface 732 of the light emitting portion 731 weaken each other. Specifically, since a phase difference $\Delta\theta$ between the reflected radio waves R2 and the reflected radio waves R1 is $(2m+1)\pi$ (m is an integer equal to larger than zero), the reflected radio waves R1 and the reflected radio waves R2 weaken each other. As a result, the reflectance of the light emitting portion 731 with respect to the radio waves emitted from the antenna unit 713 can be reduced to be low. Therefore, since an intensity of the radio waves reflected by the light emitting portion 731 is weak, it is possible to avoid a situation in which the reflected radio waves are received by the reception antenna of the antenna unit 713 and adversely affect the radar data as a noise component. For example, when the wavelength $\lambda$ of the radio waves is 3.922 mm, the relative permittivity $\varepsilon_r$ of the light emitting portion 731 made of acrylic resin is 2.57, and n=2, the thickness t of the light emitting portion 731 is about 2.45 mm.

The radar 705 may function as an automatic driving system (ADS) lamp or a daytime running lamp (DRL) that presents information related to a driving mode of the vehicle 1G to the outside of the vehicle 1G. As an example of the ADS lamp, the radar 705 may function as an ID lamp that is turned on or off in accordance with a driving mode of the vehicle 1G. The ID lamp is turned off when the driving mode of the vehicle 1G is a manual driving mode or a driving support mode, and the ID lamp is turned on when the driving mode of the vehicle 1G is an advanced driving support mode or a fully automatic driving mode.

In this manner, when the radar 705 functions as the ADS lamp or the DRL, it is not necessary to separately provide the ADS lamp or the DRL in the vehicle lamp 702. In this manner, it is possible to reduce the number of components of the vehicle lamp 702.

Although the plurality of steps 768 are formed on the inner surface 733 of the light emitting portion 731 in the description of the present embodiment, the present embodiment is not limited thereto. In this regard, the plurality of steps 768 may be formed on the outer surface 732 of the light emitting portion 731, or may be formed on both the inner surface 733 and the outer surface 732.

Although the embodiments of the present invention have been described above, it is needless to say that the technical scope of the present invention should not be construed as being limited by the description of the embodiments. It is to be understood by those skilled in the art that the present embodiments are merely examples and various modifications can be made within the scope of the invention described in the claims. The technical scope of the present invention should be determined based on the scope of the inventions described in the claims and an equivalent scope thereof.

The present application appropriately uses contents disclosed in the following Japanese Patent Application.

Japanese Patent Application NO. 2019-164750 (Application Date: Sep. 10, 2019)

Japanese Patent Application NO. 2019-183068 (Application Date: Oct. 3, 2019)

Japanese Patent Application NO. 2019-183069 (Application Date: Oct. 3, 2019)

Japanese Patent Application NO. 2019-183070 (Application Date: Oct. 3, 2019)

Japanese Patent Application NO. 2019-186787 (Application Date: Oct. 10, 2019)

Japanese Patent Application NO. 2019-206320 (Application Date: Nov. 14, 2019)

Japanese Patent Application NO. 2019-206321 (Application Date: Nov. 14, 2019)

Japanese Patent Application NO. 2019-207074 (Application Date: Nov. 15, 2019)

Japanese Patent Application NO. 2019-216675 (Application Date: Nov. 29, 2019)

Japanese Patent Application NO. 2020-088267 (Application Date: May 20, 2020)

The invention claimed is:

1. A vehicle lamp comprising:
   a lamp housing;
   a lamp cover that covers an opening of the lamp housing;
   an illumination unit disposed in a lamp chamber formed by the lamp housing and the lamp cover;
   a radar configured to acquire radar data indicating a surrounding environment of a vehicle by emitting radio waves to the outside of the vehicle; and
   a light guide member that is disposed in a manner of facing the radar so as to hide at least a part of the radar from the outside of the vehicle, and is configured to transmit the radio waves emitted from the radar,
   wherein the radar is disposed outside the lamp chamber,
   wherein the light guide member is configured to emit light toward the outside of the vehicle,
   wherein the light guide member has
     a first surface that faces the radar,
     a second surface located at a side opposite to the first surface, and
     a plurality of steps formed on at least one of the first surface and the second surface,
   wherein the plurality of steps are configured to emit light spreading inside the light guide member toward the outside of the vehicle, wherein a height or a depth d of each of the plurality of steps satisfies the following condition, $$d < \lambda/8$$

wherein λ is a wavelength of radio waves emitted from the radar.

2. The vehicle lamp according to claim 1, further comprising:
a light source that is disposed in the lamp chamber and configured to emit light toward the light guide member.

3. The vehicle lamp according to claim 1,
wherein the light guide member is disposed in the lamp chamber, and
wherein a part of the lamp housing is disposed between the light guide member and the radar.

4. The vehicle lamp according to claim 1,
wherein the light guide member functions as a lamp or a daytime running lamp (DRL) configured to present information related to traveling of the vehicle to the outside of the vehicle.

5. The vehicle lamp according to claim 1,
wherein the plurality of steps are configured to form an optical pattern on the light guide member.

6. A vehicle lamp comprising:
a lamp housing;
a lamp cover that covers an opening of the lamp housing;
an illumination unit disposed in a lamp chamber formed by the lamp housing and the lamp cover;
a radar configured to acquire radar data indicating a surrounding environment of a vehicle by emitting radio waves to the outside of the vehicle; and
a light guide member that is disposed in a manner of facing the radar so as to hide at least a part of the radar from the outside of the vehicle, and is configured to transmit the radio waves emitted from the radar,
wherein the radar is disposed outside the lamp chamber,
wherein the light guide member is configured to emit light toward the outside of the vehicle,
wherein a thickness t1 of the light guide member is defined by the following equation, $$t1 = \lambda/(2\varepsilon_{r1}^{1/2}) \times n$$

wherein λ is a wavelength of radio waves emitted from the radar, εd is a relative permittivity of the light guide member, and n is an integer equal to or larger than 1.

7. A vehicle lamp comprising:
a lamp housing;
a lamp cover that covers an opening of the lamp housing;
an illumination unit disposed in a lamp chamber formed by the lamp housing and the lamp cover;
a radar configured to acquire radar data indicating a surrounding environment of a vehicle by emitting radio waves to the outside of the vehicle; and
a light guide member that is disposed in a manner of facing the radar so as to hide at least a part of the radar from the outside of the vehicle, and is configured to transmit the radio waves emitted from the radar,
wherein the radar is disposed outside the lamp chamber,
wherein the light guide member is configured to emit light toward the outside of the vehicle,
wherein a part of the lamp housing is disposed between the light guide member and the radar, and
wherein a thickness t2 of a part of the lamp housing is defined by the following equation, $$t2 = \lambda/(2\varepsilon_{r2}^{1/2}) \times n$$

wherein λ is a wavelength of radio waves emitted from the radar, $\varepsilon_{r1}$ is a relative permittivity of a part of the lamp housing, and n is an integer equal to or larger than 1.

8. A vehicle lamp comprising:
a lamp housing;
a lamp cover that covers an opening of the lamp housing;
an illumination unit disposed in a lamp chamber formed by the lamp housing and the lamp cover;
a radar configured to acquire radar data indicating a surrounding environment of a vehicle by emitting radio waves to the outside of the vehicle; and
a light guide member that is disposed in a manner of facing the radar so as to hide at least a part of the radar from the outside of the vehicle, and is configured to transmit the radio waves emitted from the radar,
wherein the radar is disposed outside the lamp chamber,
wherein the light guide member is configured to emit light toward the outside of the vehicle,
wherein a part of the lamp cover faces the light guide member, and
wherein a thickness t3 of a part of the lamp cover is defined by the following equation, $$t3 = \lambda/(2\varepsilon_{r3}^{1/2}) \times n$$

wherein λ is a wavelength of radio waves emitted from the radar, $\varepsilon_{r3}$ is a relative permittivity of a part of the lamp cover, and n is an integer equal to or larger than 1.

9. The vehicle lamp according to claim 1,
wherein the radar is fixed to the lamp housing via a support member that supports the radar.

10. A vehicle lamp comprising:
a lamp housing;
a lamp cover that covers an opening of the lamp housing;
an illumination unit disposed in a lamp chamber formed by the lamp housing and the lamp cover; and
a light guide member that is disposed in a manner of facing a radar so as to hide, from the outside of a vehicle, at least a part of the radar disposed outside the lamp chamber so as to acquire radar data indicating a surrounding environment of the vehicle by emitting radio waves toward the outside of the vehicle and that is configured to transmit the radio waves emitted from the radar,
wherein the light guide member is configured to emit light toward the outside of the vehicle,
wherein the light guide member has
a first surface that faces the radar,
a second surface located at a side opposite to the first surface, and
a plurality of steps formed on at least one of the first surface and the second surface,
wherein the plurality of steps are configured to emit light spreading inside the light guide member toward the outside of the vehicle,
wherein a height or a depth d of each of the plurality of steps satisfies the following condition, $$d < \lambda/8$$

wherein λ is a wavelength of radio waves emitted from the radar.

11. The vehicle lamp according to claim 10,
wherein the radar is fixed to a vehicle body via a support member that supports the radar.

* * * * *